United States Patent [19]

Wakabayashi et al.

[11] Patent Number: 5,526,229

[45] Date of Patent: *Jun. 11, 1996

[54] TEMPERATURE CONTROL FOR ADD-ON ELECTRONIC DEVICES

[75] Inventors: Kenichi Wakabayashi; Chitoshi Takayama; Tadashi Shiozaki, all of Suwa, Japan

[73] Assignee: Seiko Epson Corporation, Tokyo, Japan

[*] Notice: The term of this patent shall not extend beyond the expiration date of Pat. No. 5,437,041.

[21] Appl. No.: 907,988

[22] Filed: Jul. 1, 1992

[30] Foreign Application Priority Data

Feb. 26, 1992 [WO] WIPO .............. PCT/JP92/00229

[51] Int. Cl.$^6$ .............. H05K 7/20; G06F 15/08
[52] U.S. Cl. .............. 361/702; 361/714; 361/697; 361/690; 364/929.4; 364/DIG. 2
[58] Field of Search .............. 361/697, 702, 361/679, 720, 690; 165/80.4, 47, 40

[56] References Cited

U.S. PATENT DOCUMENTS

| | | | |
|---|---|---|---|
| 4,027,206 | 5/1977 | Lee | 361/697 |
| 4,092,697 | 5/1978 | Spaight | 361/718 |
| 4,137,563 | 1/1979 | Tsunoda | 395/550 |
| 4,381,552 | 4/1983 | Nocilini et al. | 364/707 |
| 4,545,030 | 10/1985 | Kitchin | 395/550 |
| 4,771,365 | 9/1988 | Cichocki et al. | 361/705 |
| 4,962,444 | 10/1990 | Niggemann | 361/702 |
| 5,024,264 | 6/1991 | Natori et al. | 165/1 |
| 5,136,464 | 8/1992 | Ohmori | 361/694 |
| 5,227,631 | 7/1993 | Hunter, III et al. | 250/352 |
| 5,437,041 | 7/1995 | Wakabayashi et al. | 395/800 |

OTHER PUBLICATIONS

Hennessy et al. "Computer Architecture A Quantitative Approach" 1990, pp. 574–585.

*Primary Examiner*—William M. Treat
*Assistant Examiner*—Kenneth R. Coulter
*Attorney, Agent, or Firm*—Eric B. Janofsky

[57] ABSTRACT

An add-on control circuit device for insertion into electronic apparatus such as a laser printer having a first microprocessor with an address line connected to an add-on card connector, a ROM that stores programs for the microprocessor, and a data converter that provides data in the form of memory addresses. The add-on circuit uses a printed circuit board of mounted inside of an add-on cartridge or casing, made from high thermal transfer material such as aluminum. When the cartridge is inserted into a printer, the processor inside of the printer reads identification data stored on a ROM inside of the cartridge and conducts processing according to a specified processing program in response to the identification data. The microprocessor is located in a mounting area near the front end of the cartridge, when viewed along the direction of insertion, so that the microprocessor is more effectively cooled by the flow of cooling air inside of the printer. Other embodiments incorporate cooling structures, thermal transfer materials disposed between heat generating elements and an outside casing, and ventilation holes.

22 Claims, 25 Drawing Sheets

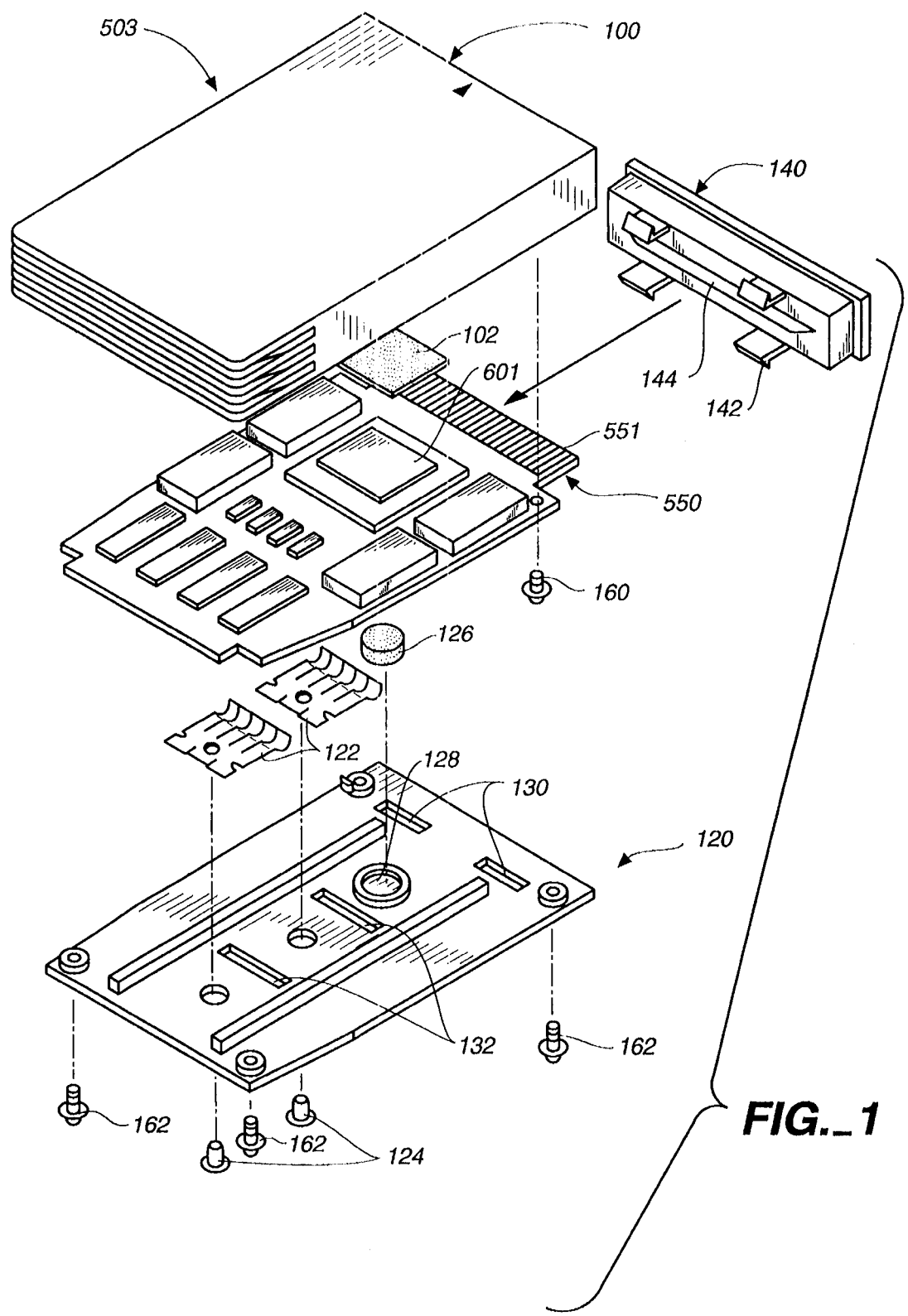
FIG._1

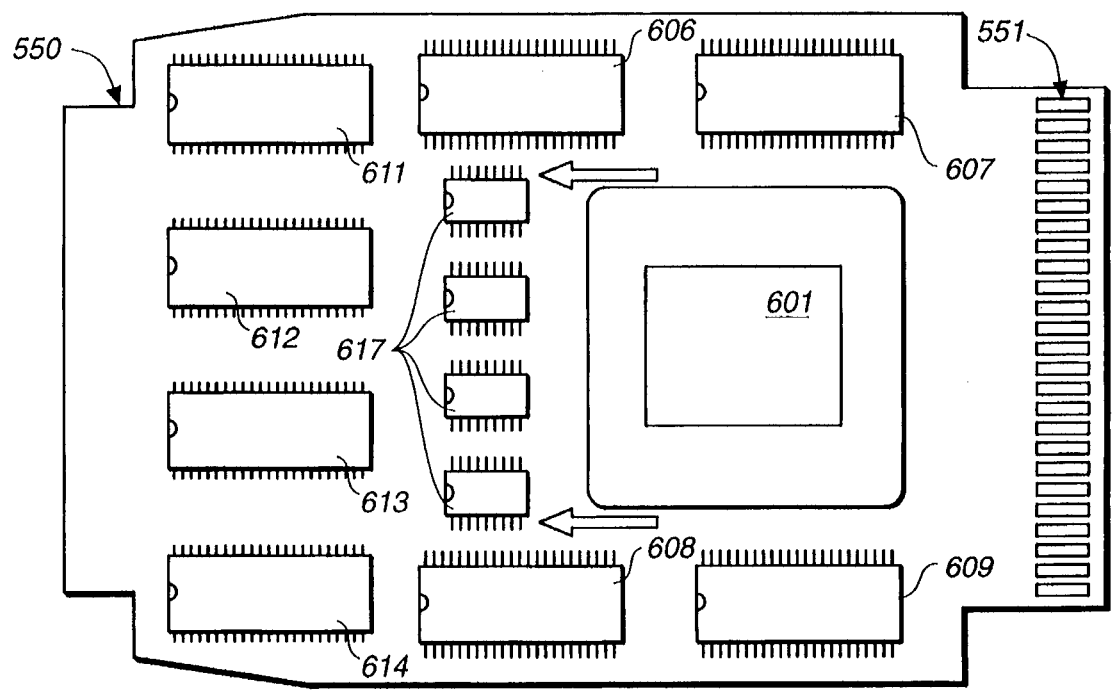
FIG._2A
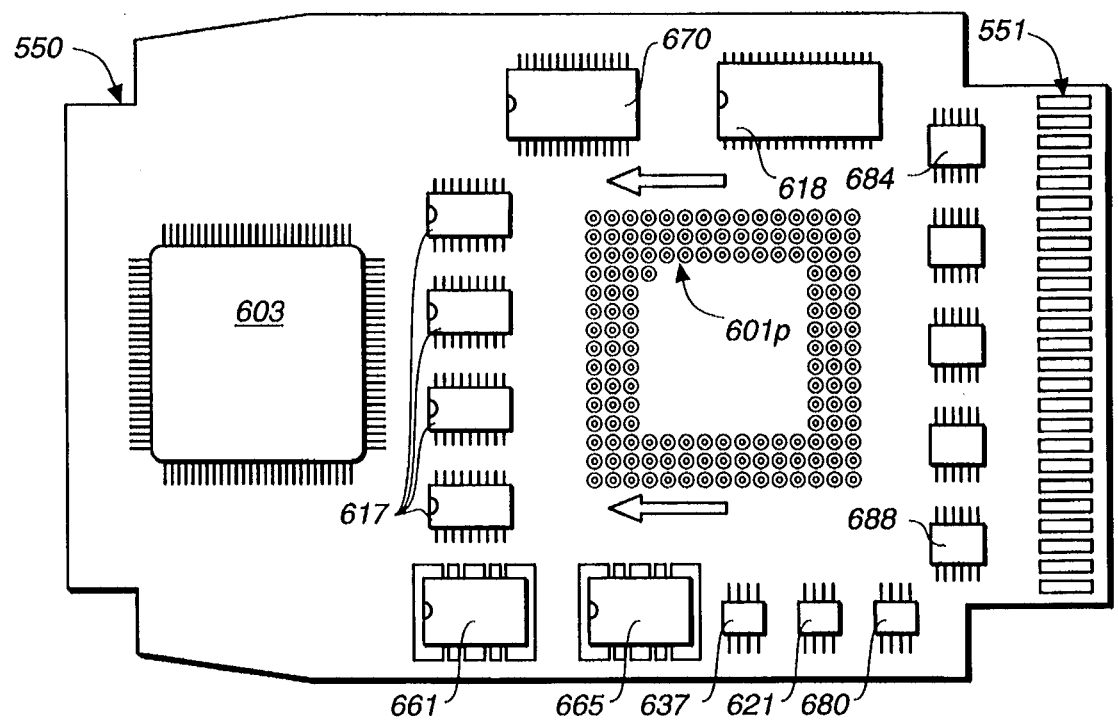
FIG._2B

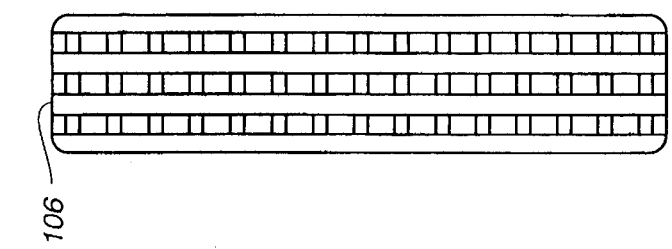
FIG._3B
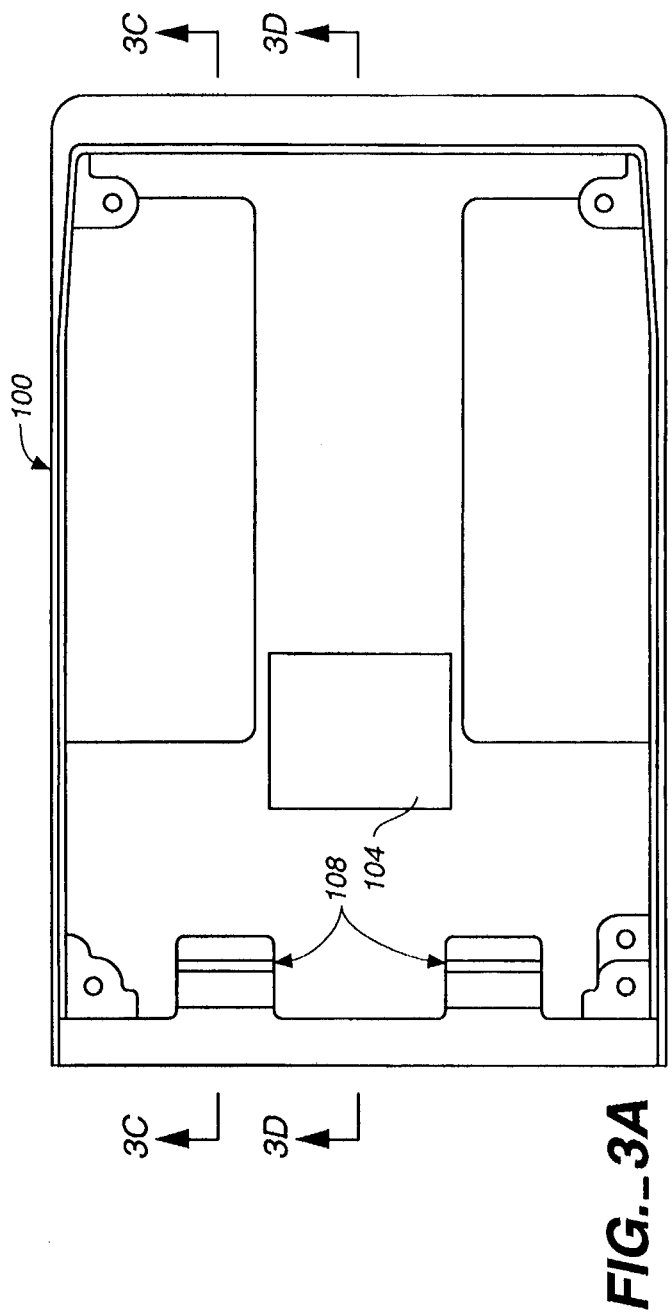
FIG._3A
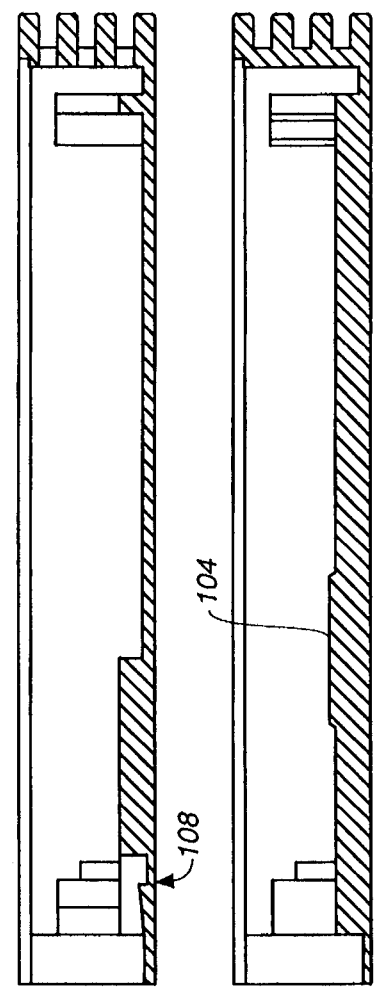
FIG._3C
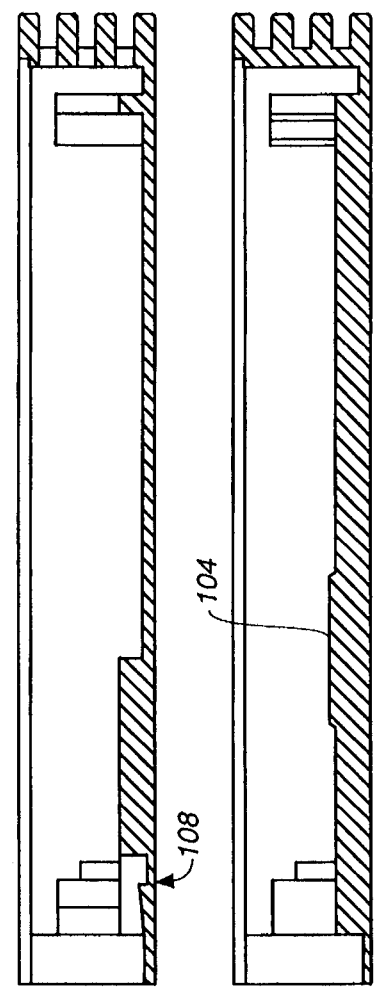
FIG._3D

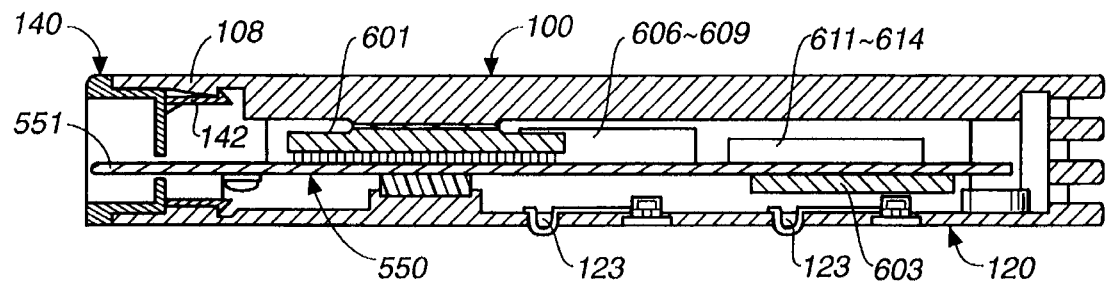
FIG._4
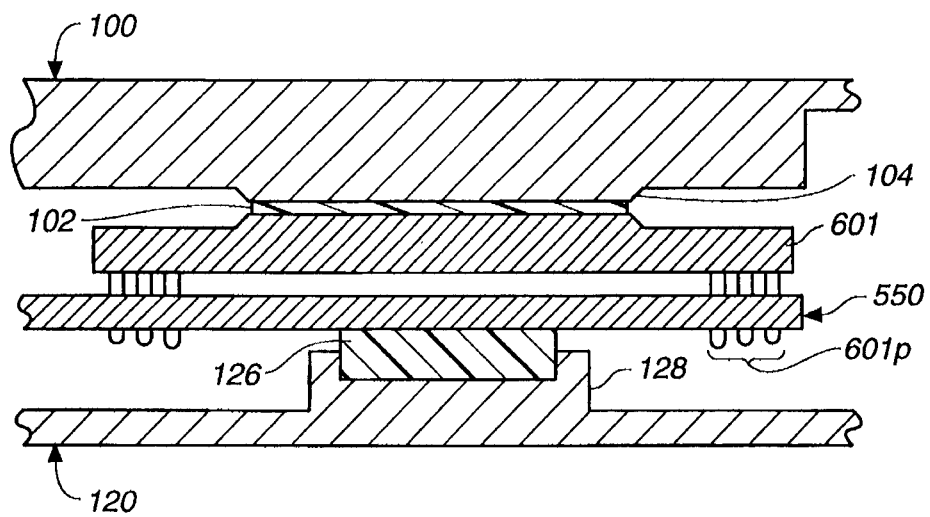
FIG._5
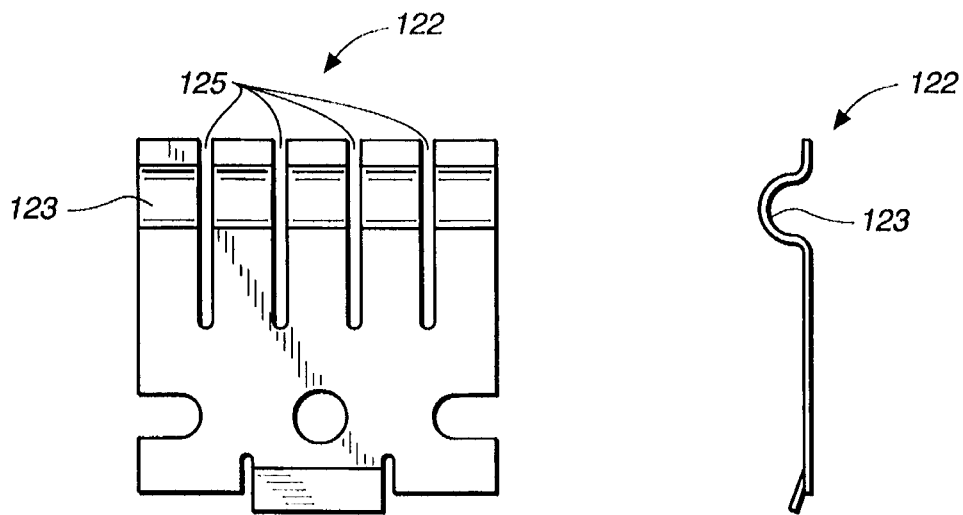
FIG._6A        FIG._6B

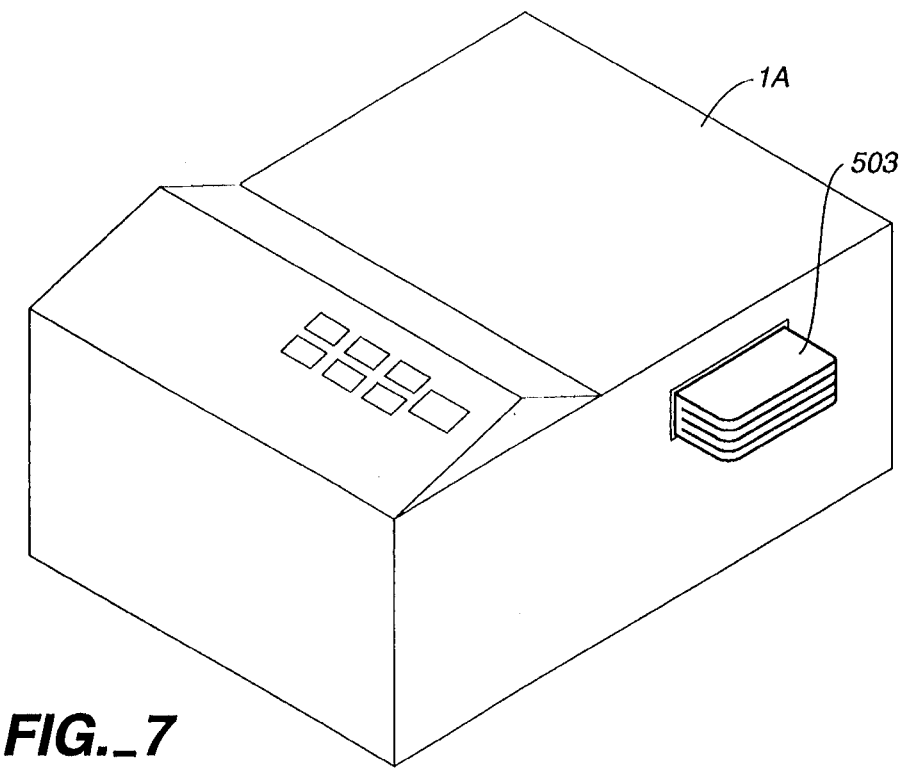
FIG._7
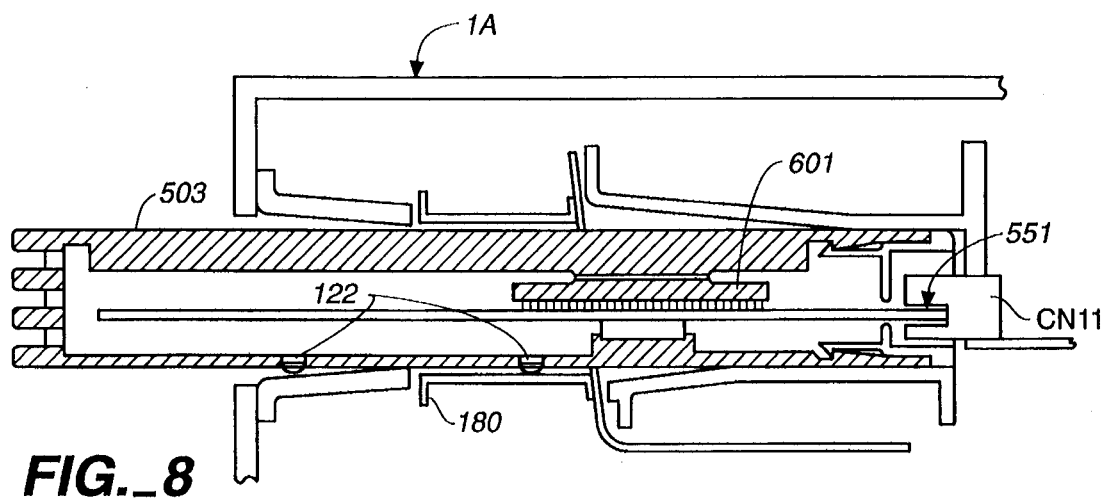
FIG._8

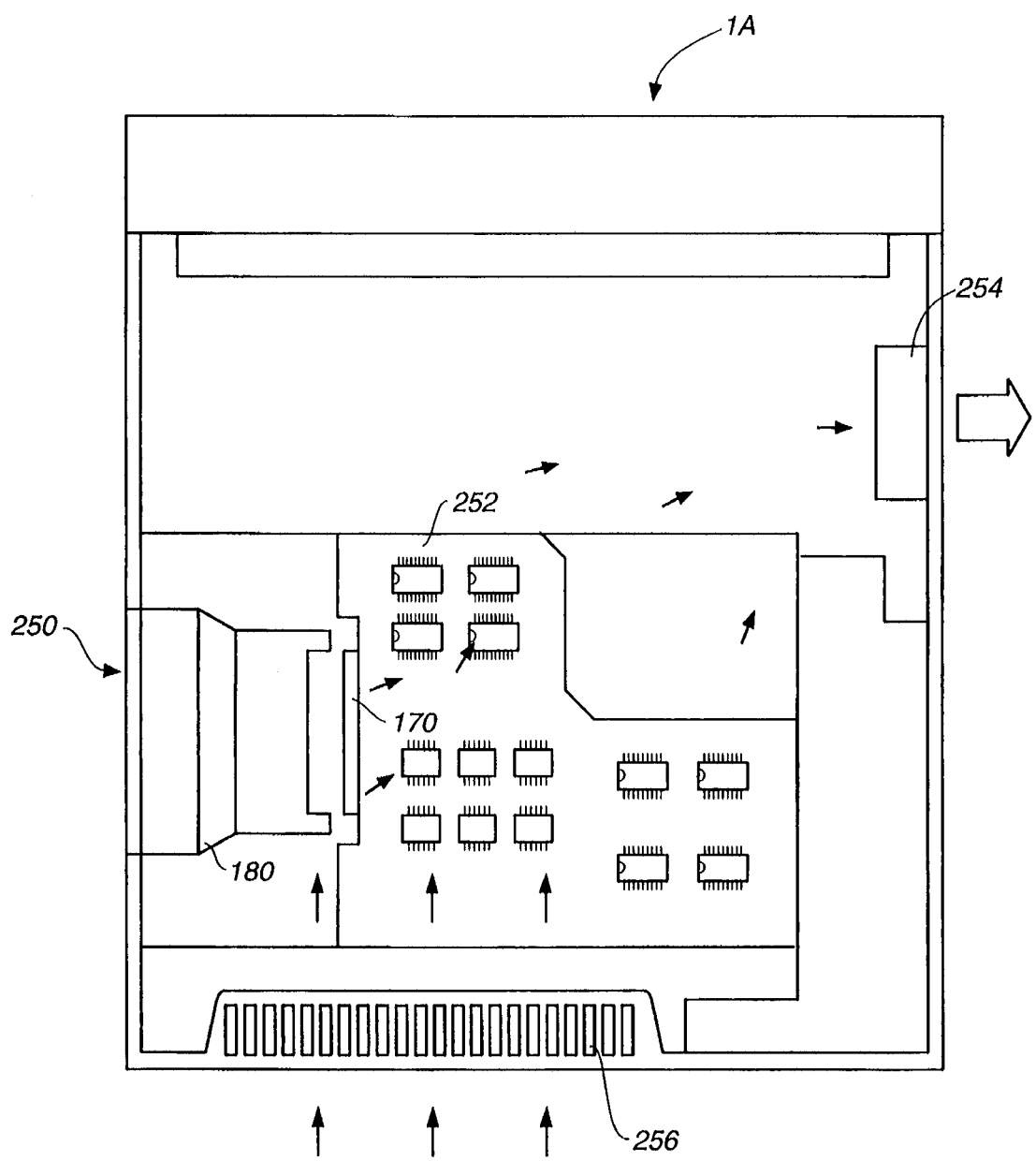
FIG._9

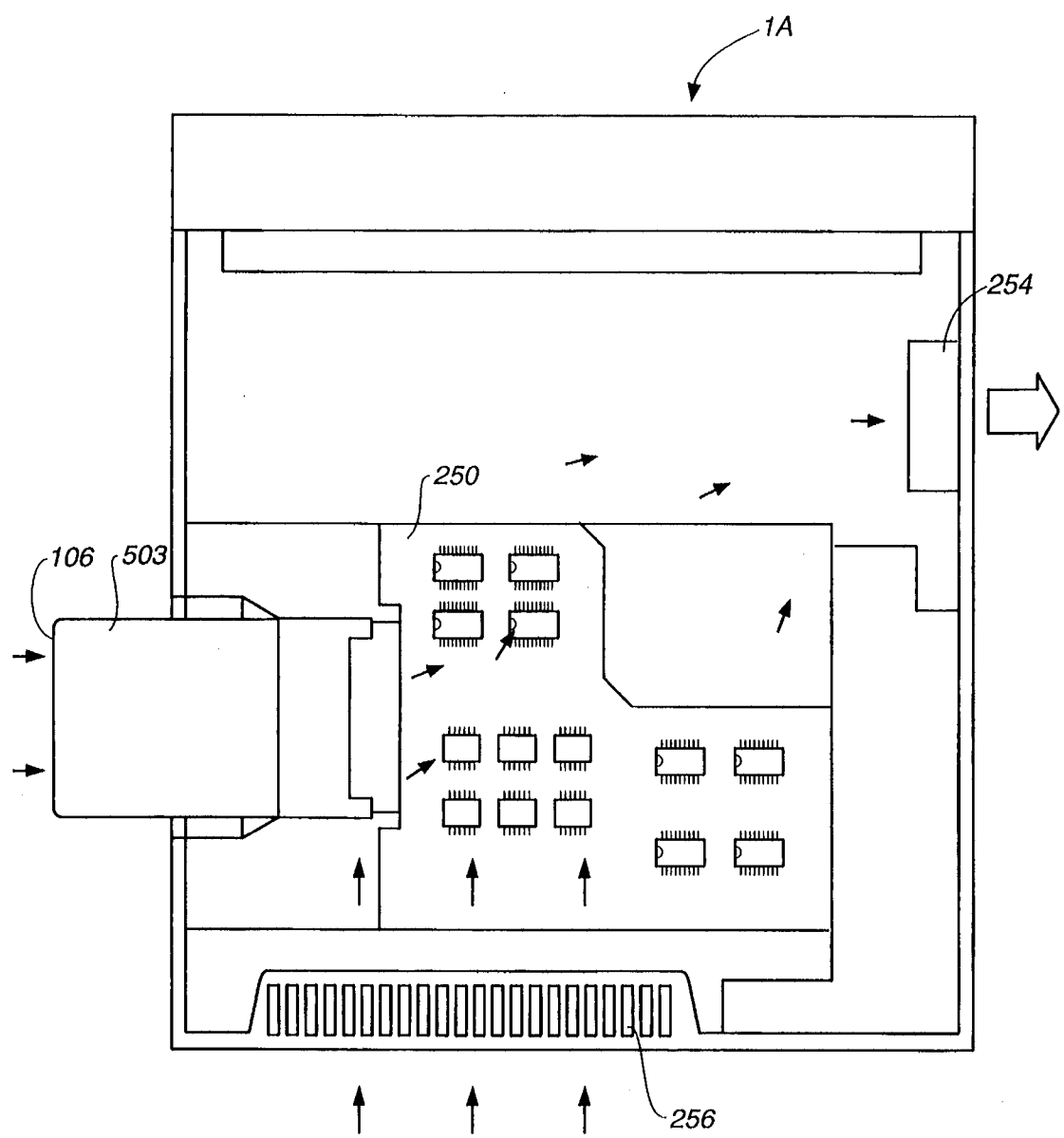
FIG._10

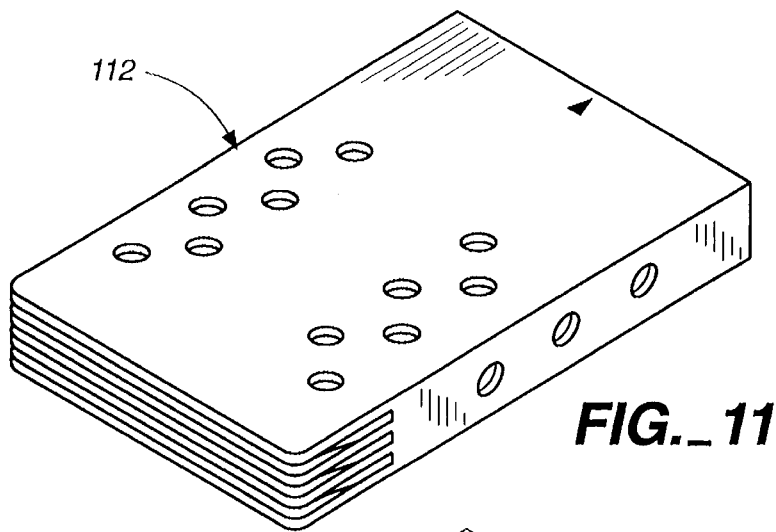
FIG._11
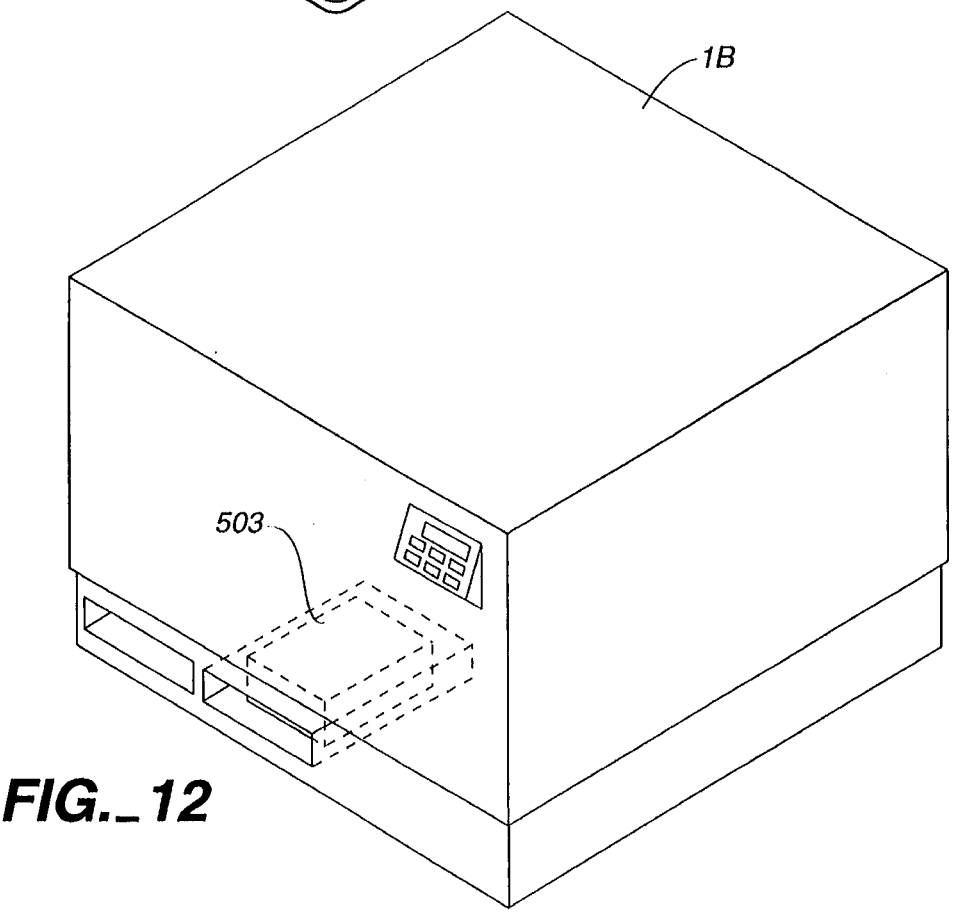
FIG._12
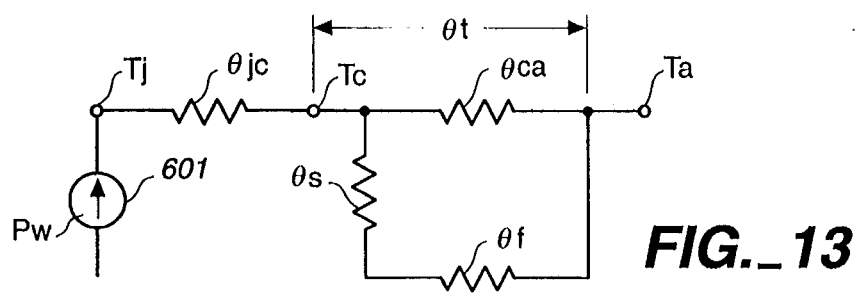
FIG._13

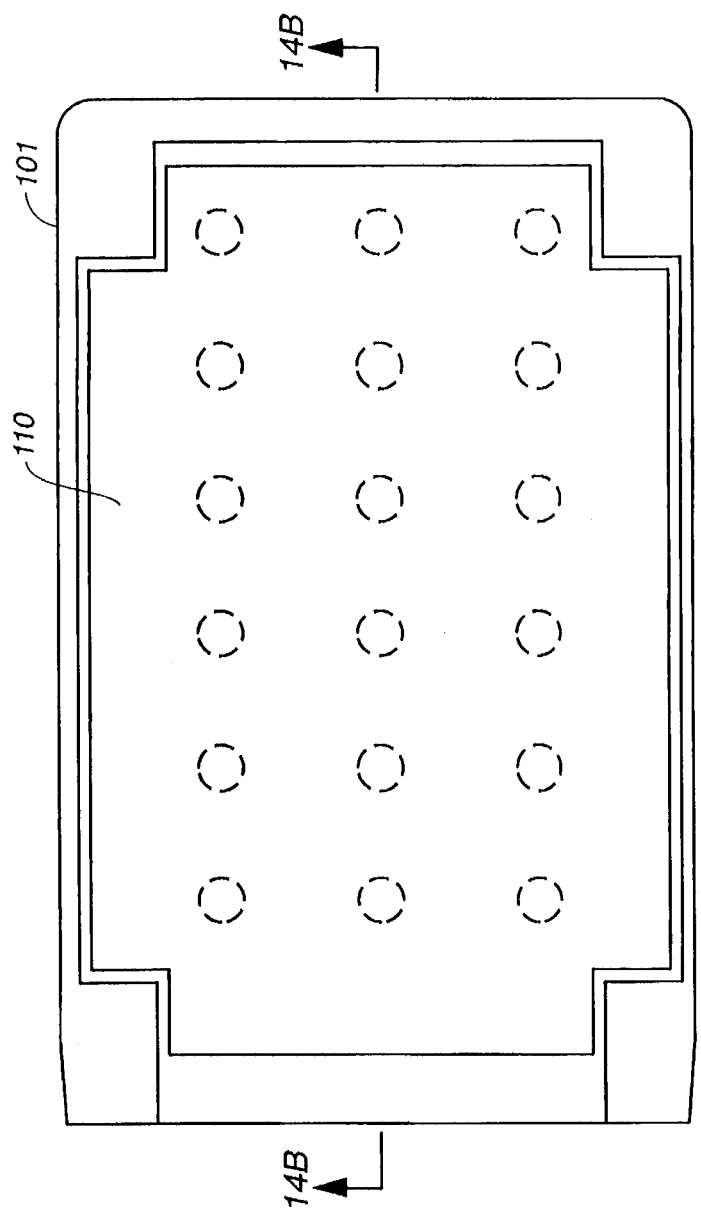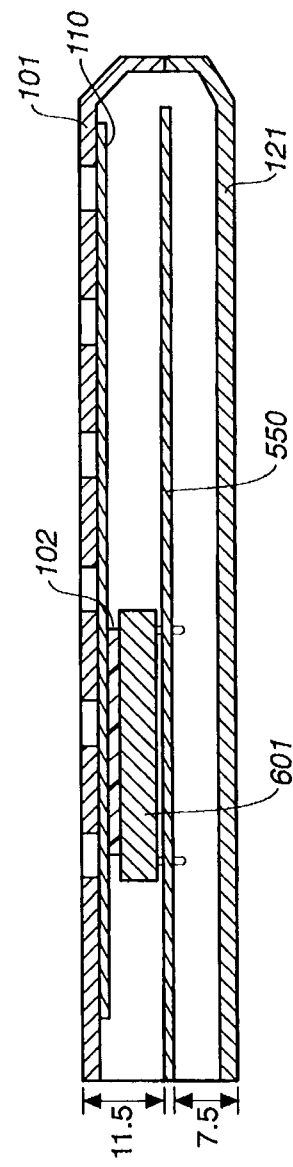
FIG._14A
FIG._14B

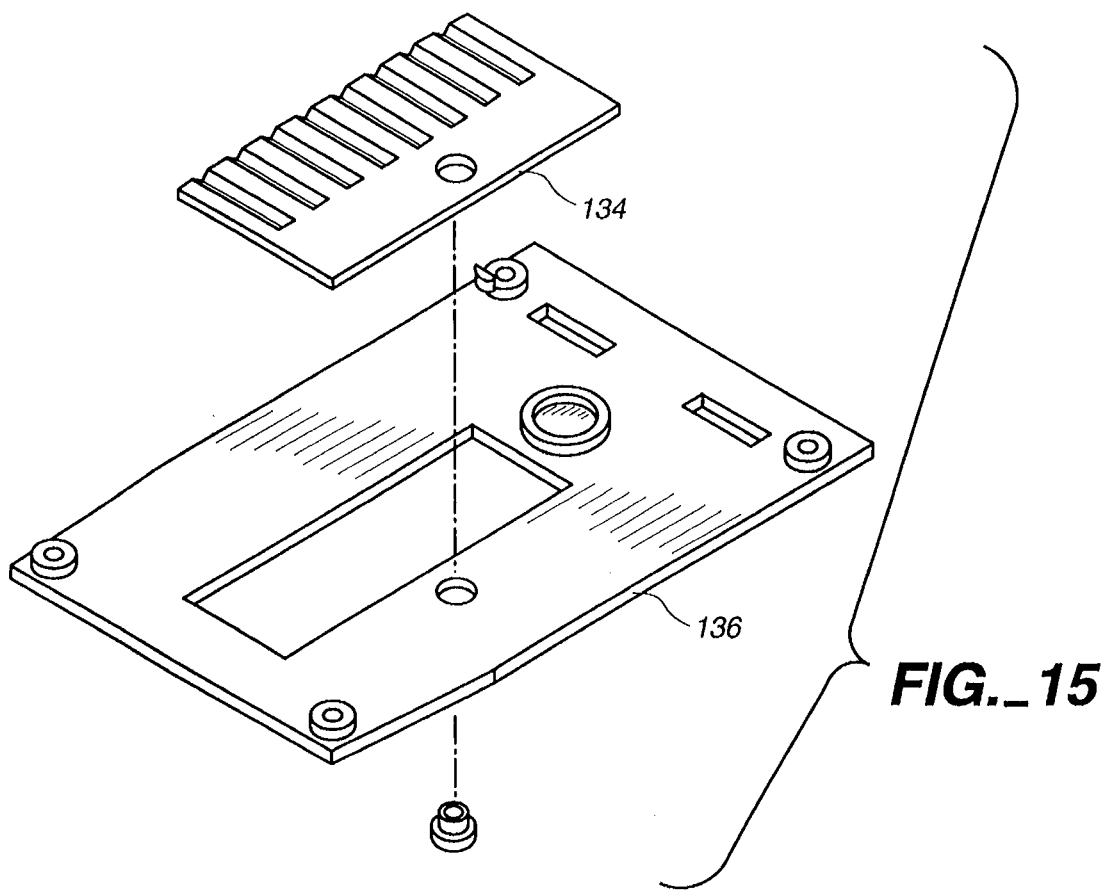
FIG._15
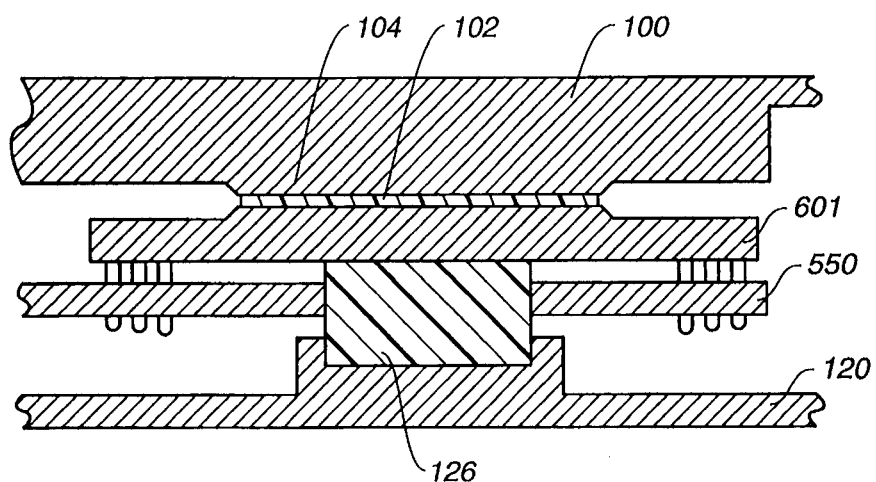
FIG._16

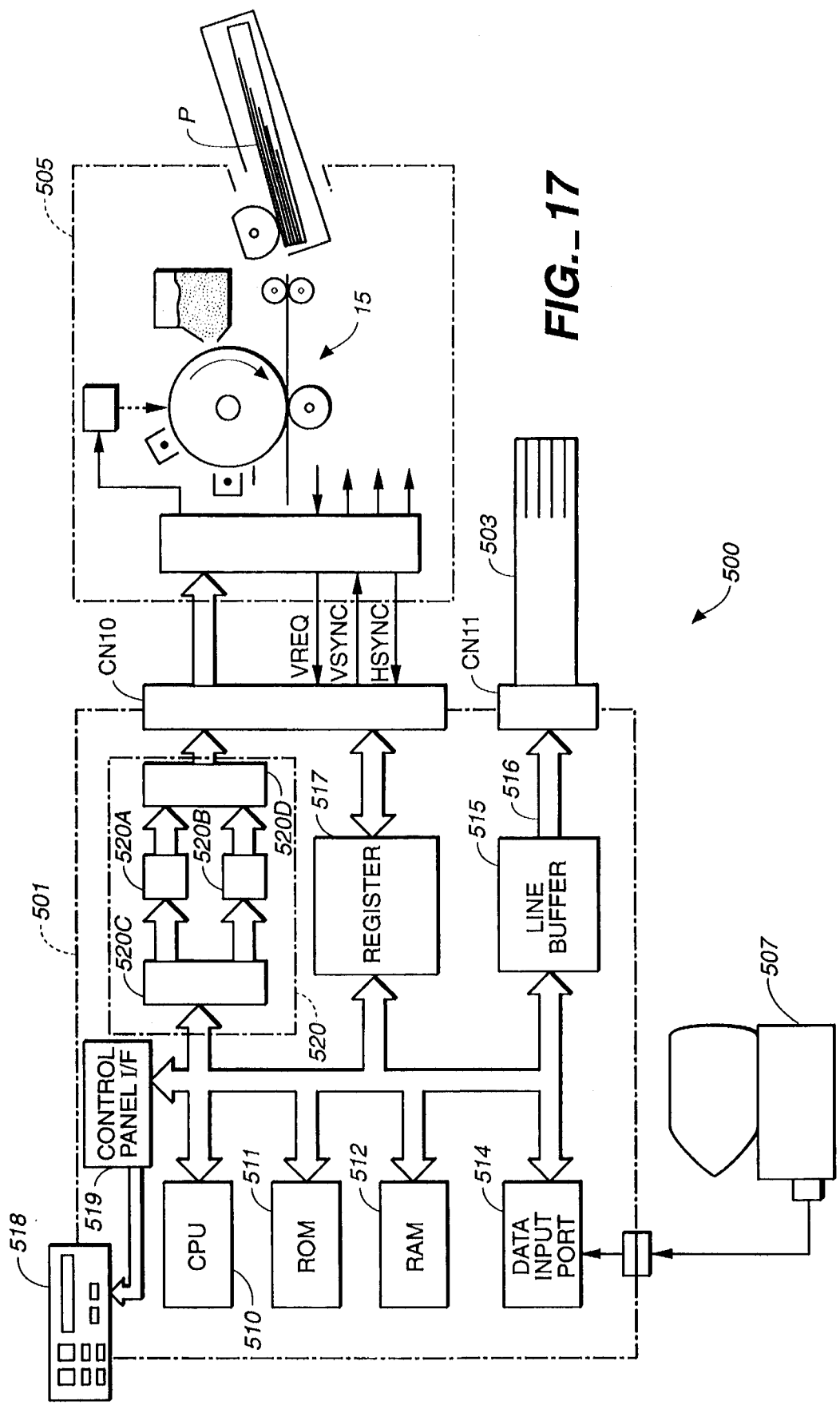
FIG._17

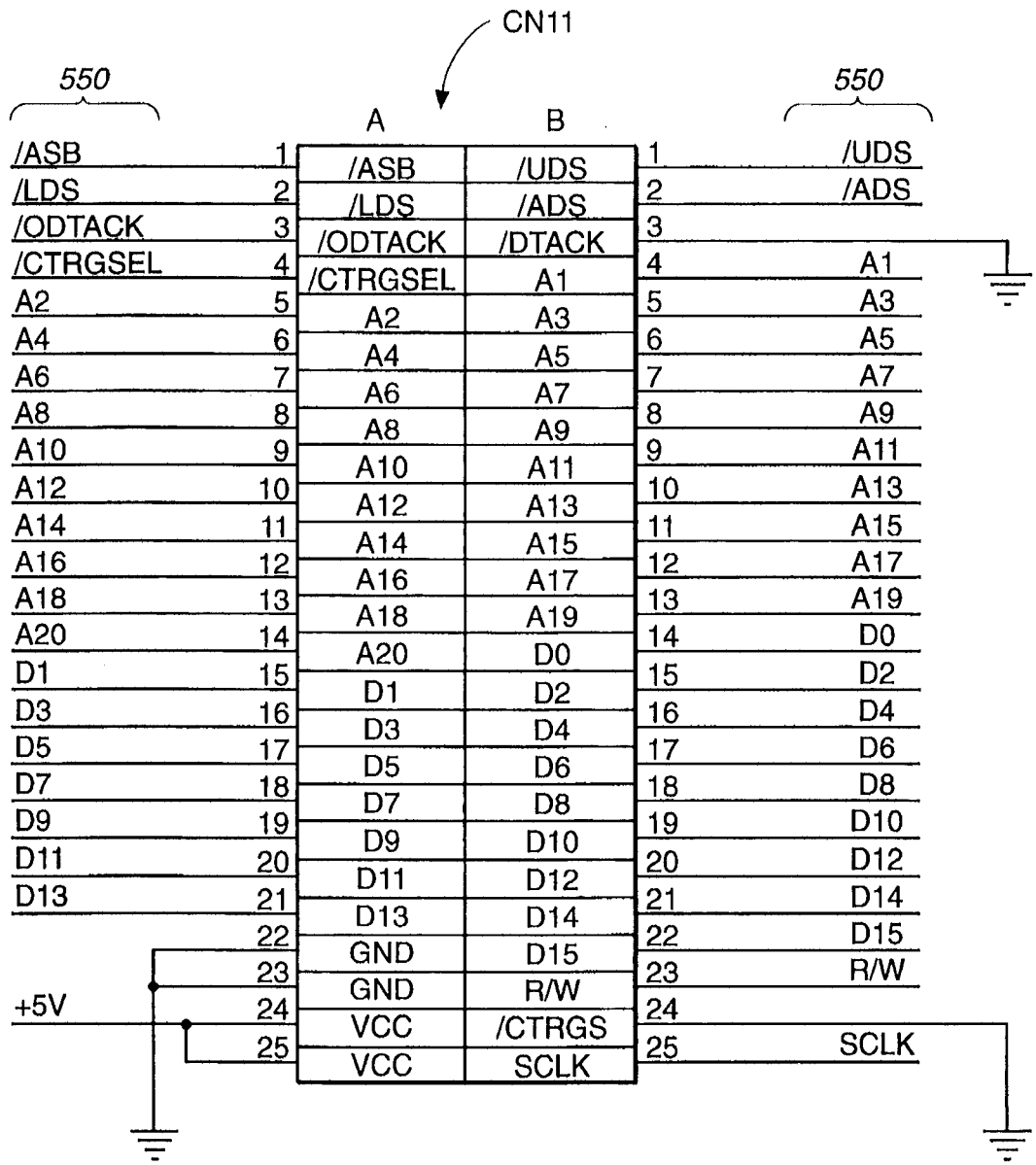
FIG._18
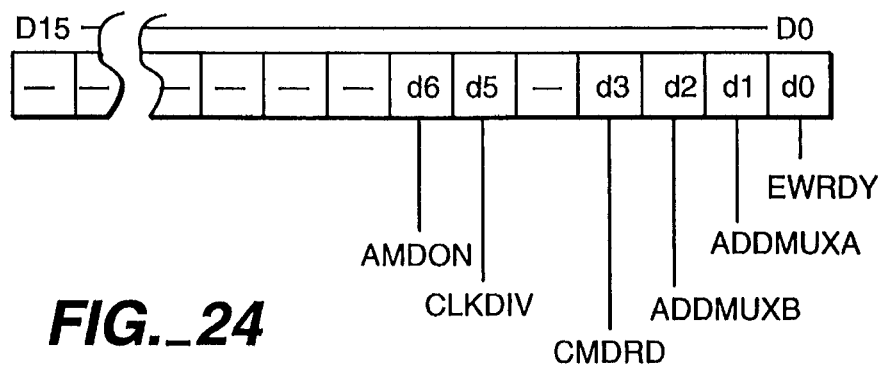
FIG._24

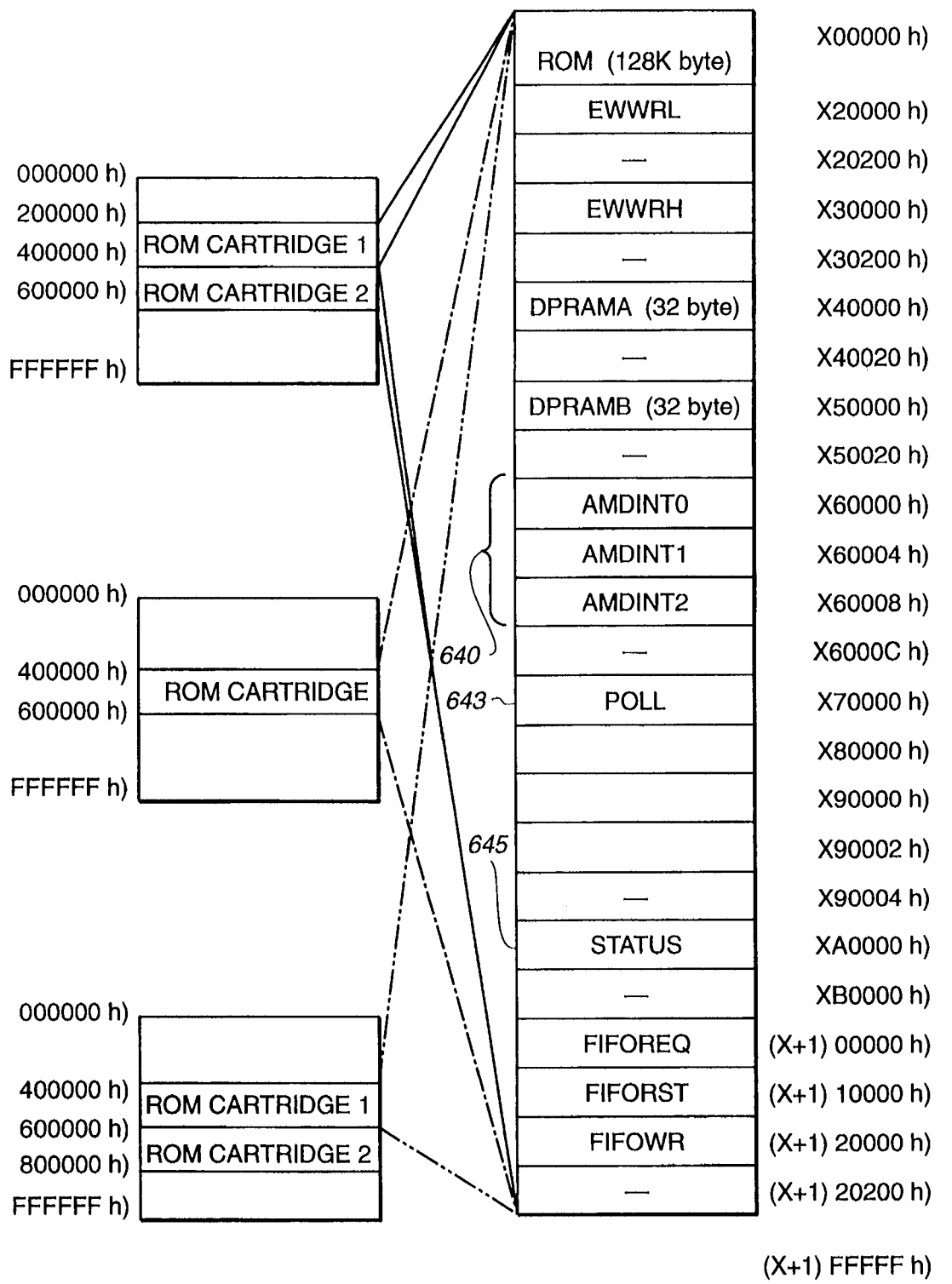
FIG._19

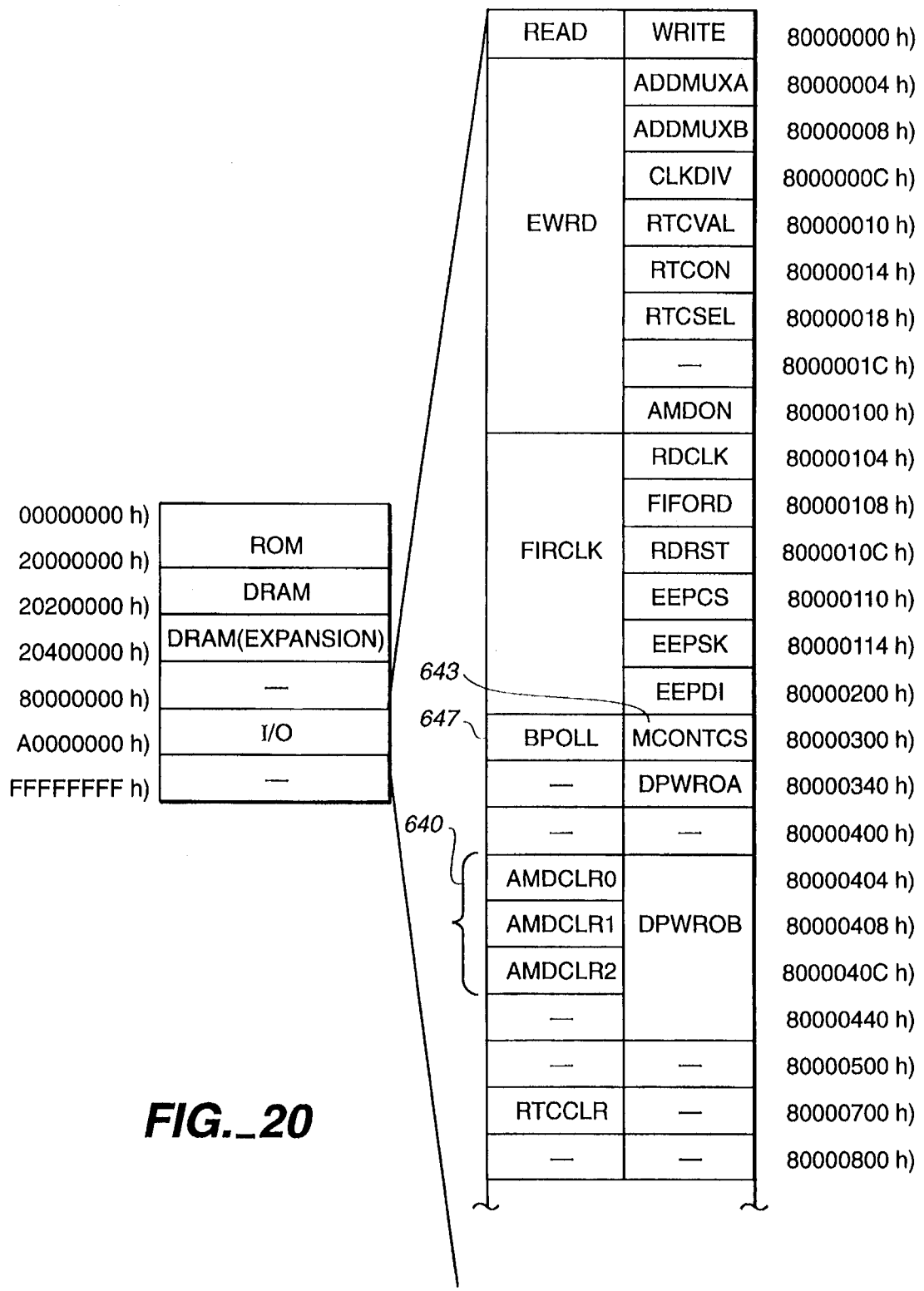
FIG._20

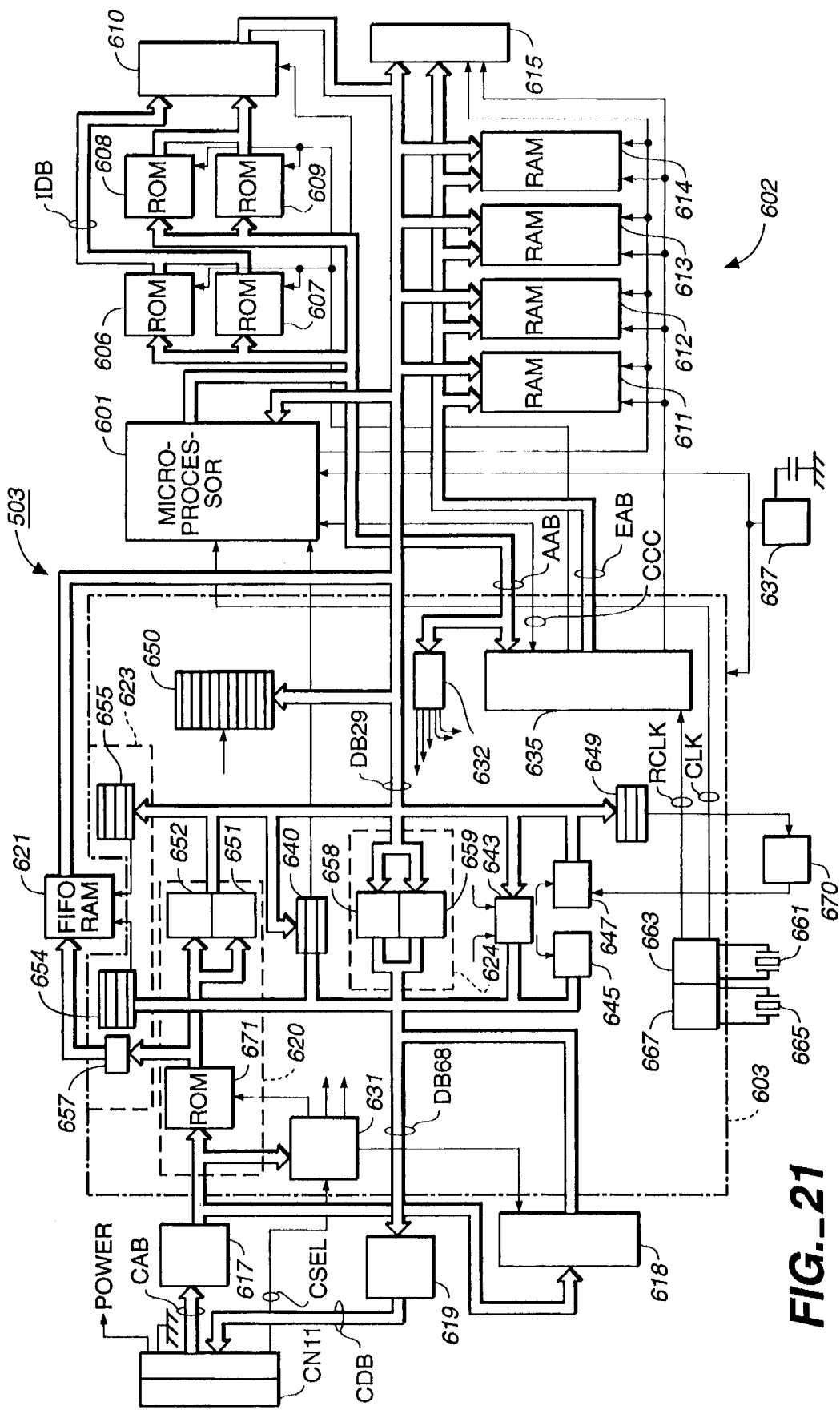
FIG._21

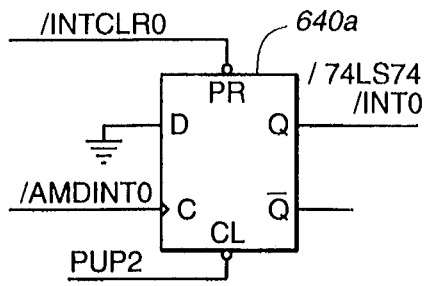
FIG._22A
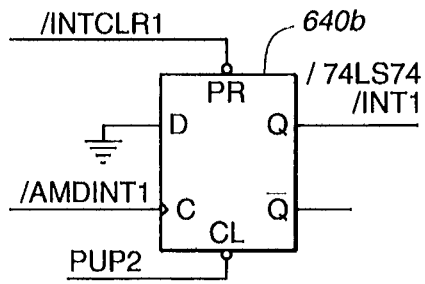
FIG._22B
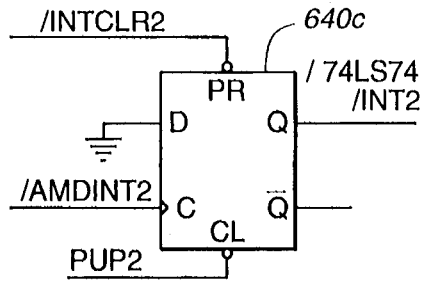
FIG._22C
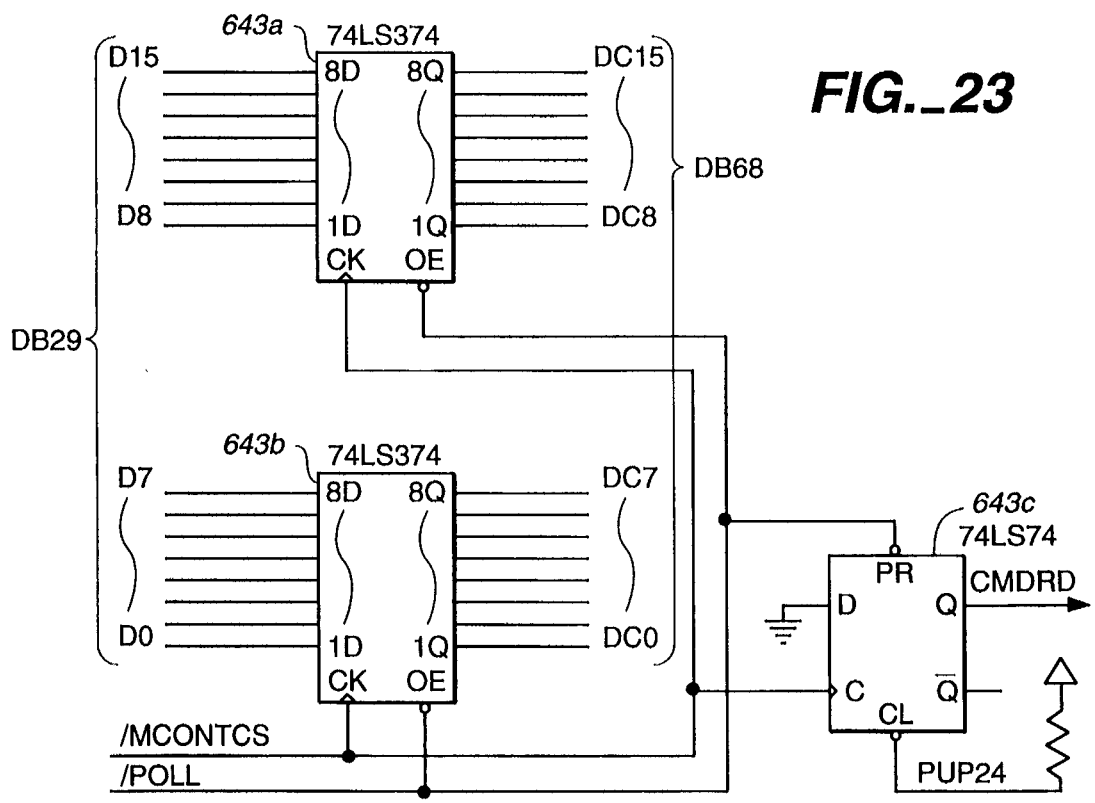
FIG._23

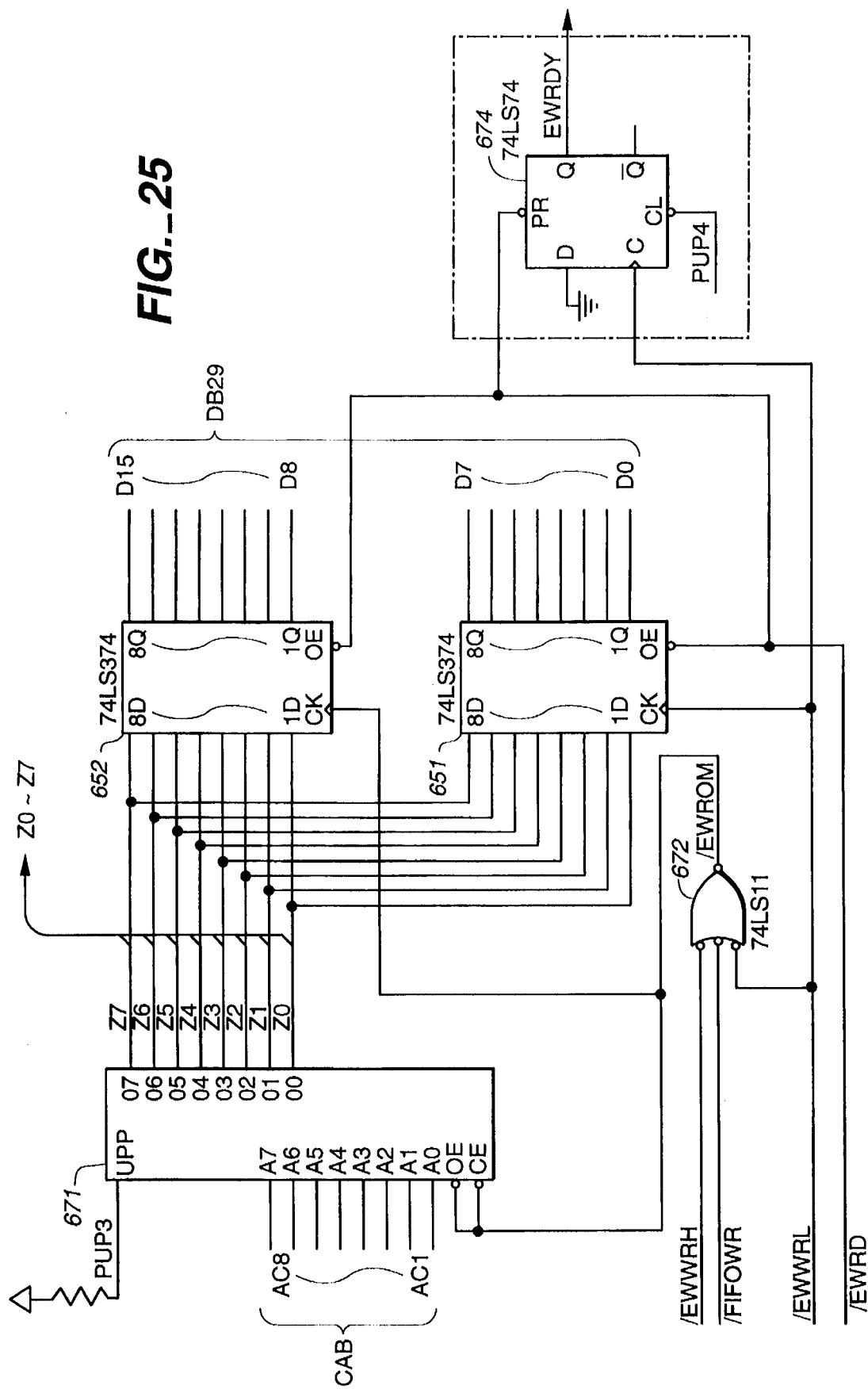
FIG._25

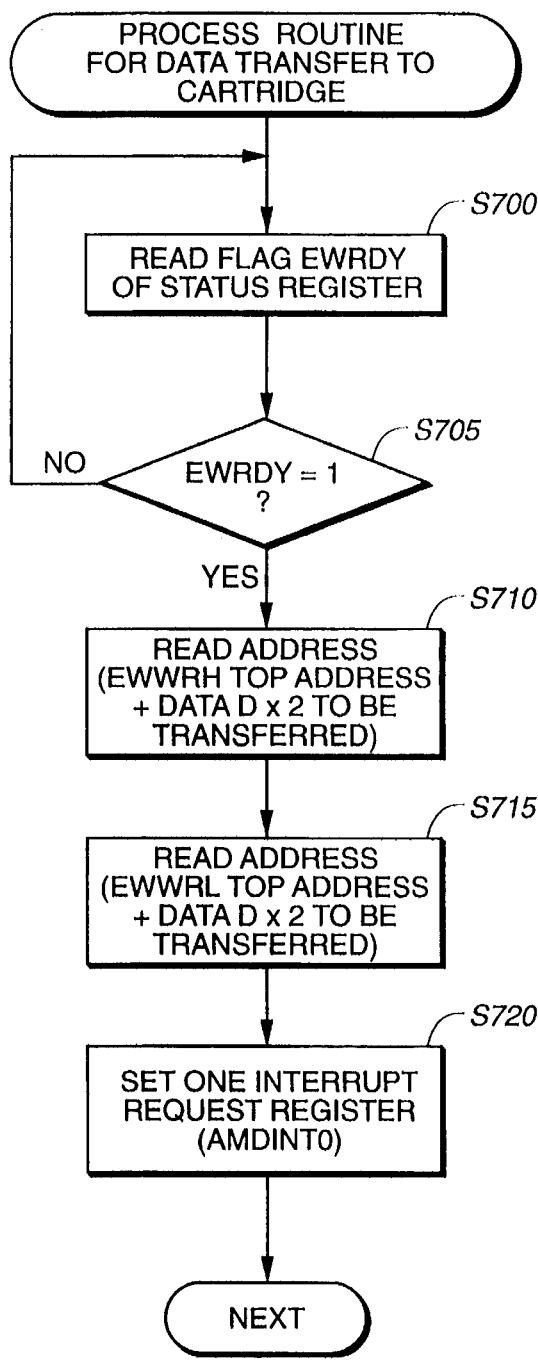
FIG._26
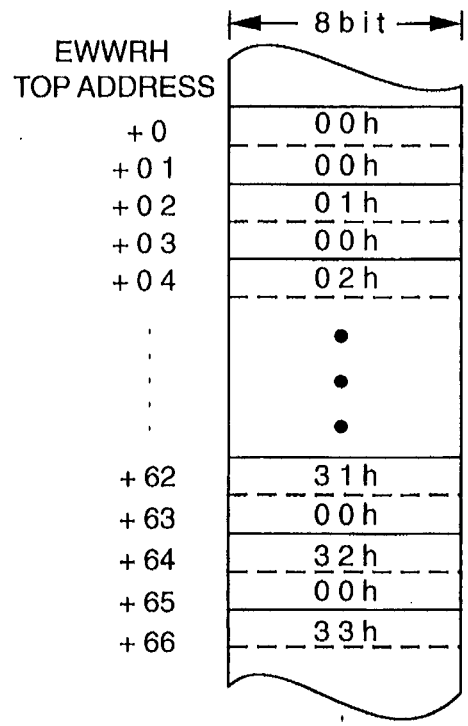
FIG._27
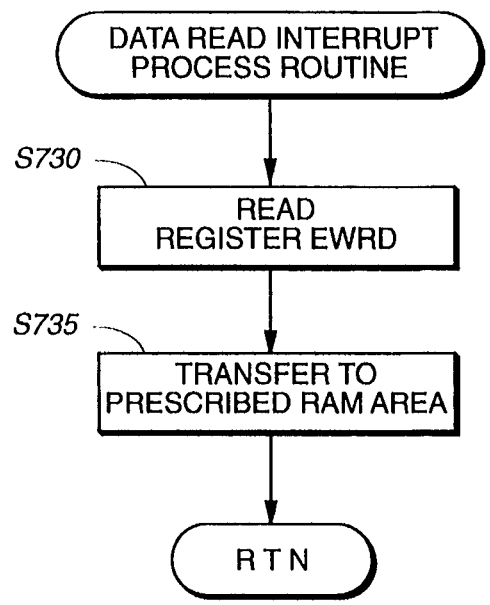
FIG._28

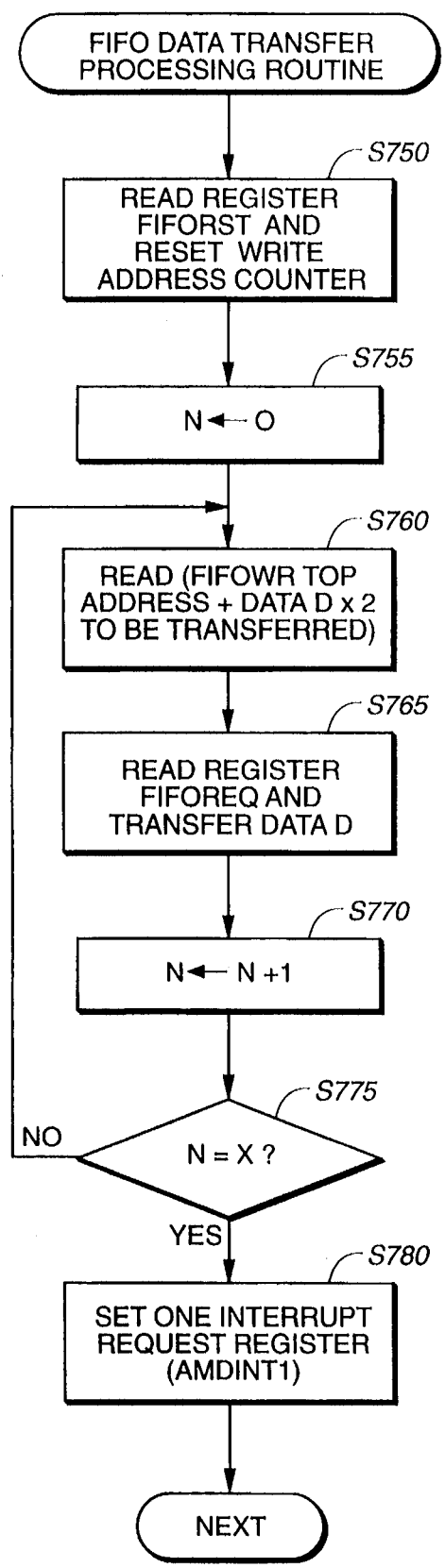
*FIG._29*
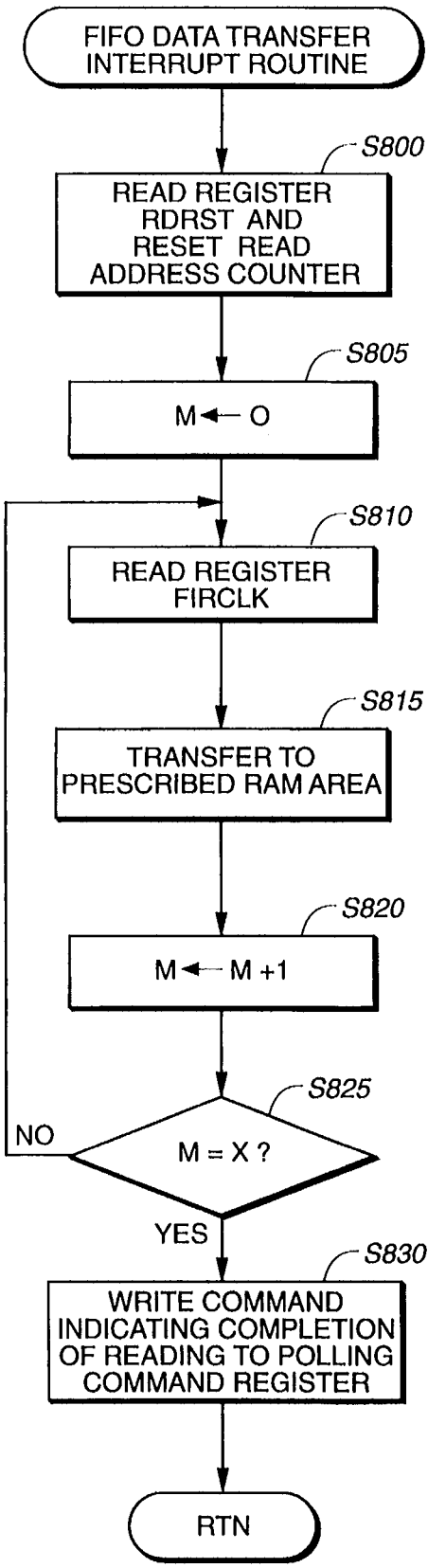
*FIG._30*

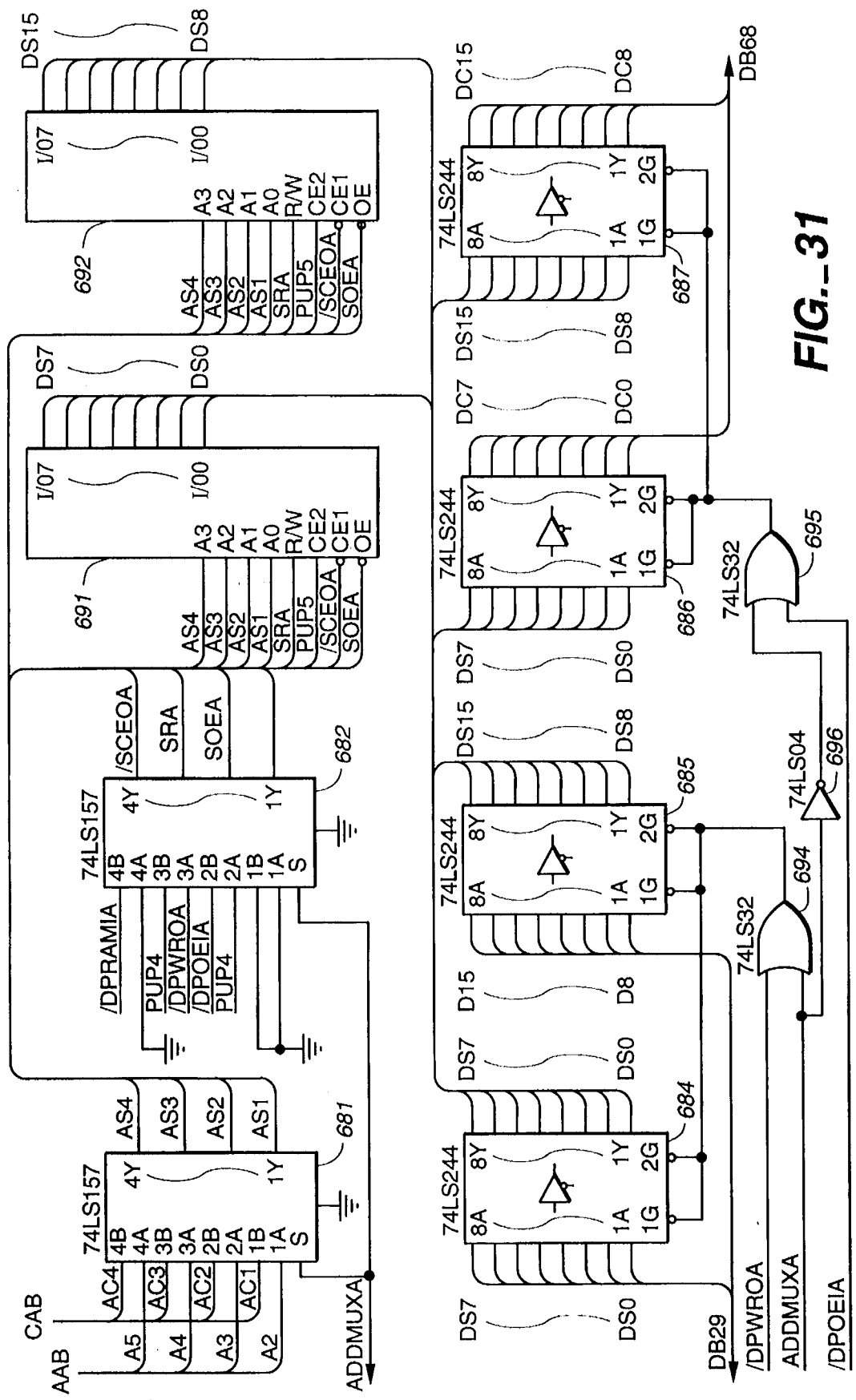
FIG._31

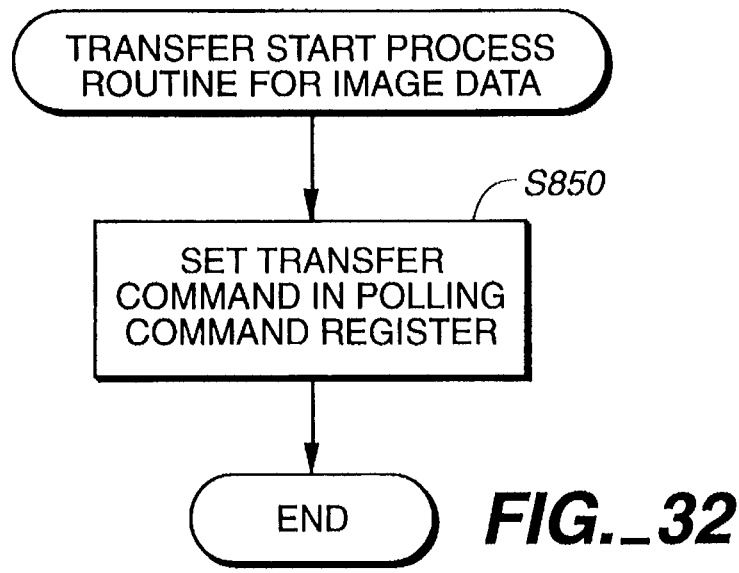
FIG._32
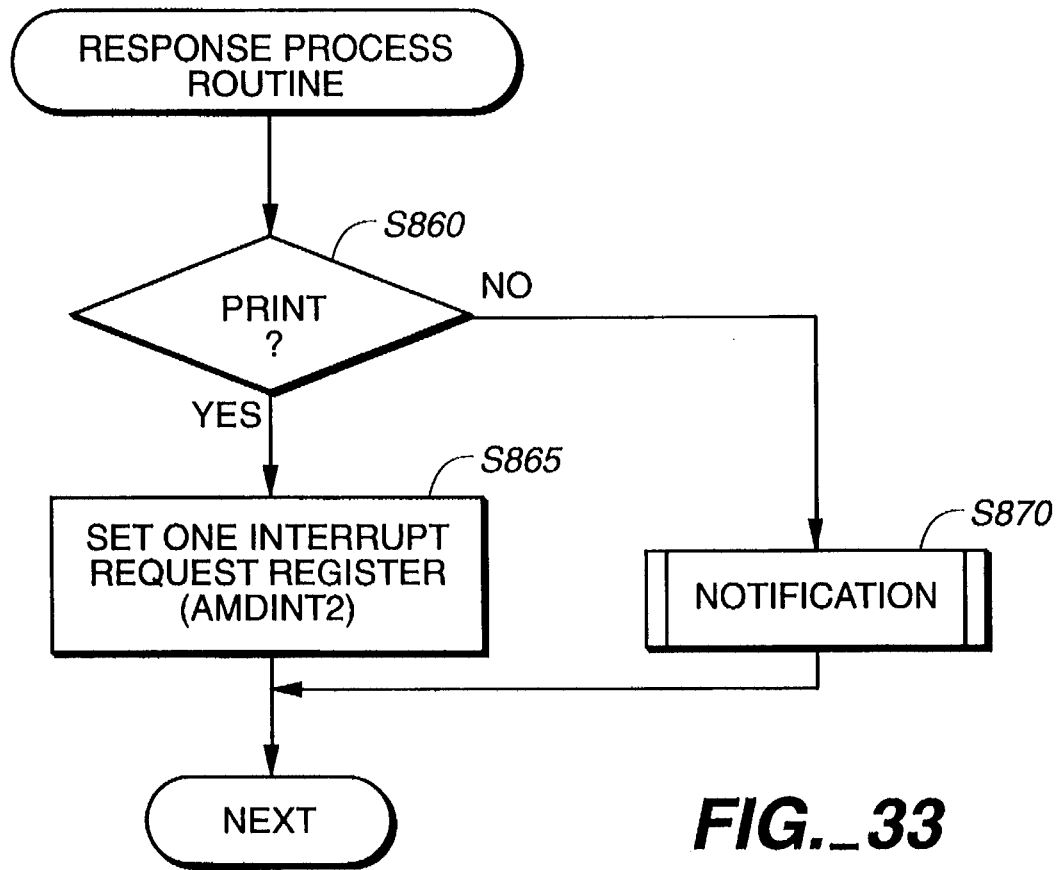
FIG._33

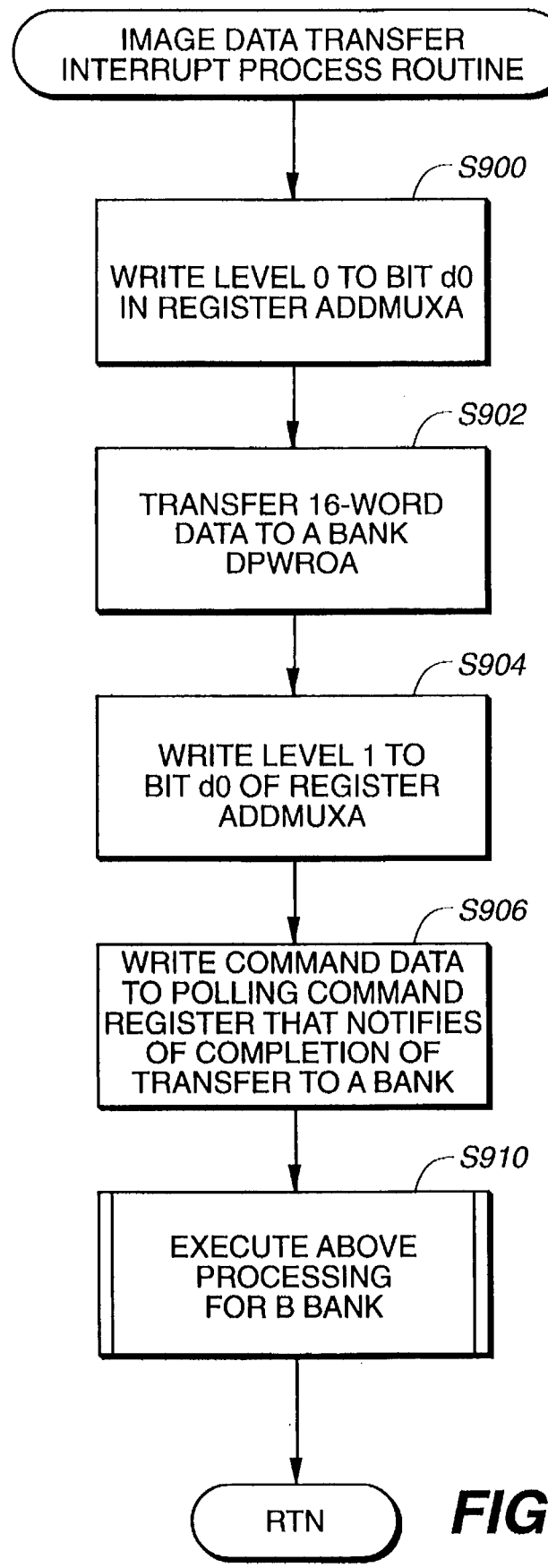
FIG._34

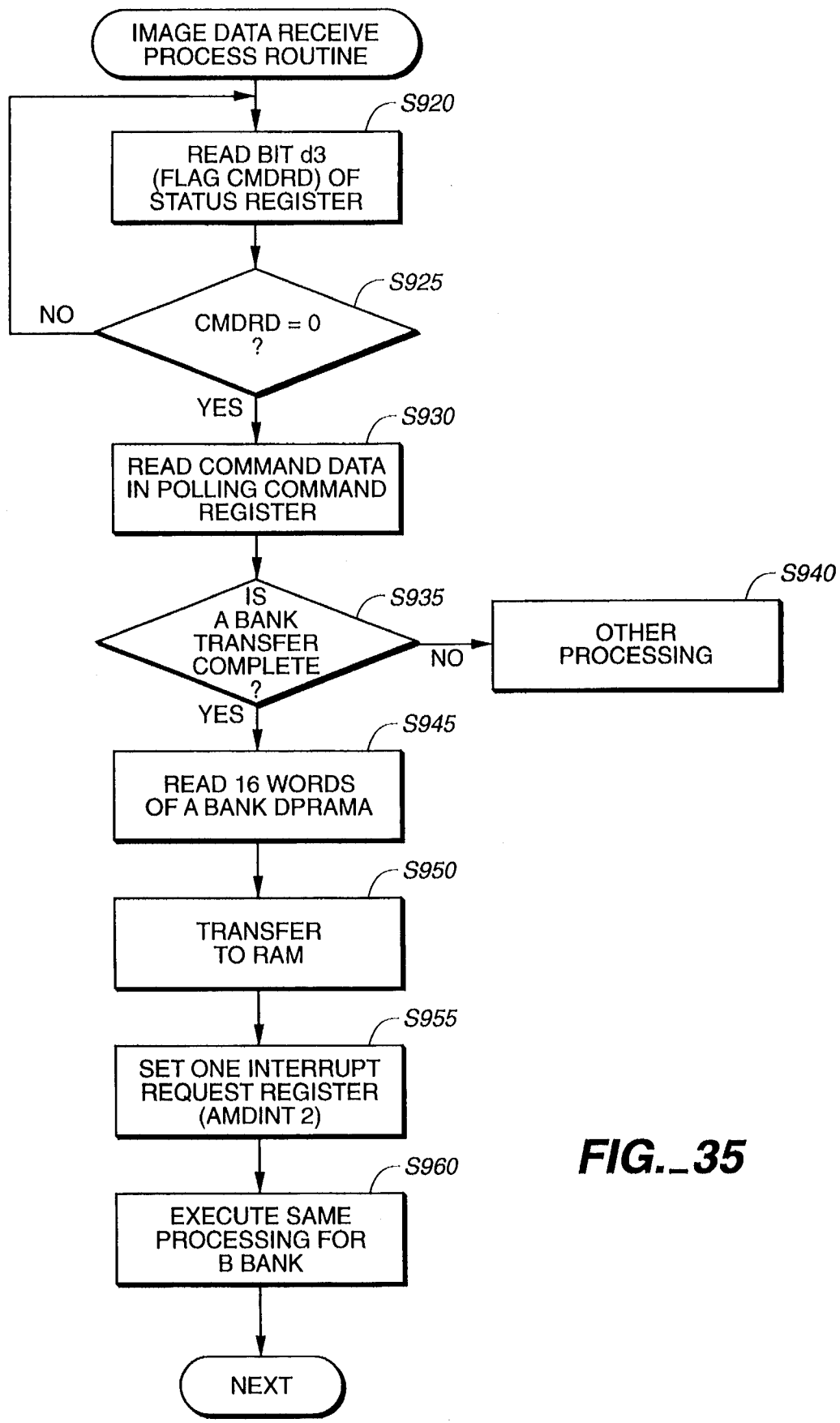
FIG._35

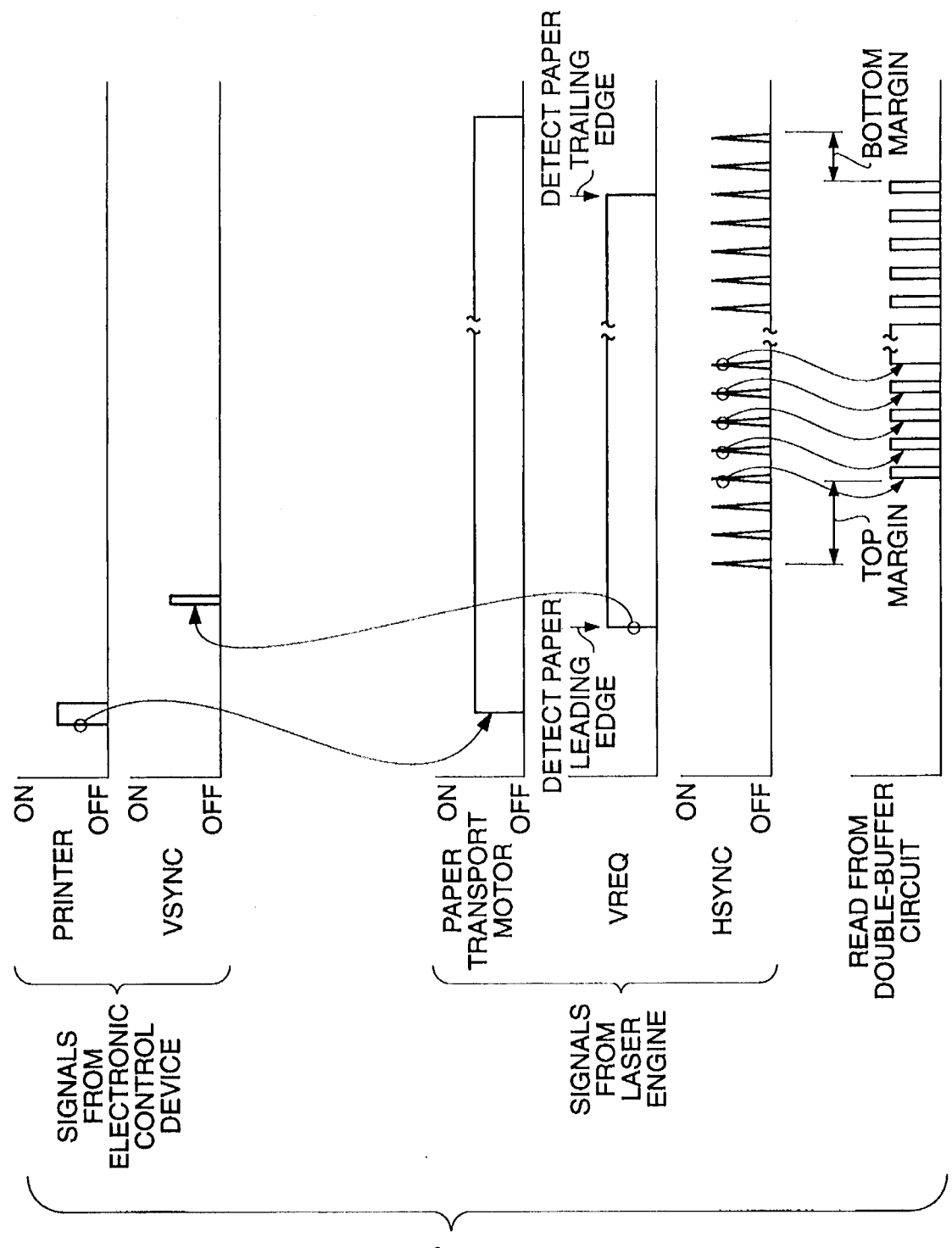
FIG._36

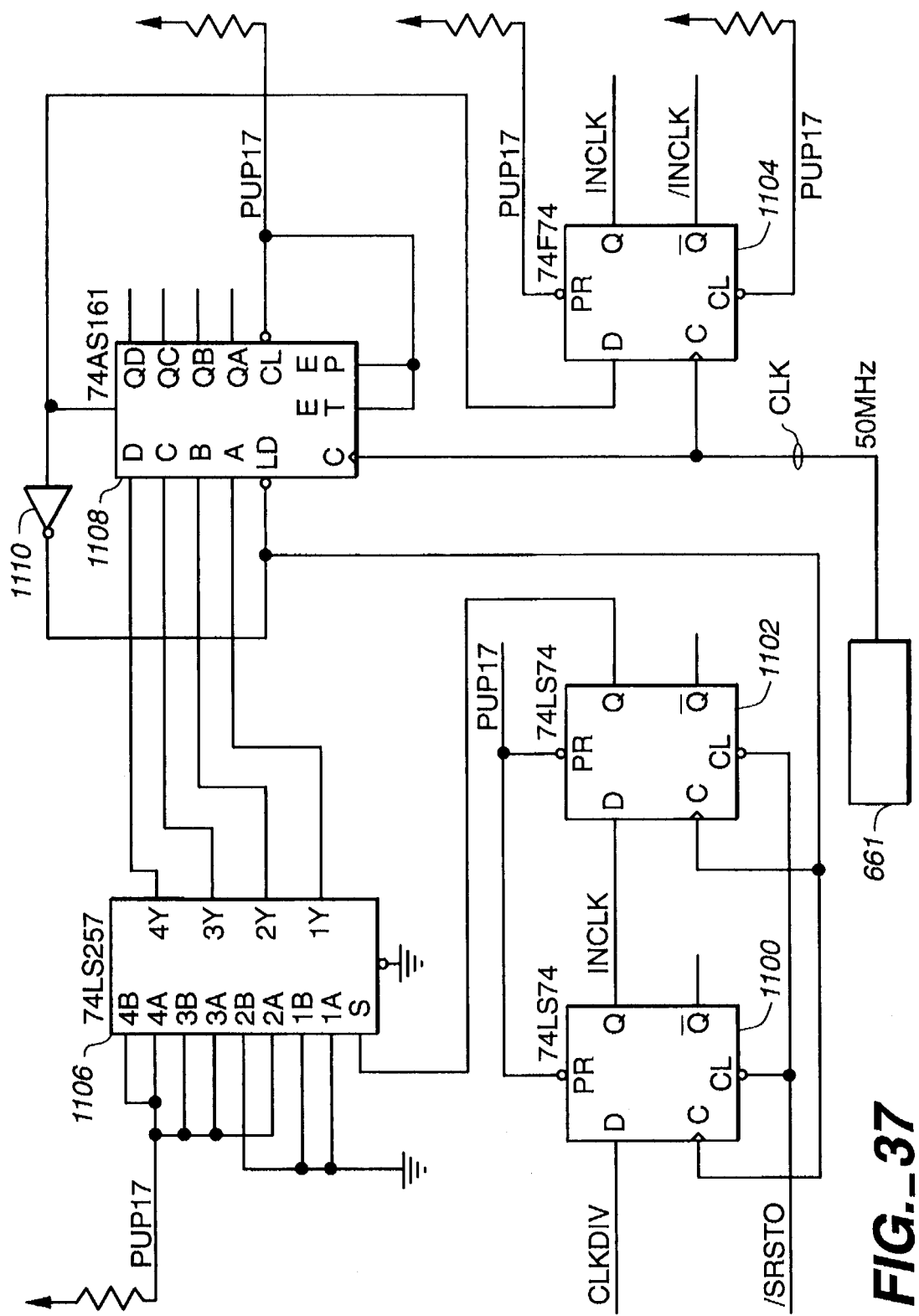
FIG._37

TEMPERATURE CONTROL FOR ADD-ON ELECTRONIC DEVICES

CROSS REFERENCES TO RELATED APPLICATIONS

This application also is related to the following other applications:

"INTELLIGENT CARTRIDGE FOR ATTACHMENT TO A PRINTER TO PERFORM IMAGE PROCESSING TASKS IN A COMBINATION IMAGE PROCESSING SYSTEM AND METHOD OF IMAGE PROCESSING", Wakabayashi et al., Ser. No. 07/816,455, filed Dec. 30, 1991, now U.S. Pat. No. 5,410,641.

"INFORMATION PROCESSING DEVICE IN AN ELECTRONIC APPARATUS UTILIZING AN ACCESSORY CONTROL DEVICE AND METHODS OF APPLICATION", Wakabayashi et al., Ser. No. 07/883,753, filed May 15, 1992, now U.S. Pat. No. 5,461,705.

"INFORMATION PROCESSING DEVICE IN AN ELECTRONIC APPARATUS UTILIZING AN ACCESSORY CONTROL DEVICE AND METHODS OF APPLICATION", Wakabayashi et al., Ser. No. 07/835,537, filed Jun. 8, 1992, now abandoned.

"ADD-ON ELECTRONIC DEVICE AND ELECTRONIC SYSTEM", Wakabayashi et al., Ser. No. 07/854,643, filed Jul. 1, 1992, now U.S. Pat. No. 5,437,041, issued Jul. 25, 1995.

"INFORMATION PROCESSING DEVICE AND THE ACCESSORY CONTROL DEVICE AND INFORMATION PROCESSING METHOD IT USES", Wakabayashi et al., Ser. No. 07/910,590, filed Jul. 8, 1992.

"APPARATUS TYPE IDENTIFICATION DEVICE AND METHOD THEREFOR", Wakabayashi et al., Ser. No. 07/908,671, filed Jul. 2, 1992, now abandoned.

"INFORMATION PROCESSING DEVICE AND THE ACCESSORY CONTROL DEVICE AND INFORMATION PROCESSING METHOD IT USES", Wakabayashi et al., Ser. No. 07/910,851, filed Jul. 7, 1992, now U.S. Pat. No. 5,461,704, issued Oct. 24, 1995.

"INFORMATION PROCESSING DEVICE AND THE ACCESSORY CONTROL DEVICE AND INFORMATION PROCESSING METHOD IT USES", Wakabayashi et al., Ser. No. 07/911,558, filed Jul. 7, 1992.

The foregoing listed applications are incorporated herein by reference thereto.

BACKGROUND OF THE INVENTION

1. Field of the Invention

The present invention relates generally to add-on electronic devices for providing additional or new operating features for existing electronic systems, and more particularly to a method and apparatus for cooling components in such add-on devices. The invention further relates to methods of dissipating heat in plug-in type add-on circuits having at least one microprocessor coupled to other data processing elements.

2. Related Technology

In recent years, digital electronic equipment, such as, personal computers, word processors, work stations, and other electronic equipment using built-in microprocessors, such as printers, facsimile machines, memo devices, musical instruments, cooking equipment, and cameras, has found extensive use throughout large segments of society. In addition, other widely used equipment such as automobiles, robots, numerically controlled machines, and a variety of other electrified products, now make use of microprocessor technology.

The application of programmable digital logic to equipment operation makes more flexible control possible compared to that obtained with simple feedback controls previously used with various fixed hardware designs. In addition, using programmable logic, operating functions are essentially altered by simply changing command software. One advantage of this approach is that totally different control operations are obtainable for a given piece of equipment or hardware by simply modifying the content of program storage or memory elements, such as ROMs, that store specific processing or program steps. Moreover, smaller incremental changes in function, such as design revisions, can be advantageously implemented by only upgrading software.

However, the ultimate capabilities of processor controlled electronic equipment are determined by the capabilities of the processor itself. That is, each processor is itself finally limited by operating characteristics such as the maximum number of processing steps obtainable per unit time, the maximum number of data bits that can be processed at one time, the width of any data or command transfer buses, and so forth. As a result of these limitations, achieving improvements by merely upgrading software versions is at best limited to improving equipment ease of use. In reality, it has not been possible to achieve large improvements in operating features for existing electronic equipment.

At the same time, improving or upgrading software versions often requires replacing a ROM or other memory element containing the software. It is much more difficult to obtain access to or change software when replacement of such code containing ROMs is required. As a result, revising software to improve equipment operation is actually very difficult unless the particular piece of electronic equipment is already scheduled for a ROM exchange, different ROM version, at the time of its initial design, or unless the software can be supplied on a replaceable medium such as a flexible disk and used to modify stored program material.

For some applications, devices called "accelerators" are used in an attempt to improve overall function or capabilities by completely replacing key control components, such as microprocessors, within electronic equipment which otherwise limit operation. This type of hardware "upgrade" is commonly encountered with personal computers. However, this approach requires replacing a microprocessor which is generally located on a "motherboard" within the apparatus and represents a task that is beyond the skill of most equipment users. Furthermore, for typical consumer electronic equipment such as the previously mentioned printers, facsimile machines, musical instruments, cooking equipment, cameras, automobiles, etc., absolutely no consideration is commonly given to providing for such improvements or upgrading functionality and no such hardware option exists. A good example of this lack of planning is seen in relation to page printers which are manufactured for use with computers.

In recent years, page printers, such as laser printers, have enjoyed widespread distribution and are rapidly becoming the leading device for high-speed data and image output from computers. The resolution of laser printers typically ranges from 240 to 800 dots per inch (dpi), and printing speed is on the order of several pages a minute. Such printers principally employ an electrophotographic printer element, such as a xerography unit, which uses a photo-sensitive drum as part of the printing engine. After the printer has received and stored one page of image data (or blank), image processing steps, that is, electrostatic charge, exposure, toner application and image transfer, take place continuously in synchronization with rotation of the photo-sensitive drum.

Therefore, the page printer memory capacity for image development or processing must be sufficient to store at least one page of image data at a time. If no image data compression is employed, this capacity is determined by the printer resolution being used and the page size to be accommodated. For example, if a resolution of 300 dpi and a page size of 8 by 10 inches are considered, the printer may handle as much as 8×300×10×300 or 7,200,000 dots, or pixels, of image data, which requires at least 0.9 megabytes of memory capacity. Moreover, if the print or image input data is in the form of a bit mapped image to be printed, the printer only needs to accept and sequentially store this data before image processing. The processing speed for this type of operation generally depends on, and is limited by, the data transfer rate. Since parallel data transfer, such as that complying with the Centronics specification standard, occurs at a very high rate, it is unlikely that data transfer of bit images will occur slower than the printing capability of the xerographic unit.

However, where printers receive and process other types of data, such as character codes, line positions, and line and character pitch, and then develop this data into a page image, or receive programs that describe the page using a page description language (PDL) and then interpret and process this information to generate a page image, requires arithmetic processing and generation of bit mapped images from the input print data. In comparison to directly transferring a simple bit image, the extra image processing incurred imposes a major reduction in overall printing speed. That is, the image output speed of the printer is now substantially determined, or limited, by the speed with which the processor performs image processing and memory access times which combine to create much slower transfer rates than the xerography unit is capable of handling, resulting in a major reduction in printing capability.

For example, when considering a page printer rated for ten pages a minute, no more than six seconds are allowed for processing image data for each page to be printed. To process all 0.9 megabytes of stored data into an image within this time span, only allows 6.67 microseconds of processing time per byte of data (6 seconds divided by 0.9 megabytes). Such short processing periods represent a processing capacity that may or may not be realizable even with currently available high-speed RISC type processors. In contrast to this processing limitation, the electrostatic charge and photosensitive elements of a laser printer are often capable of easily printing ten or more pages per minute. As a result, under the current state of the art, the processing capability of the image data control unit represents a major stumbling block in improving overall printing speed.

Many page printers are provided with either an internal memory expansion capability or an expansion slot to provide some additional processing capacity. Where an expansion slot is provided, insertion of an "add-on" or expansion "cartridge", here containing font information or a program, expands printer functionality. The addition of pre-formed fonts and font control language to the printer may speed image formation by alleviating the need for some image processing steps. However, even if processing speed is increased using some form of memory expansion, it is not possible to improve the processor performance itself. For example, for a laser printer only supporting one particular PDL, it is common knowledge that PDL interpreter programs are available in the form of integrated circuit cards and add-on cartridges for expanding processing functions to accommodate other page description languages. Such cartridges store programs, or special program routines, in mask ROM form for recall during image processing, and are inserted into the expansion slot of the printer. But the basic printer processor is unchanged and may even run slower implementing these routines.

Expansion cartridge slots have a specific address, or address range or space assigned to them which is detected and read by a printer control unit after power is applied to the printer. If a cartridge containing a PDL interpreter program has been inserted, and, therefore, resides at the appropriate addresses, a pre-selected code is returned to the controller to indicate that the cartridge contains a PDL program. In this situation, control of the printer for image data developing switches to the interpreter program which is read from its address locations inside the cartridge. As a result, the printer is able to interpret data received which is based on use of the particular PDL used by the cartridge program. The use of an interpreter program does not itself increase the processing speed and the overall printing speed may in fact decrease as a result of employing a high level description language with the printer processor.

For this and other reasons, a cartridge equipped with at least a second microprocessor separate from that normally used by the printer has been invented to resolve the problems described above. This cartridge and certain of its features are disclosed in the co-pending U.S. patent applications listed above which are incorporated herein by reference. The disclosed cartridge is able to receive print data from the printer and use its own microprocessor to process and develop image data based on stored PDL interpreters and other program data, and then provide print data back to the printer for forming the desired output image.

However, any advanced microprocessor comprises an electronic circuit having from tens to hundreds of thousands of components or elements, such as transistors, which operate, or switch between operating states, at frequencies of 20 MHz to 40 MHz, or higher. As a consequence, such microprocessors typically generate substantial amounts of heat during operation, increasing the operating temperature of the microprocessor structure, and potentially generating errors or causing physical deterioration and destruction if the heat is not adequately dissipated.

In order to prevent processing errors and destruction of the add-on microprocessor device, the microprocessor housing or casing is typically designed to maintain a maximum temperature of about 80° C. In order to maintain the surface temperature of the casing within tolerances, or colder, it is important to devise a cartridge structure that makes it easy to dissipate heat from the microprocessor or other heat generating components within the cartridge to the surrounding environment.

However, to date, expansion cartridges have not used microprocessors and there has been no need for, nor effort expended to create, a cartridge heat dissipation structure. The heat dissipation problem for add-on cartridges or integrated circuit assemblies is not limited to printers but also extends to other add-on products having microprocessors or other sophisticated components. In general, it is a common problem with add-on electronic devices that are installed in most electronic equipment.

What is needed is a new method and apparatus for dissipating heat generated in add-on circuits especially of the cartridge-type and for minimizing heat accumulation.

SUMMARY OF THE INVENTION

In order to solve the problems encountered in the art, one objective of the present invention is to provide an add-on electronic device for use on electronic apparatus or systems which has sophisticated processing capabilities and is able to effectively cool internal circuit components.

One purpose of the invention is to provide a technique for more efficient heat dissipation for an expansion cartridge type of electronic add-on device.

One advantage of the invention is that a cost effective minimum complexity solution is provided for heat dissipation problems.

These and other purposes, objects, and advantages are realized in an add-on electronic device for use in electronic apparatus having an add-on connector configured to receive add-on devices, and at least a first processor for performing certain predefined logical operations and executing processing steps stored in a first memory connected thereto, at least an address signal line of the first processor coupled to the connector, and an address output element that converts print and command data into address signals and outputs them through the connector. The add-on device is inserted into or otherwise coupled to the connector and has a second processor which performs image data processing in a different capacity than, or substantially independent of, the first processor, a second memory for storing processing steps for execution by the second processor, and a data removal element that removes or extracts data encoded in the address signals being transferred from the address output element. The add-on device is configured with a mounting area for those circuit components which generate substantially the largest amount of heat within the add-on electronic device which is relatively centered in an volume extending from an approximate center to a front end of the add-on electronic device relative to the direction of insertion in the connector. Generally, the second processor is the major heat producing component.

With high heat generating circuit elements placed in an area between the center and front end of the add-on electronic device, even where the add-on device is not inserted very deep inside of an electronic device housing, these circuit elements are in an internal volume of the electronic device that is more exposed to surrounding, cooling, air. In addition, the electronic apparatus typically has a fan for cooling the inside of the housing which increases airflow around the add-on device. At the same time, a thermally transmissive apparatus frame may also be positioned within this region. As a result, components for the add-on circuit are typically cooled more effectively.

The add-on electronic device preferably uses a circuit board mounted inside of a casing or a shell to support the various electronic elements or components used in the add-on device. The casing is manufactured from a material that is thermally conductive with a thermal conductance rate of at least about 1W/m·K which makes it relatively easy to effectively dissipate heat to a surrounding environment. Although not necessary, in preferred embodiments the casing has at least one metal surface, while an entirely metallic casing body is most preferred. Manufacturing the entire casing from materials such as aluminum, bronze, or their alloys, increases the thermal conductance rate and increases the thermal loading that can be accommodated for specific applications. Since a metal casing functions as a heat sink, it effectively dissipates heat from internal circuit devices while also providing electro-magnetic shielding.

In further aspects of the invention, thermally conductive material is installed between the top surface of the second processor and the casing so as to provide an additional thermal transfer path. This heat dissipating material may be provided in an elastic, such as rubber, liquid, or gelatinous, form to provide improved conformal properties. If the conductive material employed adheres firmly, or conforms, to the surfaces of the second processor and the casing, the thermal resistance between these materials will be reduced. In addition, a layer of packing or adhesive material may be disposed between the top surface of the second processor and the heat dissipating material.

An elastic component may be used to push or bias the second processor to move in a direction which moves the top of the second processor toward an opposing casing wall. This elastic component increases the physical and thermal contact of all of the components from the second processor to the casing, allowing a further decrease in the thermal resistance across this heat transfer path. This elastic component may extend through an opening in the circuit board, as appropriate, and be mounted between a bottom surface of the second processor and the casing. By so doing, heat is also dissipated through this elastic component to other portions of the casing, allowing even more effective heat dissipation. A preferred material for the elastic component is a silicon rubber which has a high thermal transfer rate for good heat dissipation, and good elasticity.

In another aspect of the invention, an opening is formed in part of the casing adjacent to the top of the second processor so that circuit devices within the add-on electronic device are cooled using air convection currents. Even when the casing is made of plastic, it is desirable to at least make an opening in the casing area near the second processor. To further improve heat dissipation through convection, one or more air or ventilation holes are formed in walls of the casing remote from the second processor. Heat transfer through convection is enhanced by using air passages on an end of the casing that typically extends outside of the electronic apparatus. Heat conduction is also improved when these passages are formed as part of a series of cooling ridges or fins which increase the casing surface area exposed to air outside of the apparatus.

It has also been found advantageous to mount any component circuit board so that it is offset from a centerline of the casing so that the interior volume is divided into a first comparatively larger volume and a second comparatively smaller volume. The second processor is then positioned within the first volume to reduce air resistance or improve air flow around the second processor, allowing more effective cooling.

To diminish or inhibit heat accumulation, the second processor, or other heat generating components, is operated using a clock signal from an oscillator circuit that employs a frequency adjusting circuit capable of detecting whether or not circuit elements within the add-on device are performing image processing. The frequency of the clock signal is adjusted to a lower setting, preferably equal to or less than one-half its normal frequency, when a specified circuit component, typically the second processor, is not processing data during any pre-determined time period. The new frequency of the clock signal can be set as low as zero if desired. This reduces the amount of heat generated during the specified time period. Typically, the first processor in the electronic apparatus is used to detect operating states for the add-on device and to prompt the frequency adjusting circuit. However, the second processor can be configured for this role as well.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is an exploded perspective view showing one embodiment of a cartridge structure constructed according to the principles of the present invention;

FIGS. 2A and 2b illustrate a layout for components mounted on top and bottom surfaces of a printed circuit board in the cartridge of FIG. 1;

FIGS. 3A to 3D illustrate a top part of a casing for the cartridge of FIG. 1;

FIG. 4 illustrates a cross section of the cartridge of FIG. 1 as assembled;

FIG. 5 illustrates an enlarged view of a microprocessor used in the cartridge of FIG. 1 showing major components;

FIGS. 6A and 6B illustrate a spring component for use on the lower casing of the cartridge of FIG. 1;

FIG. 7 illustrates a perspective view of the cartridge inserted into a first type of printer;

FIG. 8 illustrates a cross sectional drawing of both an inserted cartridge and a printer frame for the first type of printer;

FIG. 9 illustrates the printer of FIG. 7 with a top panel removed and no cartridge inserted;

FIG. 10 illustrates the printer of FIG. 9 with the cartridge inserted;

FIG. 11 illustrates a perspective view of an upper cartridge casing with air holes;

FIG. 12 illustrates a perspective view a second type of printer with a cartridge inserted;

FIG. 13 illustrates an equivalent thermal circuit for heat dissipation through an upper casing;

FIGS. 14A and 14B illustrate a plastic cartridge casing;

FIG. 15 illustrates a perspective view of a long spring component mounted along the direction of cartridge insertion;

FIG. 16 illustrates a cross section of major components of a cartridge using a compressible material to push directly on a microprocessor;

FIG. 17 illustrates a block diagram of the overall structure of a printer and cartridge;

FIG. 18 illustrates a signal line structure in a printer connector;

FIG. 19 illustrates an address map for a cartridge when viewed from the point of view of an electronic printer control device;

FIG. 20 illustrates an address map for a cartridge from the point of view of cartridge microprocessor;

FIG. 21 illustrates a block diagram of an add-on cartridge constructed according to the invention;

FIG. 22A to 22C illustrates a schematic of an exemplary interrupt request register useful for implementing register 640 of FIG. 21;

FIG. 23 illustrates a schematic of a polling command register useful for implementing register 643 of FIG. 21;

FIG. 24 illustrates the contents of a status register 645 used in FIG. 21;

FIG. 25 illustrates a schematic of an exemplary read control circuit 620 as used in FIG. 21;

FIG. 26 illustrates a flow chart for the transfer of data by the electronic control device of FIG. 17 using a read control circuit 620 as in FIG. 21;

FIG. 27 illustrates the structure of data inside of a storage ROM used in the add-on cartridge of FIG. 21;

FIG. 28 illustrates a flow chart of data processing by the add-on cartridge of FIG. 21 using a read control circuit to transfer data;

FIG. 29 illustrates a flow chart for data transfer by the electronic control device using a FIFO control circuit;

FIG. 30 illustrates a flow chart for data transfer by the add-on cartridge circuit using a FIFO control circuit;

FIG. 31 illustrates a schematic of an exemplary double bank control circuit for use in the add-on cartridge of FIG. 21;

FIG. 32 illustrates a flow chart for starting the transfer of data using the bank control circuit of FIG. 31;

FIG. 33 illustrates a flow chart of response processing in the electronic control circuit of FIG. 17;

FIG. 34 illustrates a flow chart for data transfer using the bank control circuit of FIG. 31;

FIG. 35 illustrates a flow chart for data transfers for the add-on cartridge of FIG. 21 using the double bank control circuit of FIG. 31;

FIG. 36 illustrates a timing chart for image data printing occurring through control of a laser engine by the electronic control circuit 501; and FIG. 37 illustrates a block diagram of a circuit for reducing the operating frequency of a microprocessor in the add-on cartridges of FIGS. 1 and 21.

DESCRIPTION OF PREFERRED EMBODIMENTS

Exemplary embodiments of the present invention are disclosed in relation to: the physical structure and components used; exemplary thermal design calculations and temperature rise test results; alternative cartridge embodiments; overall printer and cartridge combination structure, electronic suppression of thermal sources; and some miscellaneous aspects of the invention.

The invention is disclosed and embodiments described along with related background and implementation material in relation to the following general outline.

I. Cartridge heat dissipating structure.
  A. Physical structure and components.
  B. Thermal design calculations and temperature rise test results.
  C. Alternative cartridge embodiments.
II. Electrical structure of the printer and cartridge.
  A. Overall printer and cartridge combination structure.
  B. Cartridge address space.
  C. Cartridge internal structure.
  D. Description of a data transfer controller.
  E. Description of all registers.
  F. Sleep Mode G. Configuration and operation of read control circuits.

H. Configuration and operation of FIFO control circuits.

I. Configuration and operation of a double bank control circuit.

J. Printing of image data.

III. Miscellaneous.

A. Electronic suppression of thermal sources.

B. Miscellaneous aspects of the invention.

Each section teaches certain aspects of the invention and its useful application to the laser printer art.

I. Cartridge heat dissipating structure

A. Physical structure and components

The present invention provides a method and apparatus for both minimizing accumulation of, and dissipating heat from, internal processing components of add-on data processing devices such as expansion cartridges for laser printers. The add-on device or cartridge uses a housing or casing designed to provide direct thermal transfer paths for heat generating components such as processors. At the same time, in some embodiments, convective thermal transfer is induced through specially positioned air passages and fin structures. To further decrease thermal stress and suppress heat accumulation, internal add-on device electronic components are monitored and operated at lower clock speeds or otherwise deactivated when they are functionally inactive for extended periods of time.

An exploded perspective view of one embodiment of a printer-cartridge-type of add-on electronic device which is constructed and operating according to the present invention is illustrated in FIG. 1. The cartridge (503) illustrated in FIG. 1 is designed for insertion into an expansion slot of the type commonly found on many laser printers for adding font capabilities. However, as discussed further below and in the co-pending patent applications listed above, the inventive cartridge is also able to receive print data from the printer, process and develop the received data into image data, and provide the results back to the printer for preparing an output image.

In FIG. 1, a cartridge 503 is shown having a multi-layer printed circuit board 550, called printed circuit board below, mounted inside of a generally upside-down U-shaped upper casing 100 and a mating, shallower, U-shaped or flat lower casing 120. A cap or end cover 140 is mounted on one side, or end, of the cartridge adjacent to a connector end of printed circuit board 550. A heat generating circuit element, component, or device, such as a microprocessor 601, is shown installed on printed circuit board 550. Upper and lower casings 100 and 120 are typically both manufactured from aluminum or similar materials. Aluminum is preferred because it has a high thermal conductance rate and is very effective at conducting heat to the outside of the cartridge.

Two grounding springs 122 are shown mounted on lower casing 120 for obtaining grounding contact with the printer unit. The springs 122 are typically secured in place by fasteners such as rivets 124. In addition, in order to exert an upward bias to, or bending force on, printed circuit board 550, resilient or compressible bias element 126 is placed on a bias retainer 128 on an inner surface of the lower casing. Bias element or piece 126 is typically formed from a cylindrical shaped compressible, elastic, or resilient material such as silicon rubber and presses against printed circuit board 550 in an area directly beneath microprocessor 601 to push this area, and, thus, microprocessor 601 upward. However, those skilled in the art will recognize that other compressible or elastic materials may be used for this bias (pressure) function.

A sheet of heat dissipating material 102, such as a piece of silicon rubber, is disposed between an upper surface of microprocessor 601 and an inner surface of upper casing 100 to improve the closeness of fit or thermal contact between these elements and, therefore, the corresponding thermal conductance. As compressible bias element 126 pushes upward on printed circuit board 550, microprocessor 601 is also pushed upward, increasing the surface contact pressure between microprocessor 601 and heat dissipating material 102, and between heat dissipating material 102 and upper casing 100. As a result, heat dissipation from microprocessor 601 along an upward path, extending to casing 100, occurs more efficiently.

Heat dissipating material 102 makes close thermal contact with the upper surface of microprocessor 601 and the lower surface of upper casing 100 and acts as a conductive thermal path to transfer heat produced by microprocessor 601 to upper casing 100. Heat dissipating material 102 typically comprises silicon rubber but other materials may be used, as long as they effectively conduct heat. Exemplary alternative materials are mica, silicon paste, and resins with a relatively high thermal conductance, such as epoxy resins, resins that are relatively soft and have good adhesion, such as urethane, and metal plating. Silicon rubber and resin materials may also be applied in spray or paste form instead of as sheets. Materials having a relatively high thermal conductance of 1 W/m·K or more are especially useful for realizing the advantages of the present invention. However, since the rate of thermal conductance generally decreases with material thickness, the thickness should also be limited to about 1 mm or less.

Cartridge 503 can also be manufactured without any materials being placed between the top surface of microprocessor 601 and the inner surface of upper casing 100, allowing them to make direct contact. Unfortunately, if the top surface of microprocessor 601 and the inner surface of upper casing 100 make direct contact, heat dissipation may be less efficient. These two surfaces are stiff and substantially inflexible or non-conforming, which tends to inhibit close or adequate thermal contact. Therefore, to assure close, thermally transmissive, contact between these surfaces, the use of intermediate materials to improve the contact interface, as described above, is preferred.

During assembly, upper casing 100 is first turned over and heat dissipating material 102 mounted in a designated location on upper casing 100. Material 102 can be secured in place using a retaining element, such as a grove, or a thermally conductive adhesive. Printed circuit board 550 is then mounted inside of upper casing 100, generally using a single screw 160, possibly in combination with one or more grooves, raised edges, or lips in the casing walls. Lower casing 120 is then mated to upper casing 100 and fixed in place using four screws 162, one secured to a threaded portion in each corner of casing 100. Assembly of cartridge 503 is completed by inserting cap 140 into a cap opening formed between upper casing 100 and lower casing 120.

Upper and lower surfaces of printed circuit board 550 are shown in FIGS. 2A and 2B, respectively. As shown in FIG. 2A, an insertion plug 551 is formed on one end of a top, or bottom, surface of printed circuit board 550. This plug or plug section of the board consists of a series of electrodes or contacts arranged in parallel on surfaces of the board for contacting matching electrical contacts inside the printer cartridge slot. The number of contacts is determined by the corresponding size of a matching connector conventionally provided in the printer. Plug section 551 may also employ orientation slots or guides, if also used in the printer.

In this embodiment, microprocessor 601 is shown installed next to the insertion plug 551 portion of printed circuit board 550. Microprocessor 601 is typically secured in this location by soldering processor connection pins 601P to contact pads on printed circuit board 550 after insertion through contact/mounting holes or vias. However, it is contemplated that other mounting techniques may be employed such as surface mounting technology or, where space permits, a socket assembly could be provided.

Two pairs of ROMs 606, 607, and 608, 609, are shown positioned near microprocessor 601 along each edge or side of printed circuit board 550. These ROMs are used to store one or more control programs, etc., for execution by microprocessor 601. Four tri-state buffers 617 are also shown mounted adjacent to microprocessor 601 in a parallel configuration in the center of printed circuit board 550. Four dynamic RAMs 611 through 614 are shown positioned between tri-state buffers 617 and the opposite end of printed circuit board 550 from plug 551, and are typically mounted parallel to each other. For clarity in illustration, any wiring or interconnect patterns present on the top and bottom surfaces of printed circuit board 550 have been omitted. For all of the circuit elements or components described above, the specific configurations, whether parallel, grouped, or irregular, are for purposes of illustration, and are not intended as a limitation inasmuch as other configurations are also contemplated within the teachings of the invention.

Due to its complexity and the interconnection density, microprocessor 601 is typically manufactured or packaged as a pin grid array (PGA) type of device. However, those skilled in the art will readily understand that other package types such as the SOJ, SOP, and QFP (Quad Flat Pack) styles can be employed as desired within the teachings of the invention. An exemplary microprocessor 601 is the Am29030, with a typical operating clock speed of 25 MHz, which is a RISC type microprocessor manufactured by Advanced Micro Devices of Santa Clara, Calif., U.S.A. (referred to as AMD).

In FIG. 2B, plug 551 is also shown having contacts on the bottom surface of printed circuit board 550, in addition to those on top, as appropriate. An ASIC type device or component (application-specific large scale integrated circuit device) 603 is mounted on the bottom surface on the opposite end from plug 551. Four tri-state buffers 212 are shown mounted adjacent to ASIC device 603. Contact or mounting pins 601p for microprocessor 601, or any associated mounting socket, typically protrude through printed circuit board 550, and are shown residing in an area between plug 551 and tristate buffers 212.

An EEPROM type device is generally used to store configuration data for the printer, that is, parameters related to print operation, such as number of printed pages, paper size, margins, fonts, and communications parameters. Therefore, an EEPROM 670 is shown positioned along one edge or side of printed circuit board 550, close to mounting pins 601p. A ROM 618 is positioned adjacent to EEPROM 670 and used to store a program for controlling or operating a microprocessor used in the printer.

Two oscillators 661 and 665 are shown in FIG. 2B as being installed on an opposite edge or side of printed circuit board 550 from EEPROM 670. The first of these oscillators, 661, generates a signal used to form the basic clock for operating microprocessor 601 and associated support circuit elements. For example, oscillator 661 is typically capable of generating a clock signal at a frequency up to 50 MHz which is used to operate the microprocessor. However, those skilled in the art will recognize that each microprocessor chosen for implementing microprocessor 601 has its own optimum operating frequency and the frequency of oscillator 661 is chosen or adjusted accordingly for each design. For example, in this embodiment, the AMD processor is preferably operated at only 25 MHz. The second oscillator, 665, generates a clock signal used in an interval timer processing area, which is described later. For example, oscillator 665 typically generates a 5 MHz clock signal. If microprocessor 601 is provided with a clock signal from a dedicated (independent) oscillator in this manner, the frequency of operation for microprocessor 601 can be easily changed by simply replacing dedicated oscillator 661 with one operating at another desired frequency.

Additional elements, such as a reset device 637, FIFO memory 621, and NAND gate 680 are positioned adjacent to oscillator 665, and aligned along the edge of printed circuit board 550. Five tri-state buffers 684 to 688 are also mounted parallel to plug section 551.

As shown in FIGS. 2A and 2B, all of the generally rectangular circuit elements or components are aligned substantially parallel to the length-wise direction of printed circuit board 550 on both top and bottom surfaces. As indicated by directional arrows in the figure, this type of layout allows air to more easily flow from plug 551 toward the direction of microprocessor 601, contributing to more efficient cooling of microprocessor 601.

As stated above, cartridge 503, is configured to be inserted into a cartridge slot otherwise used for providing printer font information. Common font cartridges merely hold a ROM, or ROMs, in which font data is stored and then used to recreate the font "style" for given text. In contrast, add-on cartridge 503, of this embodiment, contains control circuitry in the form of microprocessor 601, ROMs 606 through 609, ROM 618, and ASIC 603 which provide programmed processing functions for print data.

The printer connector into which cartridge 503 is inserted is configured according to predefined font cartridge connection specifications. According to these specifications, the printer receptacle or connector is provided with a read only line, in the form of an address bus, for reading data from the cartridge into the printer, but no signal lines for transferring data from the printer to the cartridge. However, the cartridge used for this embodiment of the invention also provides the ability to receive print data from the printer, develop it into image data using microprocessor 601 and associated circuitry, and return the processed data to the printer. Therefore, it is necessary to transfer print data from the printer to the cartridge using the read only line in the connector. As a result, special processing is required by the printer microprocessor.

When cartridge 503 is inserted into the font cartridge or expansion slot of the printer, the processor inside the printer reads identification data stored in ROM 618 during printer or software initialization, or when power is applied to the printer. At this point ROM 618 exerts control over printer data processing within the printer. In response to the identification data, the printer processor begins processing image data according to processing programs or algorithms stored in and provided by ROM 618. That is, the printer processor executes special processing according to the programs stored in ROM 618. This special processing consists of generating addresses or address values that essentially contain one byte of print data (in the form of a PDL program), placing this address on the address bus, and communicating or transferring this address to cartridge 503 through the connector and plug 551. ASIC 603 in the cartridge receives this address and extracts the one byte of print data contained or encoded in the address by deciphering and storing it in RAMs 611 through 614. The print data is then retrieved from RAMs 611 through 614 by microprocessor 601 and processed according to a desired PDL program and developed into image data.

It is readily understood that it is better to use a processor that operates at speeds reasonably faster than the printer processor for microprocessor 601. The higher speed allows microprocessor 601 to receive and process data and provide image data back to the printer in less time than the printer processor could process the same data. At the same time, the printer is not substantially delayed or having to wait for data. This allows image development processing that must usually be executed by the printer to take place using a higher-speed microprocessor 601 and in essence have the net or effective processing speed of the printer increased. The circuitry inside of cartridge 503 and its operation is also described in detail in the copending patent applications referenced above.

Upper casing 100 is shown in more detail in FIGS. 3A, 3B, 3C, and 3D. A plan view of a bottom surface of casing 100 is illustrated in FIG. 3A, an end view is shown in FIG. 3B, and cross sections taken along lines 3C—3C and 3D—3D of FIG. 3A are shown in FIGS. 3C and 3D, respectively. As shown in FIGS. 3A and 3D, the inside surface area of upper casing 100 opposite microprocessor 601 has a raised area or portion 104, which is higher than the surrounding casing surface. Heat dissipating material, here silicon rubber or similar material, 102 (see FIG. 1) is mounted between raised area 104 and microprocessor 601, typically by attachment to the raised area 104. As shown in FIG. 3C, upper casing 100 is typically made thicker in the region of raised area 104 and functions as a heat sink for microprocessor 601 by reducing resistance to thermal transfer to outside casing surfaces which smoothly disperses heat from microprocessor 601.

A number of passages or holes are formed in an end or edge surface 106 of upper casing 100, which are shown in FIG. 3B, making that surface a structure through which air easily passes. Therefore, these holes are also effective in dissipating heat from inside of cartridge 503. Using or forming several air passages in edge surface 106 effectively increases the surface area, which also improves heat dissipation. However, if those skilled in the art find that other heat dissipation measures are deemed adequate, then it is not necessary to provide openings in edge surface 106.

When openings are provided in surface 106, it is also advantageous to manufacture this end of casing 100 from a reasonably thick piece of material in which a series of grooves or transverse slots are formed. These grooves intersect with the holes to provide additional air paths. This type of structure also forms a series of ridges or fins around the holes and provides increased surface area over which convective cooling occurs. By increasing the surface area and providing fins or cooling fin-like structures extending outward from the end of casing 100 or cartridge 503, upper casing 100 and the whole of cartridge 503 are more efficiently cooled without relying on air flow through the printer.

The use of appropriate machining techniques in forming end surface 106, allows the use of either rounded or squared holes and slots which also contribute to improved aesthetic appeal for many applications. In the alternative, end surface 106 can be shaped, when made using either metal or plastic base materials, to have larger radiating fins or have fins that mechanically attach thereto, or employ a separate slip-on type cover shaped with a series of cooling fins. If a separate cover is used, the air passage and fin shape and style are readily adjusted according to specific needs or applications without impacting operation or the manufacture of the remainder of cartridge 503.

Turning now to the other end of cartridge 503, an exemplary technique or structure for attaching end cap 140 is also illustrated in FIGS. 3A and 3C. As shown in FIGS. 3A and 3C, two or more protrusions or indentations 108 are formed, through machining or other known techniques, on the inner surface of casing 100 near the open end used by cap 140 and plug 551. Claws 142, which are shown in FIG. 1 as disposed on and projecting from cap 140, catch on these ridges and secure cap 140 in place. In the same manner, some indentations 130 are formed in the inner surface of lower casing 120, as seen in FIG. 1. After upper casing 100 and lower casing 120 are mated and secured together using screws 162, insertion of cap 140 allows claws 142 to catch in indentations 108 and 130 in such a way that cap 140 cannot be easily pulled out. A narrow slot 144 formed in cap 140 provides a passage through which plug 551 of printed circuit board 550 extends to protrude into a region surrounded by cap 140.

FIG. 4 illustrates a cross section of an assembled cartridge 503 which is equivalent to a cross section taken along line 3D—3D of FIG. 3A. In FIG. 4, as assembled, the plug 551 end of printed circuit board 550 is slightly recessed inside of the edges or sides of upper casing 100 and lower casing 120. In addition, the plug section 551 end of printed circuit board 550 is typically chamfered. As indicated in FIG. 2, the plug electrodes stop just inside of the outer edge of printed circuit board 550. By recessing the contact electrodes from the board edge, they can only be touched or contacted by objects extending beyond the edge over the plug 551. Therefore, the possibility of mistaken contact during cartridge 503 transport is reduced. However, where desired for a specific configuration, plug 551 can extend beyond the end of the cartridge casing, although this is generally not preferred.

An enlarged cross section of the mounting area for microprocessor 601 on circuit board 550 of FIG. 4 is shown in FIG. 5. In FIG. 5, compressible material 126 is shown positioned in a retaining section of lower casing 120. The compressible material presses or biases printed circuit board 550 upward under microprocessor 601 which is shown attached on top of printed circuit board 550. This creates good thermal contact between microprocessor 601, heat dissipation material 102, and raised area 104, and improves heat dissipation across these elements. Heat dissipating material 102 is mounted between the upper surface of microprocessor 601 and raised area 104 of upper casing 100. Heat generated by microprocessor 601 is discharged through material 102 and upper casing 100 to the surrounding air.

Material having good thermal conductance is used for manufacturing heat dissipating material 102. For example, Shin-etsu (trade name) silicon sheets manufactured by the Shin-etsu Polymer Company Limited, TC-CG type (trade name) silicon sheets manufactured by Shin-etsu Chemical Company Limited, and Sakon (trade name) manufactured by Fuji High Polymers may be useful materials. Each of these materials possess a relatively high thermal conductance rate of 1 W/m·K or more.

Alternatively, materials that are initially in a non-solid state, such as glutinous liquid, pate', or grease states, but harden when used, can also be used on the upper surface of microprocessor 601. An exemplary material is the RTV (trade name) rubber compound from Shin-etsu Chemical Company Limited. If such a non-solid material is used, good surface contact between microprocessor 601 and upper casing 100 is obtained using a small quantity or thickness of material. Therefore, even a material with a relatively low thermal conductance rate provides adequate heat dissipation in this configuration.

The two spring components 122 attached to lower casing 120, as shown in FIG. 1, also contribute to improving heat dissipation for cartridge 503. More detailed face and side views of one preferred embodiment of springs 122 are shown in FIGS. 6A and 6B, respectively. In these figures, a bend 123 is shown formed in the spring material near a leading edge of spring component 122. The spring components are mounted on lower casing 120 with their respective bends 123 inserted into rectangular openings 132, formed in lower casing 120. As shown in FIG. 4, in an assembled cartridge 503, bends 123 protrude from lower casing 120. At least one of the two, or more, spring components 122 makes electrical contact with a conductive frame within the printer adjacent to the font cartridge slot, and allows cartridge 503 to be adequately grounded. At the same time, some of the heat generated inside of cartridge 503 passes through spring components 122 and is discharged into the printer frame. By enlarging the size of the printer frame surface area contacted by spring components 122, this heat dissipation is further improved.

As indicated in FIG. 6A, each bend 123 of a spring component 122 is sub-divided by a number of slits 125 which serve at least two functions. First, during use, air passes between slits 125 and into the cartridge 503 interior where it exits either through passages in end 106 of upper casing 100 (see FIG. 3B) or the opening in cap 140. This type of air flow is very effective in cooling components or devices inside of cartridge 503. Second, spring 122 is more flexible and conforms to variations across the printer frame surface, and the number of contact points with the printer frame increases, securing a more stable ground as well as improving thermal conductance.

A perspective view of cartridge 503 after insertion into a printer 1A is illustrated in FIG. 7. In FIG. 8, a cross section of inserted cartridge 503 is shown in relation to a frame 180 of printer 1A. However, in FIG. 8, the cross hatching normally used to illustrate a cross section is omitted for purposes of clarity in illustration. As shown in FIG. 8, plug 551 of printed circuit board 550 has been inserted into an interface connector CN11 for the printer. In this position, at least one spring component 122 at the front, or connector end, of cartridge 503 makes electrical, and thermal, contact with a metal frame 180 of printer 1A.

An interior view of printer 1A at the cartridge slot level, as with a top or access panel removed is shown in FIGS. 9 and 10. FIG. 9 illustrates printer 1A prior to cartridge 503 insertion while FIG. 10 shows printer 1A after cartridge 503 insertion. A cartridge insertion port 250 is generally provided as part of one side or front panel of printer 1A for providing access to the connector CN11. In FIG. 9, port 250 is positioned along the lower left side of the printer, when viewed from the front (top of figure here). Typically, a printed circuit board 252 is mounted inside of cartridge insertion port 250 and supports connector CN11. Printed circuit board 252 is one of one or more circuit boards used for communicating with and controlling the operation of the print engine within printer 1A.

As shown in FIGS. 9 and 10, an exhaust fan 254 is generally provided within printer 1A for cooling and is mounted on a side or back panel of the printer, typically on an opposite side from insertion port 250. A number of ventilation holes 256 are formed in one or more side or bottom panels (back in FIG. 9). When power is applied to the printer or the printer is turned on, exhaust fan 254 is activated to cool the inside of the printer. As indicated by arrows in FIG. 9, air from outside of printer 1A passes through ventilation holes 256 and flows into the inside of the printer where it is then exhausted by fan 254. When cartridge 503 has not been inserted as in FIG. 9, the cartridge insertion port is generally covered or closed by means of a cover (not illustrated) so that little or no air passes through cartridge insertion port 250. The exact placement of the fan and ventilation holes, or the use of a port cover vary from printer to printer, which is understood by those skilled in the art, and this embodiment of printer 1A is presented for purposes of illustration only.

As shown in FIG. 10, after insertion of cartridge 503, air flows through the many air passages in the end 106 of cartridge 503 (see FIG. 3B). Air then flows into the interior of printer 1A through slot 144 in cap 140 (FIG. 1). As a result, components or devices inside of cartridge 503, such as microprocessor 601, are cooled. Making opening 144 in cap 140 larger increases the amount of air flowing inside of cartridge 503, allowing more effective cooling of microprocessor 601. At the same time, as shown in FIG. 11, an upper casing 112 having openings in top and side surfaces can be used in place of casing 100. The configuration of upper casing 112 increases the flow of air within or through cartridge 503.

As seen in FIG. 10, inserted cartridge 503 is also cooled by the flow of air around it within the printer 1A. However, this air flow principally cools the front end of cartridge 503. Therefore, by placing microprocessor 601 in the front end of the cartridge, more effective cooling of microprocessor 601 advantageously occurs from the internal printer air flow.

A perspective view of cartridge 503 after insertion into another printer, printer 1B, is presented in FIG. 12. In FIG. 12, the font slot for printer 1B is configured so that substantially all of inserted cartridge 503 is enclosed within the printer housing or sides, or cartridge port volume. When using cartridge 503 in this type of printer, printer 1B, placing microprocessor 601 at the front end of the cartridge also allows for more effective cooling from the internal air flow of the printer.

B. Thermal Design Calculations and Temperature Rise Test Results

An equivalent thermal circuit for a heat dissipation route or "circuit" associated with the structure and operation of upper casing 100 is illustrated in FIG. 13. The definitions for symbols used in FIG. 13 as well as corresponding numerical values used for thermal design analysis are as follows:

$P_w$: Amount of heat generated by microprocessor 601. Calculated as follows: When microprocessor 601 is a CMOS type semiconductor device, the amount of heat generated, $P_w$, is nearly proportional to the frequency of the clock signal. For example, if a Am29030 processor is used, the current inside is 22 mA per megahertz. If a clock frequency of 25 MHz is used, the current is about 22 mA×25 or 550 mA. If the applied voltage is 5.25 volts, the amount of heat generated by microprocessor 601 will be about 5.25×0.55 or 2.9 watts.

$T_j$: Temperature of devices inside microprocessor 601.

$T_c$: Temperature of microprocessor 601 package.

$T_a$: Ambient temperature of external cartridge environment (=40° C.)

$\theta_{jc}$: Thermal resistance of microprocessor 601 package.

$\theta_{ca}$: Thermal resistance between microprocessor 601 package and external environment. (=18° C./W. The designed value when the package does not make contact with any other objects.)

$\theta_s$: Thermal resistance (=1° C./W) of heat dissipating material 102.

$\theta_f$: Thermal resistance of upper casing 100 (=5.5° C./W) which is calculated according to the type of material and its dimensions.

In the equivalent thermal circuit of FIG. 13, compound thermal resistance, θt, between ambient temperature $T_a$ and the temperature of the top of the package $T_c$, are calculated according to the relationship:

$$\theta_t = \theta_{ca} \times (\theta_x + \theta_f)/\{\theta_{ca} + (\theta_s + \theta_f)\} = 4.8[° \text{ C./W}]$$

In addition, the rising value $\Delta T_c$ of package temperature $T_c$ due to heat generated by microprocessor 601, or other components, is calculated according to the relationship:

$$\Delta T_c = P_s \times \theta_t = 2.9[W] \times 4.8[° \text{ C./W}] = 14[° \text{ C.}]$$

As a result, package temperature $T_c$ becomes:

$$T_c = \Delta T_c + T_a = 14 + 40 = 54[° \text{ C.}]$$

If it is assumed that a cartridge interior temperature increases about 20° C. due to generation of heat from devices other than microprocessor 601, the maximum value of package temperature $T_c$ is $\Delta T_c + T_a + 20°$ C. or about 74° C. This indicates that if microprocessor 601 is implemented with a processor or circuit design having a temperature tolerance of 74° C. or more, it is possible to maintain the temperature tolerance value for microprocessor 601 through dissipation.

As a result, it is possible to prevent erroneous operation or break down of microprocessor 601 and If upper casing 100 uses aluminum with the preferred embodiment dimensions of 90×140×1.6 mm, about 80° C. of heat output or thermal load can be accommodated. Since the temperature tolerance of the exemplary Am29030 processor is about 85° C., based on the above calculations, the casing temperature of microprocessor 601 can be maintained within the designed thermal tolerance value.

By placing microprocessor 601 at the front end of cartridge 503, the environmental temperature, $T_a$, described above, is equivalent to the temperature around cartridge 503 inside of printer 1A. Because the volume surrounding cartridge 503 is cooled by air introduced through ventilation holes 256, some additional heat dissipation is gained, thus, providing leeway in any thermal constraints created by the design.

C. Additional Alternative Cartridge Embodiments

In the preferred embodiment disclosed above, both upper casing 100 and lower casing 120 are typically manufactured from aluminum. However, the teachings of the present invention are not limited to this material. In general, these casings may be manufactured from any material having a sufficiently high rate of thermal conductance as needed to transfer the anticipated thermal output for a given application.

Aluminum is preferred as a casing material because it also functions as an electro-magnetic shield, attenuating high frequency noise generated by microprocessor 601 and inhibiting it from entering the printer or its surroundings. If the cartridge casing is made from conductive material in this manner, there is a double benefit of achieving heat dissipation and electro-magnetic shielding. Those skilled in the art will recognize that other conductive materials, such as aluminum and bronze alloys are generally useful as conductive casing materials. In particular, because aluminum and aluminum alloys are generally light in weight, they result in a cartridge that is easily transportable or easy to carry.

The above thermal design calculations used an exemplary aluminum plate heat sink with dimensions of 90×140×1.6 mm which corresponds to the preferred dimensions for the top surface of upper casing 100. The casing dimensions are, of course, determined by the size of the cartridge slot being used or other physical constraints of the target apparatus, as would be known. Since the area of the exemplary upper casing was sufficient to dissipate typically projected thermal loads, upper casing 100 can be manufactured from thermally conductive material, such as aluminum, and lower casing 102 using a non-metallic material, such as plastic, and still accommodate the projected thermal loads.

In the alternative, the entire cartridge case can be manufactured from non-metallic materials such as plastic. FIG. 14A illustrates an upper casing 101 which is manufactured from a plastic material and has a heat dissipating plate 110 mounted inside. A cross section of the assembled casing 101, taken along line 14B—14B of FIG. 14A, is shown in FIG. 14B. Several passages or openings OP are formed in the top surface of upper casing 101, as indicated in FIG. 14B. Heat is transferred from microprocessor 610 through heat dissipating material 102 to metal plate 110 and then discharged to the outside through openings OP. A gap or open volume may be formed between metal plate 110 and upper casing 101 to allow air to more easily flow through openings OP and to cool microprocessor 601 effectively. In this latter configuration, heat dissipating material 102 may also be omitted.

Heat dissipation is increased further by also forming air passages in metal plate 110 in alignment with the openings OP, which allows air inside of the cartridge casing to escape and outside air to be introduced into the cartridge. In addition, heat dissipation can be increased by forming a series of holes in printed circuit board 550. In this latter embodiment, upper casing 101 does not have to be manufactured out of metal. If the level of heat dissipation described above is satisfied, casing 101 can be manufactured partially from metal and partially from plastic.

To maintain electromagnetic shielding properties, the interior of the cartridge casings can also be coated with a conductive or metallic material. In the alternative, an exterior coating formed from a conductive paint or other coating material using metal or conductive material can also be used, especially where a particular aesthetic feature is desired. In addition, a darker color of paint, such as black, assists in dissipating heat from the cartridge. Where manufacturing expense is not a limitation, certain composite materials using carbonaceous fibers or sheets, or resin coated metals are also suitable for casing construction.

Manufacturing the cartridge casings from non-metallic material provides a low cost advantage for providing a less expensive case, and making it lighter in weight and easier to transport or carry. However, where the casing material is selected to have a comparatively large thermal conductance rate of about 1W/m·K or more, heat dissipation becomes more efficient. For example, depending on the manner of use, FRP, which is a type of plastic, exhibits a thermal conductance rate of several W/m·K, making it useful for constructing a plastic cartridge casing. For high enough conductance rates, metal plate 110 (FIGS. 14 and 14B) may be omitted from the cartridge. However, by comparison, metal generally has a thermal conductance rate at a level of 10W/m·K, in terms of simple heat dissipation, making a metal casing typically more effective.

As shown in both FIGS. 4 and 14B, printed circuit board 550 is positioned slightly below or offset from the centerline of the cartridge, when taken along its narrowest dimension. The purpose of this offset is to provide a mounting orientation that prevents the cartridge from being improperly inserted into the printer, which could damage circuitry. That is, when a cartridge is mistakenly inserted in a direction different from the proper connector orientation, plug 551 does not enter the connector, thus, preventing improper insertion.

The printed circuit board sub-divides the cartridge interior volume into two sub-volumes, regions, or spaces with one being relatively larger than the other. Microprocessor 601 is preferably located in the larger of the two volumes so that resistance to movement of air surrounding the microprocessor is lower, thus, allowing more effective cooling of microprocessor 601. Furthermore, as stated earlier, pin sockets are mounted on top of printed circuit board 550 in some applications and only leave a minimum amount of space for microprocessor 601. Therefore, if microprocessor 601 is mounted within the larger volume, it is easier to accommodate microprocessor 601 and connect it to printed circuit board 550 using pin-type sockets.

As discussed above in relation to FIG. 1, two spring components 122 are installed in lower casing 120. This is done to assure that at least one of the spring components makes positive electrical contact with the printer frame adjacent to the insertion slot. However, instead of using two or more separate springs, a single long spring component 134 may be used. A single spring structure of this type is illustrated in FIG. 15 as being mounted with its length along the direction of cartridge insertion, or the length of the cartridge. Spring component 134 has a corrugated configuration along its length which protrudes outside of an opening in a lower casing 136. By using long spring component 134, it is possible to provide positive electrical contact with the printer frame whether or not the cartridge is inserted deeply inside of the printer.

In addition, as shown in FIG. 16, slots or holes may be formed in printed circuit board 550 where compressible material 126 is located so that it presses directly against microprocessor 601. This configuration increases heat dissipation by also transferring heat directly through material 126. However, in some applications compressible material piece 126 may be omitted because printed circuit board 550 is itself manufactured from a substantially flexible material or plastic, and microprocessor 601 can be pushed or pressed upward using the elasticity of printed circuit board 550 itself with an appropriately physically biased mounting technique.

As indicated in FIG. 16, that portion of upper casing 100 making contact with microprocessor 601 is generally slightly raised (104). However, if the top surface of microprocessor 601 is made higher than the top of other circuit devices or components on the same side of printed circuit board 550, it is not necessary to raise area 104 to place the top of microprocessor 601 in contact with the casing. However, providing raised area 104 also allows accommodation of some unevenness in the inner surface of upper casing 100, which in turn advantageously allows upper casing 100 to be manufactured easily using die casting or hand processing techniques.

In the above embodiments, microprocessor 601 is mounted approximately along a center line and to the front of the cartridge along the direction in which the cartridge is inserted. However, if one or more other circuit elements within the cartridge generate more heat than microprocessor 601, they may be placed approximately centered and toward the front, connector end, of the cartridge. That is, it is generally better to place circuit elements or devices that generate the most heat centered in the front of the cartridge, regardless of their ultimate function. This allows the advantages of more efficient cooling through various conductive and convective dissipation techniques to be applied to the largest sources of heat in the cartridge to fully realize the potential of the inventive technique and apparatus.

II. The Electrical Configuration of the Printer and Cartridge

A. Overall Printer and Cartridge Configuration

A general block diagram of a laser printer 500, in which cartridge 503 is used is illustrated in FIG. 17. In FIG. 17, laser printer 500 is shown being equipped with an electronic control device 501, which controls all of the operations of laser printer 500, and a laser engine 505 which forms an output image on paper or other transfer media P. Laser printer 500 is shown as being connected to a computer or work station 507 as a source of print data. Electronic control device 501 generates or develops image data, in the form of bit map data, from the print data provided by, or transferred from, work station 507. The image or developed image data is transferred from controller 501 to laser engine 505 through a connector CN10 where a xerography unit 15 is driven in response to the data and forms an output image on paper P.

As shown in FIG. 17, electronic control device 501 is equipped with a commonly known microprocessor or central processing unit (CPU) 510, here chosen to be a MC68000 processor which is manufactured by Motorola. Control device 501 also employs a ROM 511 for storing programs for execution by the printer CPU; a RAM 512 for storing post developed print and image data; a data input/output port 514 for receiving print data from host computer or work station 507; a line buffer 515 attached to a bus line 516 for transferring data exchanged with cartridge 503; a register 517 for exchanging command and status data with laser engine 505; a console panel interface 519 for providing interface control between laser printer 500 and a console panel 518; and a double buffer circuit 520 for retaining image data sent to laser engine 505.

As seen in FIG. 17, an exemplary double buffer circuit 520 uses two RAMs, RAM 520A and RAM 520B, which typically accommodate up to eight lines of print data for laser engine 505, and corresponds to 4 kilobytes of memory capacity. A memory write controller 520C is used to alternately write image data to one of these RAMs from CPU 510. A memory read controller 520D alternately reads data from each of the two RAMs, 520A and 520B, and transfers that data to laser engine 505 where it is converted into video signals synchronized with the timing of the rotation of the photosensitive drum in order to print data. Two RAMs 520A and 520B are provided, and reading and writing of data takes place alternately, because CPU 510 and laser engine 505 are configured to access memory, these RAMs, independently.

After CPU 510 writes data to one of the RAMs, it sets a flag in a specific bit position of register 517 to show the presence of new data. Laser engine 505 then checks this flag and responds by reading image data stored in the RAM from the appropriate addresses to which it was written. During the reading process, another bit in register 517 is set to inform CPU 510 which RAM is being read to prevent access. Since only one RAM is being accessed by laser engine 505 at this time, CPU 510 writes the next eight lines of image data to the other RAM during this period. After the process of reading data from one RAM is complete, laser engine 505 resets the appropriate flag bit and proceeds to read data from the other RAM. The speed at which CPU 510 writes data is faster than the speed at which laser engine 505 reads data, that is, the print execution speed. Therefore, a memory access conflict between the two is generally automatically avoided and the transfer of one page of image data takes place simply and efficiently.

As stated, cartridge 503 is connected to electronic control device 501 through connector CN11. A line buffer 515 which has a bus driver (not illustrated) mounted somewhere along data bus 516 acts as a one-way buffer that transfers data from connector CN11 to CPU 510. In other words, when viewed from the processing perspective of CPU 510, cartridge 503 is a read only device.

When power is turned on or applied to printer 500, electronic control unit 501 determines if a cartridge 503 is connected to connector CN11. If a cartridge is detected, an internal reset for electronic control unit 501 is activated. After being reset, control unit 501 executes a jump to a pre-specified address of a ROM provided in cartridge 503 (discussed later). Subsequent to this jump, control unit 501 sequentially executes process steps provided by cartridge 503. In the mean time, cartridge 503 interprets the PDL data output to laser printer 500 from work station 507, develops it into image data, and provides program steps to control unit 501 so that the appropriate printing occurs using laser engine 505.

The wiring relationship of plug 551, formed on one end of printed circuit board 550, and connector CN11 is shown in FIG. 18. As shown in FIG. 18, plug 551 employs 25 pins on either side of printed circuit board 550. In FIG. 18, a signal name is used to label each corresponding pin of plug 551. A slash mark [/] before a signal name indicates that the signal is active low [logical 0].

In FIG. 18, an /ASB signal represents an address strobe signal (ASB) transmitted by CPU 510 in the printer (here a Motorola MC68000), /UDS represents an upper data strobe signal output by CPU 510, and /LDS is a lower data strobe signal output by CPU 510. An /ADS signal is an address strobe (ADS) assist signal generated based on certain parameters and status of the address strobe signal /ASB in electronic control device 501. The /ADS address strobe assist signal provides an activity indication when the printer starts up or is initialized, which is different for different printers. As discussed later, in this embodiment, the printer type is determined according to the activity that takes place when the /ADS address strobe assist signal is initialized.

An /ODTACK signal is shown which is an output data acknowledge signal transferred from cartridge 503 to electronic control device 501. An /CTRGSEL signal represents a signal used by CPU 510 to select cartridge 503 and access ROM, registers, etc., that are allocated to internal address spaces. Signals A1 through A20 are addresses or address signals, and signal R/W is the read and write signal, both output by CPU 510, while signals D0 through D15 are signals provided by cartridge 503. Signal SCLK is a clock signal output by an oscillator (not illustrated) built into laser printer 500.

Signal /CTRGS is a cartridge registration or detection signal provided in laser printer 500 which is pulled down or low when cartridge 503 is inserted. As a result, CPU 510 detects the presence of cartridge 503 in connector CN11.

CPU 510 typically uses 23-bit address signals for signals A1 through A23 to specify an address word and the /UDS and /LDS signals to specify high (upper) and low (lower) end bytes, respectively, of each word. As a result, CPU 510 is able to handle 16 megabytes of address space, generally residing at addresses from 000000h to FFFFFFh. Here the symbol 'h' that is attached to the end of the address indicates a hexadecimal number or unit.

B. Cartridge Address Space

Cartridge 503 is allocated some of the address space, specific address range, accommodated by electronic control device 501. CPU 510 uses addresses within a range or space bounded by the values 000000 h and FFFFFFh, but part of this address range is already allocated for use by a ROM cartridge. The space allocated to cartridge 503 changes depending on the specific model or type of the laser printer. In the case of Hewlett-Packard laser printers, as indicated in the left hand column of FIG. 19, memory capacity or space allocation is normally up to 2 megabytes, providing for address values ranging from say 200000 h to 3FFFFFh or from 400000h to 5FFFFFh.

However, as previously discussed, the typical microprocessor 601 used in cartridge 503 is an AMD model AMD29030—25 MHz which can handle 4 gigabytes of memory at address values ranging from 00000000 h to FFFFFFFFh. In addition to ROM and RAM allocations within this address space, allocation occurs for various registers used for data exchange with the printer electronic control device 501. This type of allocation is illustrated in FIG. 20. The configuration of components inside of cartridge 503 is described below along with address space requirements for both microprocessors used within the combined cartridge and printer system.

C. Internal Configuration of the Cartridge

The internal configuration of cartridge 503 is shown in FIG. 21. In FIG. 21, cartridge 503 is configured with a centrally located microprocessor 601 for controlling all cartridge operations. The cartridge is also shown using ROM, RAM, a memory area 602 to provide peripheral support, a data transfer controller 603 to control data exchange with electronic control device 501, and some additional circuitry.

Memory area 602 employs a series of ROMs 606 through 609, which generally aggregate to a total memory capacity of 2 megabytes, and are used to store programs for microprocessor 601 execution. A selector 610 is used to provide bank switching of ROMs 606 through 609. RAMs 611 through 614, also provide a total memory capacity of at least 2 megabytes, and are used to retain print data received from electronic control device 501 and to also retain post developed image data. ROMs 606 through 609 are generally configured as mask ROMs, each having 16 bits by 256 kilobits of capacity, totaling 4 megabits of memory. As shown in FIG. 20, ROMs 606 to 609 are allocated to address spaces 00000000 h to 1 FFFFFh. Each ROM set 606, 607, and 608, 609 form a 2-unit bank creating a 32-bit data bus. ROMs 606 and 609 and microprocessor 601 are connected by address bus AAB and a control signal bus. Data bus IDB of each of ROMs 606 to 609 is also connected to data bus DB20 through data selector 610. Therefore, microprocessor 601 is able to read data from ROMs 606 through 609.

All address signals, except the three low end bits (A0, A1, and A2) from microprocessor 601 on address bus AAB, are input to ROMs 606 and 607, and ROMs 608 and 609. Because the two low end bits (A0 and A1) are not input, data is read by microprocessor 601 in units of one word, or thirty-two bits (4 byte units). In addition, if the third lowest address bit A2 is not used when reading data, ROMs 606 to 609 output data simultaneously, and data selector 610 makes adjustments to data being output simultaneously. That is, the access of the ROMs by microprocessor 601 often takes place from consecutive addresses. Therefore, using 32-bit data words, consecutive words are read from ROMs 606 through 609. If consecutive words are actually read, the two-set ROM banks are switched in sequence by data selector 610 and the data is read consecutively. As a result, reading two consecutive words of data is extremely fast.

RAMs 611 through 614 are each generally implemented as 16 by 256 kilobit DRAMs, for a capacity of 4 megabits. As shown in FIG. 20, these RAMs are allocated to 2 megabytes of address space or addresses from 20000000 h to 201FFFFFh. An additional 2 megabytes of memory can be added to cartridge 503 using expansion RAM interface 615 which is allocated to addresses from 20200000 h to 203FFFFFh. Typically, a maximum of 2 megabytes of SIMM type RAM can be installed in expansion RAM interface 615. RAMs 611 through 614 and expansion RAM 615 data lines are connected directly to a data bus DB29, which is the microprocessor 601 data bus. The RAM address lines are connected to microprocessor 601 address bus AAB through a data transfer controller 603. Register I/O, discussed later, is allocated to address spaces from 80000000 h.

Returning to FIG. 19, when viewed from the perspective of control device 501, cartridge 503 ROM is allocated to the first 128 kilobytes. That is, cartridge 503 also stores programs that are to be executed by CPU 510. When cartridge 503 is inserted, CPU 510 executes a jump command to the address specified for this ROM after initialization is completed, and CPU 510 subsequently operates according to processing steps stored in this ROM.

When CPU 510 accesses the first 128 kilobytes of the 2 megabyte space allocated to cartridge 503, ROM 618 is accessed by an address signal output through address buffers 617 provided for connector side address bus CAB of cartridge 503. The commands and data stored in ROM 618 are sent to CPU 510 through data buffer 619 formed on data bus CDB of the connector. The 'X' used in labeling the FIFO (lower right) addresses in FIG. 19 represents the four high end bits of the first address of the allocated address spaces.

D. Description of a data transfer controller

A variety of control and status registers are accessed at addresses other than those addresses allocated to ROMs and RAMs in the address maps shown in FIG. 19 and FIG. 20, and are provided for data transfer controller 603, which is described next. The description chiefly relates to circuitry with reference to address maps (FIGS. 19 and 20) as appropriate.

Data transfer controller 603, shown in FIG. 21, is formed using an ASIC having around 7,900 usable gates. An exemplary ASIC found useful in manufacturing the invention is manufactured by Seiko Epson, and is a standard cell device, model number SSC 3630, which exhibits low power consumption and is manufactured using a CMOS process. Data transfer controller 603, controls the exchange of data between electronic control device 501 and microprocessor 601 of cartridge 503. This data exchange uses a read control circuit 620 to send data through a read only data bus from electronic control device 503 to the cartridge 503; a FIFO control circuit 623 to pass data through a FIFO memory 621, using read control circuit 620; and a double bank control circuit 624, which makes data from cartridge 503 readable by electronic control device 501. FIFO memory 621 is configured as a RAM type memory device that sequentially stores and reads data using a first-in-first-out procedure. An exemplary component useful for implementing this RAM is a RAM circuit, part number M66252FP, manufactured by Mitsubishi Electric.

In addition, in data transfer controller 603, address bus CAB is connected through address buffer 617 and data bus CDB is connected through data buffer 619. A first decoder 631, formed in controller 603, receives address bus CAB and cartridge selector CSEL signals and outputs selection signals to other elements in data transfer controller 603. In the same manner, address bus AAB and control signal CCC, from microprocessor 601, are connected to transfer controller 603 using a bus controller 635 formed in controller 603. A second decoder 632 is connected to address bus AAB and outputs selection signals to other data transfer controller 603 circuitry. Furthermore, bus controller 635 outputs address signals and control signals to ROMs 606 through 609 and RAMs 611 through 614, as well as expansion RAM interface 615.

In addition to the above elements, a variety of other registers are provided within data transfer controller 603. Beside normal read and write operations, many other registers are automatically written to when special processing takes place. The configuration of these special registers is described below.

Taken from the electronic control device 501 point of view, cartridge 503 is a read only device, and registers writable from electronic control device 501 are configured to be written to using a read operation from a specified address. That is, by specifying a particular address, a selection signal is output from first decoder 631 and data is written to a certain register as a result. Reading from the registers takes place using normal read cycle operations. Data reading and writing by microprocessor 601 also occurs using normal read and write operations.

In FIG. 21, registers are shown being connected to a readable bus, and write operations are simply indicated by arrows. Such registers are, interrupt request register 640, polling command register 643, status register 645 (FIG. 19 register STATUS), transfer flag register 647 (FIG. 20 register BPOLL), PROM control register 649, and control register 650.

Among these registers, registers other than status register 645 and transfer flag register 647 represent a generic name for multiple registers allocated as memory I/O maps for CPU 510 or microprocessor 601 and are not necessarily allocated to consecutive addresses. Registers AMDINT 0, 1, and 2, and registers AMD CLR 0, 1, and 2, shown in FIGS. 19 and 20, belong to interrupt register 640. Registers POLL and MCONTCS belong to polling command register 643.

All registers not belonging to read control circuit 620, FIFO control circuit 623 or double bank control register 624, and not mentioned in the above description, generally belong to or form part of control register 650. These are registers ADDMUXA, ADDMUXB, CLKDIV, RTCVAL, RTCON, RTCSEL, RTCCLR and SYSKEEP, which are shown in FIGS. 19 and 20.

Among the various portions of FIGS. 19 and 20, EWWRL and EWWRH, which are each 512 bytes in size, are areas used for writing to a first latch 651 and a second latch 652 of read control circuit 620 from electronic control device 501. Register EWRD is equivalent to seeing latches 651 and 652 as a one word latch from the microprocessor 601 point of view. Registers FIFOREQ, FIFORST, and FOFOW are equivalent to FIFO register 653 of FIFO control circuit 623. Registers FIRCLK, RDCLK, FIFORD, and RDRST are equivalent to FIFO read register 655 of FIFO control circuit 623. A latch 657 is also provided in FIFO control circuit 623 to maintain data to be written to FIFO memory 621 using some of the functions of read control circuit 620.

Portions of FIG. 19 labeled by the symbols DPRAMA and DPRAMB represent buffers having a 32 byte capacity. These buffers are equivalent to viewing first and second buffers 658 and 659 of double bank control circuit 624 from the electronic control circuit 501 side. These banks, DPWROA and DPWROB, shown in FIG. 20, are what is seen by microprocessor 601 when viewing buffers 658 and 659. Certain bits d1 and d2 of status register 645 are also used for the exchange of data through double bank control circuit 624. Details of this exchange are provided below.

E. Description of All Registers

Interrupt request register 604 is a register that generates, or transfers and retains an interrupt request from electronic control device 501 to microprocessor 601. Three levels, and three corresponding registers (AMDINT 0, 1 and 2), are provided for interrupts from electronic control device 501 to microprocessor 601, as shown in FIG. 19. An interrupt request to microprocessor 601 is generated by electronic control device 501 reading any of the registers of interrupt request register 640. This register is set by the read operation of electronic control circuit 501. However, data read in this operation has no meaning and is irrelevant to the generation of interrupt requests.

A more detailed example of one configuration of interrupt request register 640 is illustrated in FIG. 22. In FIG. 22, registers are formed using D-type flip-flops. The output pin, Q, of each flip-flop, 640a, 640b and 640c, is set active low using the AMDINT 0, 1, and 2 signals output by first decoder 631 in the register read operation described above. As before, the use of a "/" symbol in front of the signal label indicates that the signal is active low.

As shown in FIG. 20, the corresponding registers that clear the respective outputs of flip-flops 640a, 640b and 640c, are allocated to specific addresses as three read only registers (AMDCLR 0, 1 and 2, respectively). As a result, when a read operation from microprocessor 601 to all of the addresses allocated to this register takes place, second decoder 632 outputs all of signals /INTCLR, 0, 1, and 2 and the corresponding flip-flops are preset.

When an interrupt originates from electronic control device 501, one register in interrupt request register 640 must be accessed. Microprocessor 601 determines a priority and performs the processing that applies to the interrupt request. In this case, microprocessor 601 clears the corresponding interrupt request registers 640a, 640b, and 640c.

Polling command register 643 is a register that passes commands from microprocessor 601 to electronic control device 501 and can be written to by microprocessor 601 and read from by electronic control device 501. An exemplary hardware configuration for register 643 is shown in FIG. 23. As indicated in FIG. 23, polling command register 643 uses two octal D-type flip-flops, 643a and 643b, which form a 16-bit wide data latch, and one D-type flip-flop, 643c.

A 16-bit wide data bus DB29 originating from microprocessor 601 is connected to data input pins 1D through 8D of octal data flip-flops 643a and 643b. A 16-bit data bus DB68 originating from electronic control device 501 is connected to the octal output pins, 1Q through 8Q. Second decoder 632 outputs a signal /MCONTCS when microprocessor 601 accesses polling command register 643 (FIG. 20, register CONTCS), which is input to clock pins CK of flip-flops 643a and 643b. When the rising leading edge of this signal occurs, the contents of data bus DB29 are latched to flip-flops 643a and 643b. In addition, first decoder 631 outputs a signal /POLL when electronic control device 501 accesses polling command register 643 (FIG. 19, register POLL), which is connected to output enable pins OE, which enables the outputs of flip-flops 643a and 643b. When this signal goes low, data retained in flip-flops 643a and 643b is output to data bus DB68.

The /MCONTCS and /POLL signals are connected to a clock pin C and preset pin PR of D-type flip-flop 643c. Flip-flop 643c generates a signal CMDRD on its output pin Q which is set high when DB29 data is latched in flip-flops 643a and 643b (signal /MCONTCS is low) and reset low when this data is read from electronic control device 501 (signal/POLL is low). A read enabled status register 645 connected to electronic control circuit 501 uses a specific bit d3 (also called flag CMDRD below) to determine the status of the CMDRD signal. Therefore, by reading status register 645, electronic control circuit 501 is able to know or is provided with an indication from microprocessor 601 that the command code has been set in polling command register 643.

When electronic control circuit 501 looks at flag CMDRD, bit d3 of status register 645, and finds that a command has been placed in register 643, it reads the contents of polling command register 643 during a normal read cycle. That is, it reads the command sent from microprocessor 601. The commands are, for instance, to start transferring print data to data transfer controller 603, to start printing, or to display messages on console 518. As shown in FIG. 23, when electronic control circuit 501 reads the contents of polling register 643, CMDRD, output by flip-flop 643c, its output is then reset to a high level using the /POLL signal. Therefore, by observing a bit d2 of transfer flag register 647, microprocessor 601 is able to know whether or not the command it output was read by electronic control circuit 501.

In addition to the data described above, which shows whether or not a command has been placed in the register by microprocessor 601, status register 645 also retains the data illustrated in FIG. 24, which is described as follows. Bit d0 of this data is set low by signal EWRDY, which is generated within read control circuit 620 when data is written by electronic control circuit 501 to read control circuit 620, discussed later. When that data is read by microprocessor 601, bit d0 is set high by a signal from a second decoder 632. This bit is generally referred to as the EWRDY flag or flag EWRDY.

Data bits d1 and d2 indicate whether double bank control circuit 624 has its access enabled either by electronic control circuit 501 or microprocessor 601. The respective flags are called ADDMUXA and ADDMUXB. These two bits correspond to the two transfer banks built into double bank control circuit 624. As shown in FIG. 20, bits d1 and d2 are set and reset by microprocessor 601 when writing data to bit d0 of registers ADDMUXA and ADDMUXB, which are contained in control circuit 650. Therefore, before writing data to one of the banks of double bank control circuit 624, microprocessor 601 sets the flag to a low level and then resets it high after writing is finished. Assuming electronic control circuit 501 reads data from the bank side in which this flag is set high, by alternately writing and reading the data to the two banks, microprocessor 601 connects to the electronic control circuit 501 side and passes data. The function of the d3 bit (flag CMDRD) has already been described above.

F. Sleep Mode

Still referring to FIG. 24, the d5 bit acts as a flag CLKDIV, which is set according to the operation of the microprocessor 601 clock. Clock CLK, which is output from first oscillator 661 and typically employs an external liquid crystal vibrator CRC1, is used as the operating frequency for microprocessor 601. If a value of zero is written to bit d0 of a register CLKDIV of control register 650 from microprocessor 601, the microprocessor clock is set to operate at 25 MHz. However, if a one is written to bit d0, the clock is set to operate at one-half of this frequency or 12.5 MHz. Flag CLKDIV of status register 645, when viewed from the point of view of electronic control circuit 501, is set low when clock CLK is operating at a frequency of 25 MHz and set high when this changes to 12.5 MHz. Electronic control circuit 501 checks this bit in status register 645 when the clock frequency is to be determined, that is, to know the current operating speed of microprocessor 601 in order to match the timing of data transfers, etc.

The d6 bit acts as a flag called ADMON, which is set high when microprocessor 601 is processing data and set low when microprocessor 601 ceases data processing and enters a sleep mode. In the preferred embodiments, microprocessor 601 receives PDL data from electronic control circuit 501 and then performs the processing necessary to develop this data into image data. However, if no PDL data is provided by electronic control circuit 501, microprocessor 601 is not performing any data processing and is considered inactive. If this inactivity continues for a predetermined amount of time, microprocessor 601, through oscillator 661, is switched to a lower operating frequency to conserve power and decrease the amount of heat output. While those skilled in the art will recognize that several intermediate frequencies could be used, a preferred operating frequency for the initial sleep mode is one half of the initial operating frequency, that is, 12.5 megahertz in this example. If the inactivity extends for a significant period of time, microprocessor 601 ceases operation and enters a second sleep mode wherein the output of oscillator 663 is set to zero and microprocessor 601 is effectively turned off. When transitioning from the first, half frequency, sleep state to the second, off, sleep state, microprocessor 601 writes a zero in register ADMON of control register 650. As a result, bit d6 of status register 645 is set low, and electronic control circuit 501 detects the operating mode of microprocessor 601 by checking this bit.

A real time clock built into data transfer controller 603 is used to measure the amount of activity or inactivity of microprocessor 601. The clock signal provided by second oscillator 667 is used to operate a real time clock RCLK, and is typically operated using a liquid crystal vibrator 665. The real time clock is formed as part of bus controller 635 and uses commands from microprocessor 601 to measure specific elapsed time intervals. As previously indicated, two independent oscillators 663, 667, along with two sets of liquid crystal vibrators 661, 665, are used to make microprocessor 601 clock CLK independent of, and, therefore, independently adjustable from, real time clock RCLK.

By making bit d1 of registers RTCVAL and RTCSEL, for control register 650, low or high, the real time clock is used to establish four different timers. When bit d0 of register RTCON is set to one, one timer is started. In starting this timer, an interrupt signal is output to microprocessor 601 for a pre-selected timing interval until a zero is written to bit d0 of register RTCON at which time this timer stopped. When microprocessor 601 receives this interrupt request signal, it reads register RTCCLR and clears the interrupt request. The output of these interval timers are used for counting user time, etc., during PDL processing.

The configuration of PROM an exemplary control register 649 is described next. The three registers EEPCS, EEPSK, and EEPDI, shown in FIG. 20 are contained in PROM register 649 of FIG. 21. These registers are used for data exchanges with EEPROM 670 which is built into cartridge 503, and are used to electrically erase and change data.

Cartridge 503 of, this embodiment, stores variables (configuration parameters) required for the operation of laser printer 500 in EEPROM 670. EEPROM 670 is the type of EEPROM that performs reading, deletion, and rewriting of data using a serial transfer format. An EEPROM found useful in implementing the invention is an EPROM, part number NMC93C66X3, manufactured by National Semiconductor. EEPROM 670 has a memory capacity of around 16 bits by 256 bytes (registers) and is able to read, delete, or write to a predetermined optional register. When selected by a chip select signal CS, EEPROM 670 simultaneously inputs zero [0] and one [1] data to be transferred to serial data input pin $D_{in}$. However, the first three bits of the transfer data is interpreted as a command to the EEPROM, and the next eight bits are interpreted as a register number for data to be read, erased, or written. In the case of writing data, following these commands and register specifications, data to be simultaneously stored with the serial data clock is sent to data input pin $D_{in}$.

Register EEPCS provides a signal that switches the chip select signal. When microprocessor 601 writes a zero to bit d0 of this register, and EEPROM 670 is selected. Register EEPSK is a register used to generate serial clock SK. Microprocessor 601 generates a serial data clock for use by EEPROM 670 by alternately writing zeros and ones to this register. Register EEPDI is a register that retains each data bit that is written to EEPROM 670. When microprocessor 601 generates serial data clock SK by rewriting register EEPSK, it simultaneously rewrites a bit d0 of register EEPDI based on the data to be rewritten. Data output pin $D_{out}$ of EEPROM 670 represents bit d0 of transfer flag register 647, which was previously described. After outputting a data read command and the number of the register to be read to EEPROM 670, if microprocessor 601 reads bit d0 of transfer flag register 647 at the same time as the serial data clock, it reads the contents of the specified register. Since data stored in EEPROM 670 is retained even if power is turned off, the circuit or logic configuration present prior to power loss can be restored by reading the contents of EEPROM 670 immediately after power is restored to laser printer 500.

G. Configuration and Operation of the Read Control Circuit

An exemplary read control circuit 620 and associated data transfer steps utilized in its operation are described next. As shown in FIG. 25, read control circuit 620 uses two 8-bit latches, a first latch 651 and a second latch 652, a ROM 671 to output transferred data, a three-input AND gate 672, and a D-type flip-flop 674, which generates flag EWRDY (bit 0) of status register 645. Viewing read control circuit 620 from the point of view of electronic control circuit 501, as shown in FIG. 19, latches 651 and 652 are equivalent to two registers, EWWRL and EWWRH, which transfer data in 8-bit units. These registers are used to transfer the low end bytes (EWWRL) and high end bytes (EWWRH), respectively, of data in which each word is equal to 16 bits. From the microprocessor 601 point of view, latches 651 and 652 are equivalent to register EWRD, which is shown in FIG. 20. That is, microprocessor 601 can read both latches, 651 and 652, as one word through data bus DB29.

Read control circuit 620 uses a ROM 671 to store 256 bytes of data. An exemplary circuit for ROM 671 is a fuse-type ROM or a small capacity PROM, or a smaller portion of a large capacity ROM also used for other storage. A RAM element can be used and the same function obtained, by transferring data to the RAM in advance of when it is needed. Among the address lines forming address bus CAB, the eight low end bits (AC1 through AC8) are connected to address lines A0 through A7 of ROM 671. Data buses or pins O0 through O7 are connected to the input side, 1D through 8D, of first and second latches 651 and 652. The output of ROM 671 is also output to FIFO control circuit 623 input data buses Z0 through Z7.

The outputs of latches 651 and 652 are connected to data bus DB29, which is read as register EWRD by microprocessor 601. The output signal /EWROM of three-input AND gate 672 is input to a chip select CE and output enable OE of ROM 671. When either of the /EWWRH, /FIFOWR, or /EWWRL, signals input to AND gate 672 become low, ROM 671 outputs address data specified by the eight low end bits on address bus CAB.

Signal /EWWRH goes low when a transfer of high end bytes is selected by read control circuit 620. Likewise, signal /EWWRL goes low when a transfer of low end bytes is selected. Signal /FIFOWR goes low when the transfer of data is selected by FIFO control circuit 623. Since the /EWWRL and /EWWRH signals are input to clock pins CK of latches 651 and 652, respectively, data is output from ROM 671 when these signals become active, and that data is retained in the latches. Furthermore, because signal /EWWRL is also input to clock pin C of flip-flop 674, output Q of flip-flop 674 drops low when low end bytes are transferred. Output of EWRDY is handled as bit d0 of status register 645, which has already been described, and bit d1 of transfer flag register 647. That is, it is treated as an EWRDY flag.

First latch 651 and second latch 652 are treated as register EWRD by microprocessor 601. Therefore, microprocessor 601 carries out a read operation toward register EWRD when it attempts to read data in latches 651 and 652. At this time, signal /EWRD becomes active low and data retained first is output from latches 651 and 652, which are connected to the output enable pin. That is, data that was retained first by the latches is output on data bus DB29. Because signal /EWRD is connected to preset pin PR of flip-flop 674, at the same time that microprocessor 601 reads the data from latches 651 and 652, signal EWRDY, changes to high. That is, flag EWRDY, is set to one.

Assuming the above hardware configuration, electronic control circuit 501 and microprocessor 601 transfer data from electronic control circuit 501 to microprocessor 601 using the following procedures. The data to be transferred is the print data that electronic control circuit 501 receives from work station 507 and the PDL program that is to be processed by microprocessor 601. The data transfer brought about by read control circuit 620, occurs using the data transfer routine of FIG. 26 that CPU 510 executes and also using the data read interrupt processing routine of FIG. 28 executed by microprocessor 601.

When print data to be transferred to cartridge 503 has been prepared, the processing shown in the flow chart of FIG. 26 begins. First, flag EWRDY (bit d0) of status register 645 is read in step S700. Flag EWRDY is set to zero when data is put into latches 651 and 652. When that data is read by microprocessor 601, the flag is set to one. Thus, a determination can be made as to whether or not flag EWRDY is set at one in a step S705.

A standby mode is adopted until flag EWRDY is set to one. When flag EWRDY is one, the next address, which is the first address of area EWWRH plus the D×2 of the data to be transferred, is read in step S710. When reading takes place for area EWWRH, data is read from ROM 671. As shown in FIG. 27, the 256-byte data, is written sequentially at even number addresses for EWWRH, from 00h to FFh, in ROM 671.

The reason that no data is written to odd address values is because CPU 510 data access takes place in 1 word, or 16-bit, increments. Accessing words beginning with odd address numbers (an element of address bus errors) is not possible. When reading takes place for an address D×2 away from the first address in area EWWRH, data is read from ROM 671 and latched to second latch 652, as shown in FIG. 25.

In this manner, when the transfer of high end bytes of data, as retained by second latch 652, occurs, CPU 510 transfers the low end bytes, or data retained by first latch 651, in step S715. When one word of data has been retained in latches 651 and 652, CPU 510 sets one of the interrupt request registers (in this embodiment AMDINT 0) in step S720. CPU 510 continues execution of the transfer routine shown in FIG. 26. However, when the data retention takes place using first latch 651, flag EWRDT is set low (logic 0), as indicated in FIG. 25. Therefore, transfer of the next data does not occur until flag EWRDY is set high (logic 1) (steps S700 and S705), When CPU 510 sets an interrupt request register (AMDINT 0), microprocessor 601 receives this interrupt request and starts a data read interrupt routine as shown in FIG. 28. This routine begins after data is retained in latches 651 and 652 of read control circuit 620. Microprocessor 601 reads the one word of data prepared by electronic control circuit 501 in step S730 by reading register EWRD. After that, microprocessor 601 transfers the data it read to specified areas of RAMs 611 through 614.

Using the processing technique described above, electronic control circuit 501 is able to transfer data to cartridge 503, which is only connected to a read only data bus CDB. In addition, because data writing takes place in byte sized units and reading takes place in word sized units, microprocessor 601 can more effectively receive data. The embodiment described used an example of transferring one word of data. However, this is not a necessary limitation and data transfer may also take place in byte sized units. In this latter case, transfer only uses area EWWRL and the eight high end bits of data may be discarded on the microprocessor 601 side.

II. Configuration and Operation of FIFO Control Circuit

FIFO control circuit 623 uses a latch 657 to latch data to be written to FIFO memory 621, a FIFO write register 653 to control writing of data to FIFO memory 621, and a FIFO read register 655 to control reading of data. FIFO memory 621 typically stores 1,152 bytes of data and has internal write address and read counters. Internally, FIFO memory 621 has a write reset pin, a read reset pin, a write 8-bit data bus, a read 8-bit data bus, a write clock pin, and a read clock pin, all of which reset respective write and read counters.

In order to use FIFO memory 621 to transfer data from electronic control circuit 501 to microprocessor 601, CPU 510 executes a transfer routine as illustrated in FIG. 29, and microprocessor 601 executes a processing routine illustrated in FIG. 30. The processing routine shown in the flow chart of FIG. 29 is described first.

CPU 510 transfers several bytes of data using FIFO control circuit 623. When the data transfer routine shown in FIG. 29 is started by CPU 510, register FIFORST, which belongs to FIFO write circuit 654 of FIFO control circuit 623, is first read, and an address counter on the write side is also reset in step S750. Next, variable N is reset to zero in step S755 in order to count the number of data to be transmitted. After that, the address (the first address of register FIFOWR plus the data to be transferred D×2) is read in step 760. As with read control circuit 620, when this address is read, the specified address of ROM 671 is accessed (see FIG. 27) and data D, which CPU 510 is attempting to transfer, is output and latched using latch 657 through buses Z0 through Z7, which are shown in FIG. 25.

Next, register FIFOREQ of FIFO control circuit 623 is read and data D retained in latch 657, is processed for transfer to FIFO memory 621 in step S765. When register FIFOREQ is read, a write lock is output to the FIFO memory 621 write clock pin. Data D, which is retained in latch 657, is written to the address indicated by the write address counter of FIFO memory 621. At the same time, the contents of the write address counter inside of FIFO memory 621 are incremented by one, only. After one byte of data is written in this manner, variable N, which indicates the number of data to be transferred, is incremented by one in step S770, and a determination is made in step S775 as to whether or not variable N is equal to the total number of bytes X of data that is to be transferred. As a consequence, steps S760 to S775, are repeated until the total number of bytes N of transferred data is equal to the total number X of data to be transferred.

When the transfer of all of the data is complete, CPU 510 sets one of the interrupt request registers (AMDINT 1) and notifies microprocessor 601 that data transfer is complete in step S780. CPU 510 then proceeds through the NEXT step and the data transfer processing routine ends.

Microprocessor 601 receives interrupt request AMDINT 1 and starts a data receive interrupt routine as represented in the flow chart of FIG. 30. When this routine is started, microprocessor 601 first reads register RDRST, which is part of FIFO read register 655 of FIFO control circuit 623. Microprocessor 601 then resets the address counter on the read side of FIFO memory 621 in step S800. Variable M is then set at zero in step 805 in order to count the number of data received.

Next, register FIRCLK, which is part of FIFO read register 655, is read in step S810. Then, data read to specified areas of RAMs 611 through 614 is transferred in step S815. When register FIRCLK is read, a read clock signal is output to the clock pin on the read side of FIFO memory 621, and address data indicating the address count of the read side at that time, is read. At the same time, the contents of the address counter on the read side of FIFO memory 621 is incremented by one. Because a PDL program is what is usually transferred through FIFO control circuit 623, the received data is transferred immediately to the specific area of RAM to be used for development of image data.

When one byte of data is received, variable M is incremented by one in step S820, and whether or not the new value is equal to the total number of bytes X of data variable M is used to transfer is determined in step S835. Thus, the processing described above in steps S810 to S825 is repeated until the number of bytes M of data received matches the total number of data X to be transferred.

When data reception is determined to be complete, microprocessor 601 writes a command in polling command register 643 in step S630, to indicate the end of the data reading process. By reading the contents of polling command register 643, CPU 510 knows that data reception has ended. After that, microprocessor 601 goes through the RNT step and ends this processing routine.

A significant amount of data can be effectively transferred from electronic control circuit 501 to microprocessor 601 using the processing technique described above. The transferred data is retained in specified areas of RAMs 611 through 614 of data transfer controller 603, where it awaits processing by microprocessor 601. When microprocessor 601 receives all of the print data from electronic control circuit 501 that is to be developed (as a program using a PDL), it commences the PDL interpreter stored in ROMs 606 through 609 and processes this print data. Image development takes place using such processing and the results are stored as image data, also in specified areas of RAMs 611 through 614.

I. Configuration and Operation of a Double Bank Control Circuit

The image data provided as a result of image development is transferred to electronic control circuit 501 and stored in a RAM 512 for printing by laser engine 505. This image data transfer takes place using double bank circuit 624, which is equipped with two banks that store 32 bytes (16 words) of data. These banks are referred to as bank A and bank B and have the same hardware construction. Therefore, only an example of the configuration of one bank, bank A, is shown in FIG. 31.

Each bank is configured to allow switching of its address and data buses between connection to microprocessor 601 and electronic control circuit 501 which occurs to realize an image data transfer. As indicated in FIG. 31, two data selectors 681 and 682 are used to select or redirect address buses. Two sets of octal line buffers are used, four octal line buffers 684 through 687 total, with two units per set, to select the data bus (16-bit wide). Two RAMs 691 and 692, which have a 32 byte memory capacity, gates 694 and 695, here OR gates, and an inverter 696 complete one bank. In FIG. 31 two memory chips with a memory capacity of 32 bytes are used but a single memory chip could be used with appropriate switching of high end addresses.

Data selector 682 is configured to select and output the four low end bits (AC1 through AC4) of address bus CAB of electronic control circuit 501, and the four low end bits (A2 through A5) of microprocessor 601. Address selection occurs using signal ADDMUXA (register ADDMUXA bit d0), which is connected to a select pin S. Data selector 682 switches the read and write signals of RAMs 691 and 692 to match a desired address bus selection, and switches whichever signal is connected to chip select pins CE 1 and 2, and output enable pin OE, using signal ADDMUXA.

Octal line buffers 684 and 685 are typically configured as tri-state line buffers and are connected to data bus DB29. When gate pins 1G and 2G are low, data bus DB20 of microprocessor 601 and the data buses of RAMs 691 and 692 are connected, and data can be written from microprocessor 601 to RAMs 691 and 692. A two-input OR gate 694 is connected to receive signals /DPWROA and /ADDMUXA as inputs, and has an output connected to gate pins 1G and 2G of octal buffers 691 and 692. Signal /DPWROA becomes low when microprocessor 601 attempts to write data to bank A. Therefore, to write data to bank A, if bit d0 of register ADDMUXA is set low in advance, when microprocessor 601 writes data to bank A, the gates of octal line buffers 684 and 685 open and data output to data bus DB29 is output to the data buses of RAMs 691 and 692 where it is written.

When gate pins 1G and 2G of octal buffers 686 and 687 are low, data bus DB68 and the data buses of RAMs 691 and 692 are connected and data is read from RAMs 691 and 692 to electronic control circuit 501. A two-input OR gate 695 is connected to receive inverted signal /DPOE1A from inverter 696 and signal ADDMUXA as inputs, and has an The output connected to gate pins 1G and 2G of octal line buffers 686 and 687. Signal /DPOE1A becomes low when electronic control circuit 501 attempts to read data from bank A. Therefore, to read data from bank A, if bit d0 of register ADDMUXA is set high in advance, the gates of octal line buffers 686 and 687 open and data that was output to the data buses of RAMs 691 and 92 is output to data bus DB68.

The transfer of image data by microprocessor 601 and receipt by CPU 510 are now described assuming the above type of bank memory hardware. A flow chart illustrating an exemplary transfer initiation routine for image data, which is executed by microprocessor 601, is shown in FIG. 32. As shown in FIG. 32, before image data is transferred, microprocessor 601 places a transfer start command in polling command register 643 in step S850, and CPU 510 reads this command and executes the response processing routine illustrated in FIG. 33. That is, electronic control circuit 501 determines whether or not laser printer 500 is print enabled in step S860. If laser printer 500 is print enabled, one of the interrupt request registers (AMDINT 2) is set, in step S865, and processing proceeds to the step labeled NEXT which temporarily ends the current routine. If, on the other hand, laser printer 500 is not enabled, microprocessor 601 is notified of this status in step S870. If laser printer 500 is not print enabled, it means that the laser printer cannot print even if it receives the image data. For example, laser engine 505 might still not be warmed up or could have a paper jam.

When microprocessor 601 receives interrupt request signal AMDINT 2 from electronic control circuit 501, it starts the image data transfer interrupt routine shown in FIG. 34. When this processing starts, microprocessor 601 first writes a one to bit d0 of register ADDMUXA as in step S900. When bit d0 of register ADDMUXA is one, as described using FIG. 31, the data buses of RAMs 691 and 692, which form bank A, are connected to data bus DB29 of microprocessor 601 and no access from electronic control circuit 501 can take place.

Microprocessor 601 then transfers 16 words (here 32 bytes) of data to bank A DPWROA in step S902. When data is written to bank A DPWROA, signal /DPWROA, shown in FIG. 31, becomes low and data is written to RAMs 691 and 692 through octal buffers 684 and 685. When this 16 word data transfer ends, microprocessor 601 writes a one to bit d0 of register ADDMUXA, in step S904, and connects the data buses of RAMs 691 and 692 to data bus DB68 of electronic control circuit 501.

After that, microprocessor 601 writes command data to bank A, in step S906, to notify polling command register 643 of the end of data transfer, and data transfer for bank A ends. Microprocessor 601 next executes the same processing described above for bank B, in step S910. When data transfer for bank B ends, in the same manner, microprocessor 601 writes additional command data to notify polling command register 643 that this transfer has ended. In this manner, a total of 32 words (or 64 bytes) of data are transferred from cartridge 503 to banks A and B.

CPU 510 executes the image data reception routine shown in FIG. 5 for the microprocessor 601 processing described above. That is, CPU 510 first reads bit d3 of status register 645 or flag CMDRD in step S920 and determines whether or not it is set to zero in step S925. When command data is to be written from microprocessor 601 to polling command register 643, flag CMDRD is set to zero. At this time, CPU 510 reads the command data in polling command register 643 in step S930. The command data is then checked, in step S935, to determine whether or not it indicates an end to data transfers to bank A, and if not, other processing (step S940) is executed. If the command data of polling command register 643 indicates an end to data transfer to bank A, electronic control circuit 501 reads the 16 words of bank A DPRAMA (see FIG. 19) in step S945 and transfers the data to RAM 512 in step S950. At this point, the reading of the 16-word data from bank A ends.

Electronic control circuit 501, which permits the transfer of the next 16 words from microprocessor 601, then sets one of the interrupt request registers (AMDINT 2), and the processing described above for steps S920 to S955 is executed for bank B. That is, when electronic control circuit 501 determines from the command data of polling command register 643 that the data transfer from microprocessor 601 for bank B has ended, after reading the 16-word data of bank B DPRAMB and transferring it to RAM 512, it sets one of the interrupt request registers, requesting an interrupt of microprocessor 601.

Since microprocessor 601 repeats the interrupt processing routine shown in FIG. 34 when it receives such an interrupt request, the transfer of all data ends when microprocessor 601 and CPU 510 execute both routines (FIGS. 34 and 35). After the transfer of all of the image data, if new print data is not received from electronic control circuit 501, microprocessor 601 writes a one in register CLKDIV of control register 650 after a predetermined amount of time has elapsed and cuts its own operating frequency in half, here to 12.5 MHz, thereby reducing its power consumption and its generation of undesirable heat.

J. Printing Image Data

Electronic control circuit 501, receives all of the image data, and exchanges signals with laser engine 505 using double buffer 520 and register 517, and then prints the image data. This exchange of signals between electronic control circuit 501 and laser engine 505 is illustrated in graphic form in FIG. 36. A general description of the printing process is given below in reference to that figure.

When electronic control circuit 501 receives developed image data from cartridge 503, it detects or tests to see if laser engine 505 is ready to allow printing. After any warm up period has ended and printing is enabled, the signal shown in FIG. 36 is output to laser engine 505 through a register 517. Laser engine 505 receives this signal and immediately starts the paper transport motor. At the same time, rotation of the photosensitive drum begins, as does electrostatic charge processing, etc.

When paper, or other media, on which printing is to take place reaches a specified position relative to the photosensitive drum, laser engine 505 senses the leading edge of the paper and outputs a signal VREQ to electronic control circuit 501 through register 517. Upon receipt of the VREQ signal, electronic control circuit 501 enters a standby mode for a pre-selected period of time. That is, it suspends or delays signal transmission to laser engine 505 for the length of time required for the photosensitive drum to rotate to a starting position for latent image formation, using a laser scanning beam. A signal VSYNC is then output through register 517 to laser engine 505. Laser engine 505 receives the VSYNC signal and responds by outputting a laser beam horizontal synchronization signal HSYNC through register 517. Because the VSYNC signal is the equivalent of a command to start reading one line of image data, laser engine 505 reads image data from one of RAMs 520A or 520B, of double bank buffer circuit 520, during the time that the VSYNC signal is being received. To form blank or empty top or bottom margins on the image media, here paper, a controlled interruption or override to ignore the VSYNC signal occurs for the length of time required to scan the desired number of lines required to form the margin.

At the same time, CPU 510 counts signals and transfers the required image data to RAM 520A or RAM 520B of double buffer circuit 520. CPU 510 ends the transfer of image data to double buffer 520 when either a specified amount of time has elapsed after detection of the end of the paper or a horizontal synchronization signal count value is reached which is preset according to the paper size. One page of image data is transferred to laser engine 505, and that image is printed on paper by means of the above processing.

III. Miscellaneous

A. Electronic suppression of thermal sources.

As stated above, after all of the image data has been transferred, microprocessor 601 enters a sleep mode after electronic control circuit 501 has not transferred any print data for a specified amount of time. That is, the operating frequency for microprocessor 601 is decreased by at least a factor of 2 to 12.5 MHz. A block diagram of an exemplary circuit for switching the frequency of clock signal INCLK of microprocessor 601 based on clock signal CLK provided by oscillator 661 is illustrated in FIG. 37. In this example the frequency of CLK is 50 MHz. The frequency switching circuit employs three D-type flop flops, 1100, 1102, and 1104, a data selector 1106, a 4-bit binary counter 1108, and an inverter 1110.

The input pins for data selector 1106 are each pulled up or down to signify data or generate an output. As a result, data in the form [1110] is provided to a first input pin group, 4A through 1A, and data in the form [1100] is sent to a second input pin group, 4B through 1B, of data selector 1106. The Q output of a second D-type flip-flop 1102 is sent to the select input pin S of data selector 1106. When select pin S is set low (0) or at a low signal level, it outputs data from first input pin group, 4A through 1A. When select pin S is set high (1), it outputs data from second input pin group, 4B through 1B.

When microprocessor 601 is operating, the value in register CLKDIV is zero and the Q output of flip-flop 1102 is maintained low (0). As a result, data [here 1110] from first input pin group, 4A through 1A, of data selector 1106 is transferred to counter 1108 as a preset value. Counter 1108 functions to count the 50 MHz clock signal provided by oscillator 661. At this time, the count value is preset at [1110] and counter 1108 functions in half-minute cycles. The carry output, CO, of counter 1108 is connected to the D input pin of a third D-type flip-flop 1104 which provides it as an output to pin Q at the same time as clock signal CLK. As a result, the 50 MHz signals of oscillator 661 are divided by two so that they operate in half-minute cycles and are output from flip flop 1104 as a 25 MHz frequency clock signal INCLK.

When microprocessor 601 does not operate for a set amount of time, the value in register CLKDIV is changed to a one and the data [1100] of second input pin group, 4B through 1B, of data selector 1106 is transferred to counter 1108 as a preset value which causes it to function in one-quarter minute cycles. As a result, the 50 MHz signals of oscillator 661 operate in one-quarter minute intervals and a 12.5 MHz frequency clock signal INCLK is output from third flipflop 1104.

In the examples provided above, the operating frequency was reduced by one half in the sleep mode. However, when the characteristics of microprocessor 601 permit, the operating frequency may be reduced even further, sometimes even to zero, that is, the clock may be stopped.

Also, the criteria for entering the sleep mode where microprocessor 601 does not receive new print data from electronic control circuit 501 for a specified amount of time, may be other than those described above. For example, an alternative criteria could be based on whether RAMs 611 to 614 are not accessed for a predetermined amount of time. The component that detects whether or not microprocessor 601 has operated for the specified amount of time could be something other than microprocessor 601 itself.

In general, if the event that indicates that microprocessor 601 has not operated for the specified amount of time is detected and if the operating frequency is reduced in response to this detection, it is possible to reduce heat generated by microprocessor 601 and, similarly, other devices as well.

Also, when entering a sleep mode, the temperature of microprocessor 601 is often not very high anyway because it has not been operating. However, in general, it is known that if semiconductor devices maintain relatively high temperatures over a long period of time, their life span is shortened. As a result, it is possible to extend the life span of a microprocessor by having it enter a sleep mode.

When a microprocessor operates for a long period of time or when the ambient temperature becomes high, it is also possible to measure the temperature of microprocessors and other devices that generate a lot of heat with a temperature measuring device such as a thermocouple. When the temperature reaches a particular level, the operating frequency can be automatically reduced to or below a preselected level to prevent device damage.

B. Miscellaneous Aspects of the Invention

The embodiments of this invention were described above using printer applications. However, use of this invention is not limited to printers. For example, it may also be applied to dedicated word processors, personal computers, or even work stations. In recent years, such computer related equipment not only has expansion slots, it is often the case that cartridge type expansion devices, such as IC cards, can be attached to them.

In dedicated word processors and personal computers, etc., equipped with expansion slots and IC card connectors, improving or adding to data processing functions or making modifications can be made easy. This ease is achieved if the add-on control device of this invention is installed in one of these devices and a monitor command, etc., is used to convert the processing of the original equipment processor to processing stored in the memory built into the add-on control device so that the original equipment processor processes data along with the add-on control device. Moreover, if control is switched to an add-on control device, no matter what the processing or process steps are, they can be modified. Therefore, it is possible to modify and improve the functionality of existing equipment as well as update software versions in a variety of dedicated equipment, such as dedicated word processors.

In this manner, this invention can be applied to all types of data processing equipment that use a processor to which an add-on control device can be connected, such as, for example, electronic automobile parts, facsimile machines, telephones, electronic memos, electronic musical instruments, electronic cameras, electronic translation machines, hand copiers, cash dispensers, remote control devices and electronic calculators. In such data processing equipment, if the processor on the equipment side is able to recognize the add-on control device and easily switch its processing to an address provided for the add-on control device, it is easy to use the add-on control device and data processing device, even on existing electronic devices. If the equipment does not have such functions, a variety of means can be devised to switch the equipment side processor to the processing stored in the add-on control device.

When a 68000 type microprocessor reads data from a specified address, the equipment or device (referred to as a slave) that outputs the data, determines whether or not the data is on the data bus by means of a DTACK signal, which provides a response to the processor. For this reason, when the processor executes a jump command to an absolute address while executing processing routines stored in ROM, as provided on the equipment side, the add-on control device analyzes and detects whether this was an execution of a jump command to an absolute address. The add-on device then outputs the execution address of the ROM built into the add-on control device to the data bus before the original ROM located in the equipment side outputs the absolute address of the jump destination to the data bus. The add-on device also returns a DTACK signal to the equipment-processor and forces processing to switch to a specified address in the add-on control device. Once processing switches to a ROM in the add-on control device, subsequent processing can assume any configuration.

This example assumes that the processor on the equipment side executes a jump command to an absolute address. However, it is possible to use a configuration where the jump command itself is read from the equipment ROM. When power is applied and instructions initially read from equipment ROM, a code equivalent to a jump command from the add-on control device is placed on the data bus and signal DTACK is returned. While these methods raise the danger of a DTACK conflict, a detailed analysis of bus timing and appropriate design makes them possible to realize.

In addition, in the embodiments described above, the add-on control device is configured as a cartridge containing a printed circuit board in a casing and is handled as a single unit. However, the add-on on circuit may also be provided as a single printed circuit board that inserts in the expansion slot. There is also no problem with providing a single add-on control device with a number of different connectors. Furthermore, the casing itself can form the printed circuit board in another mode of this invention.

This invention is not limited in any manner by the embodiments described above. It is possible to implement this invention in a variety of forms that do not deviate from the gist of this invention. For example, the cartridge could have a built in outline font and receive data on the number of character pointers from the printer and then generate a bit image of the designated number of points of that character and transfer that to the printer. The add-on device could be configured to store and display, without performing especially intricate processing, by means of the data received from the electronic device using the add-on control device. Or, there the printer can be of the ink-jet variety.

The add-on cooling techniques for an electronic device taught according to this invention are applicable to all types of equipment using an internal processor. For example, dedicated word processors, personal computers, work stations, electronic automobile parts, facsimile machines, telephones, electronic memos, musical instruments, cameras, translation machines, hand copiers, cash dispensers, remote control devices and electronic calculators utilize such processors.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. An add-on electronic device for use in electronic apparatus having at least a first processor capable of performing logical operations and executing processing steps stored in a first memory connected thereto, a connector configured to receive add-on devices which is coupled to at least an address signal line of the first processor and to an address output converter that converts data into address signals and provides them to the connector, comprising:

a second processor configured to perform processing substantially independent of the first processor;

second memory means connected to said second processor for storing processing steps for execution thereby;

data removal means for extracting data from the address signals output from the electronic apparatus;

a mounting area for circuit devices which generate substantially the most heat within said add-on electronic device which is positioned within said add-on electronic device between an approximate center and front end relative to a direction of insertion into said add-on connector of the electronic apparatus;

a printed circuit board supporting said mounting area and circuit elements for said add-on electronic device;

a casing substantially surrounding said circuit board;

a packing component that adheres tightly to said second processor and said casing and is disposed therebetween; and elastic means for pushing said second processor in a direction toward said casing in an area adjacent a top surface of said second processor;

wherein said elastic means comprises a compressible material installed between the bottom surface of said second processor and said casing and extending through an opening in said printed circuit board.

2. The add-on device of claim 1, wherein circuit elements that generate a substantial amount of heat comprises said second processor.

3. The add-on device of claim 1, in which said packing component comprises a thermally conductive material.

4. The add-on device of claim 3 wherein said thermally conductive material comprises a rubber-like material.

5. The add-on device of claim 3 wherein said thermally conductive material comprises a liquid-like material.

6. The add-on device of claim 1 wherein said casing comprises a material having a thermal conductance rate of at least 1W/m·K.

7. The add-on device of claim 1 wherein one surface of the casing comprises metal.

8. The add-on device of claim 1 wherein substantially all of the casing comprises metal.

9. The add-on device of claim 1 wherein said elastic means comprises silicon rubber.

10. The add-on device of claim 1 further comprising a passage in at least a portion of said casing opposite said second processor.

11. The add-on device of claim 1 wherein said casing comprises plastic and at least one opening is formed therein opposite said second processor.

12. The add-on device of claim 1 wherein said casing has ventilation holes.

13. The add-on device of claim 1 wherein the electronic apparatus has a housing and a fan for cooling the inside of the housing, and wherein said casing has ventilation holes.

14. The add-on device of claim 1 wherein said printed circuit board is mounted within said casing so that it sub-divides a volume within said casing into relatively larger and smaller first and second volumes, respectively; and wherein said second processor is positioned within the first volume.

15. The add-on device of claim 1 further comprising:

timing means for providing at least one clock signal of predetermined frequency to at least one preselected circuit element of said add-on electronic device; and frequency regulation means for detecting when said selected circuit element is inactive for a predefined amount of time and for decreasing the clock signal frequency in response to said inactivity.

16. The add-on device of claim 15 wherein the first processor is configured to detect the circuit element inactivity and provide a frequency regulation signal indicative thereof to said frequency regulation means.

17. The add-on device of claim 15 wherein said second processor is configured to detect the circuit element inactivity and to provide a frequency regulation signal indicative thereof to said frequency regulation means.

18. The add-on device of claim 17 wherein said preselected circuit element comprises said second microprocessor.

19. The add-on device of claim 15 wherein the frequency is decreased to zero.

20. The add-on device of claim 15 wherein the frequency is decreased to one-half of the predetermined frequency.

21. The add-on device of claim 1 further comprising air passages on an end of said casing which is configured to extend outside of the electronic apparatus.

22. The add-on device of claim 21 further comprising a plurality of cooling ridges positioned adjacent said passages which increase the casing surface area exposed.

* * * * *

UNITED STATES PATENT AND TRADEMARK OFFICE
CERTIFICATE OF CORRECTION

PATENT NO.     : 5,526,229
DATED          : June 11, 1996
INVENTOR(S)    : Kenichi Wakabayashi, et al.

It is certified that an error appears in the above identified patent and that said Letters Patent is hereby corrected as shown below:

Column 1, line 25, change "07/835,537" to --07/895,537--.

Signed and Sealed this

Ninth Day of March, 1999

Attest:

Attesting Officer

Q. TODD DICKINSON

Acting Commissioner of Patents and Trademarks